United States Patent
Oishi et al.

(10) Patent No.: US 12,476,433 B2
(45) Date of Patent: Nov. 18, 2025

(54) LIGHT-EMITTING ELEMENT ARRAY

(71) Applicant: Sony Semiconductor Solutions Corporation, Kanagawa (JP)

(72) Inventors: Masato Oishi, Kumamoto (JP); Shinichi Agatuma, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 562 days.

(21) Appl. No.: 17/916,897

(22) PCT Filed: May 19, 2021

(86) PCT No.: PCT/JP2021/018938
§ 371 (c)(1),
(2) Date: Oct. 4, 2022

(87) PCT Pub. No.: WO2021/235473
PCT Pub. Date: Nov. 25, 2021

(65) Prior Publication Data
US 2023/0163560 A1 May 25, 2023

(30) Foreign Application Priority Data
May 21, 2020 (JP) ................. 2020-089114

(51) Int. Cl.
H01S 5/0233 (2021.01)
H01H 29/14 (2006.01)
H01S 5/02315 (2021.01)
H01S 5/042 (2006.01)
H01S 5/42 (2006.01)
H10H 29/14 (2025.01)

(52) U.S. Cl.
CPC ........ *H01S 5/0233* (2021.01); *H01S 5/02315* (2021.01); *H01S 5/04256* (2019.08); *H01S 5/423* (2013.01); *H10H 29/142* (2025.01)

(58) Field of Classification Search
CPC .. H01S 5/423; H01S 5/04254; H01S 5/04256; H01S 5/0233; H01S 5/02315;
(Continued)

(56) References Cited

U.S. PATENT DOCUMENTS

2014/0376092 A1* 12/2014 Mor ................. G01B 11/2513
359/569
2016/0141839 A1 5/2016 Matsubara
(Continued)

FOREIGN PATENT DOCUMENTS

| JP | S60-201382 A | 10/1985 |
|---|---|---|
| JP | H10-107386 A | 4/1998 |

(Continued)

OTHER PUBLICATIONS

International Search Report issued in International Patent Application No. PCT/JP2021/018938 on Jun. 15, 2021 and English translation of same. 5 pages.
(Continued)

*Primary Examiner* — James A Menefee
(74) *Attorney, Agent, or Firm* — K&L Gates LLP

(57) ABSTRACT

A light-emitting element array according to the present technology includes: a light-emitting element group; a first wire; and a second wire. The light-emitting element group includes a plurality of first light-emitting elements and a plurality of second light-emitting elements that are arrayed in a planar manner to form a light-emitting element surface. The first wire extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of first light-emitting elements, and is not electri-
(Continued)

cally connected to the plurality of second light-emitting elements. The second wire extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of second light-emitting elements, and is not electrically connected to the plurality of first light-emitting elements.

13 Claims, 45 Drawing Sheets

(58) Field of Classification Search
CPC ... H01S 5/02345; H01H 29/922; H01H 29/24
See application file for complete search history.

(56) References Cited

U.S. PATENT DOCUMENTS

| | | | |
|---|---|---|---|
| 2017/0365984 A1* | 12/2017 | Lipson | H01S 5/0237 |
| 2018/0006432 A1* | 1/2018 | Kondo | H01S 5/068 |
| 2020/0083669 A1* | 3/2020 | Na | G01P 13/00 |
| 2020/0244039 A1* | 7/2020 | Kondo | H01S 5/426 |
| 2021/0218231 A1* | 7/2021 | Ghosh | H01S 5/04253 |
| 2021/0296861 A1* | 9/2021 | Kondo | G06V 20/64 |
| 2021/0376211 A1 | 12/2021 | Song | |
| 2022/0013992 A1* | 1/2022 | Wang | H01S 5/18361 |

FOREIGN PATENT DOCUMENTS

| | | |
|---|---|---|
| JP | H1168230 A | 3/1999 |
| JP | 2000-114656 A | 4/2000 |
| JP | 2001-063139 A | 3/2001 |
| JP | 2014093463 A | 5/2014 |
| JP | 2014-138096 A | 7/2014 |
| JP | 2015153862 A | 8/2015 |
| JP | 2016100487 A | 5/2016 |
| JP | 2018001523 A | 1/2018 |
| JP | 2018198342 A | 12/2018 |
| KR | 20200021858 A | 3/2020 |

OTHER PUBLICATIONS

Written Opinion issued in International Patent Application No. PCT/JP2021/018938 on Jun. 15, 2021. 4 pages.

* cited by examiner

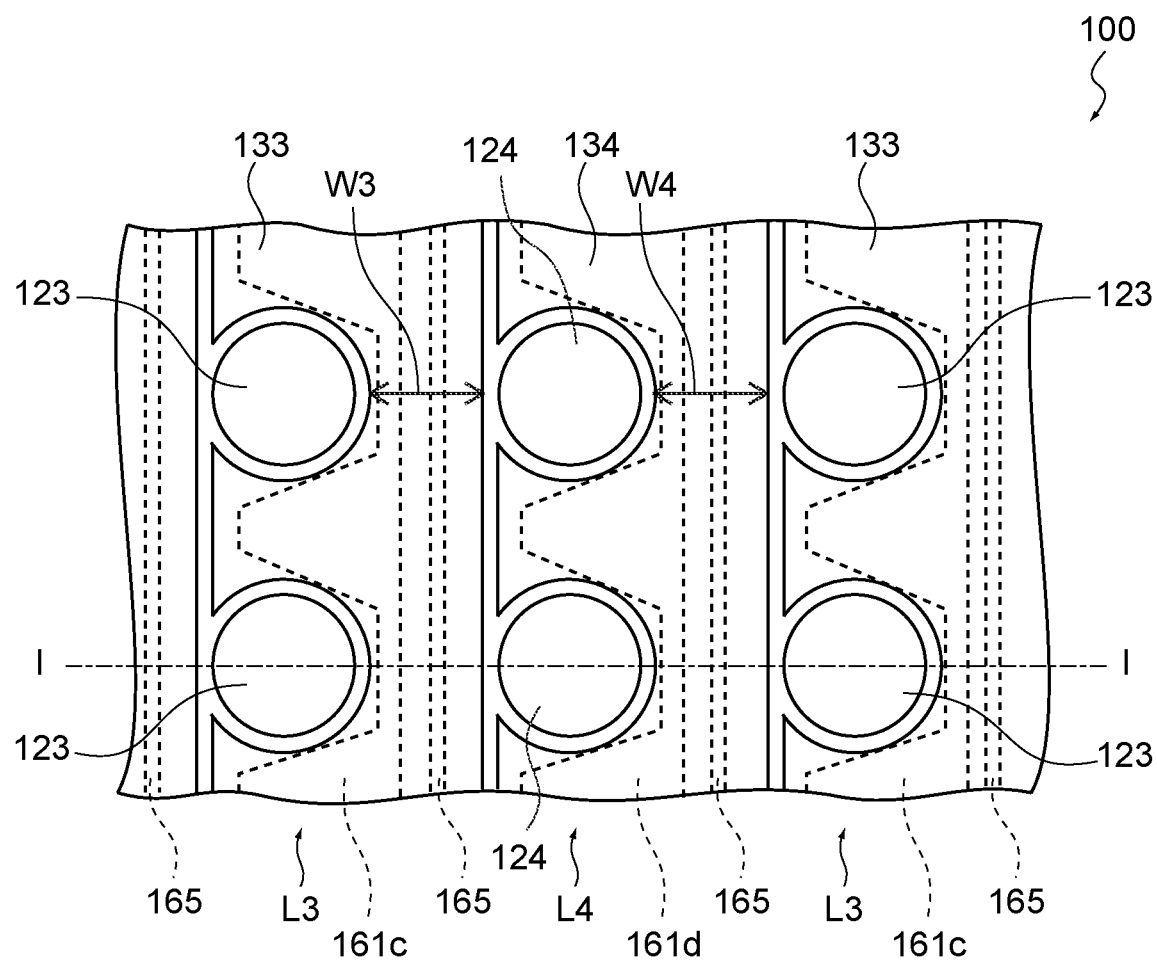
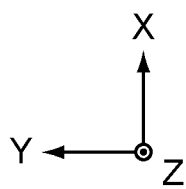
FIG.51

LIGHT-EMITTING ELEMENT ARRAY

TECHNICAL FIELD

The present technology relates to a light-emitting element array in which a plurality of light-emitting elements is arrayed.

BACKGROUND ART

A light-emitting element such as a vertical cavity surface emitting laser (VCSEL) element is often used as a light-emitting element array in which a plurality of light-emitting elements is arrayed. Here, in the light-emitting element array, wiring of each light-emitting element causes a problem in accordance with the number and density of light-emitting elements constituting the array.

For example, Patent Literature 1 discloses an image forming apparatus in which an anode wire and a cathode wire are connected to each of a large number of light-emitting elements arrayed in a matrix. The anode wire and the cathode wire are provided so as to extend in directions orthogonal to each other and intersect with each other and configured such that the size of the light-emitting unit can be reduced and the size of the individual light-emitting element can be increased.

Further, Patent Literature 2 discloses an image forming apparatus in which a first wire and a second wire are connected to each of a large number of light-emitting element arranged in an n×m matrix. N or more first wires are provided and n or more second wires intersecting with the first wires are provided, so that the wiring resistance and the electrostatic capacity of each wire can be suppressed.

CITATION LIST

Patent Literature

Patent Literature 1: Japanese Patent Application Laid-open No. 2001-063139

Patent Literature 2: Japanese Patent Application Laid-open No. 1998-107386

DISCLOSURE OF INVENTION

Technical Problem

However, in the configuration described in Patent Literature 1, the space for providing wires is limited as the interval between light-emitting elements is reduced and it is difficult to form wires. Further, the configuration described in Patent Literature 2 has a problem that the operation delay increases as the density of the light-emitting elements increases. As described above, the existing technology has not sufficiently dealt with the increase in density of light-emitting elements from the viewpoint of the wiring structure.

In view of the circumstances as described above, it is an object of the present technology to provide a light-emitting element array having a wiring structure making it possible to increase the density of light-emitting elements.

Solution to Problem

In order to achieve the above-mentioned object, a light-emitting element array according to an embodiment of the present technology includes: a light-emitting element group; a first wire; and a second wire.

The light-emitting element group includes a plurality of first light-emitting elements and a plurality of second light-emitting elements that are arrayed in a planar manner to form a light-emitting element surface.

The first wire extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of first light-emitting elements, and is not electrically connected to the plurality of second light-emitting elements.

The second wire extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of second light-emitting elements, and is not electrically connected to the plurality of first light-emitting elements.

In accordance with this configuration, since each of the first wire and the second wire has the regions overlapping with the first light-emitting element and the second light-emitting element, the first wire is electrically connected to only the first light-emitting element, and the second wire is electrically connected to only the second light-emitting element, it is possible to make the first wire and the second wire independently emit light while increasing the density of the first wires and the second wires.

The light-emitting element group may include a first light-emitting element column in which the plurality of first light-emitting elements is arrayed, and a second light-emitting element column in which the plurality of second light-emitting elements is arrayed, a center of the first wire may be separated from a center of the first light-emitting element column in a direction parallel to the light-emitting element surface, and a center of the second wire may be separated from a center of the second light-emitting element column in a direction parallel to the light-emitting element surface.

The light-emitting element group may further include a third light-emitting element column in which the plurality of first light-emitting elements is arrayed, the third light-emitting element column being provided on a side opposite to the first light-emitting element column with respect to the second light-emitting element column, the first wire may be provided between the center of the first light-emitting element column and the center of the second light-emitting element column as viewed from a direction perpendicular to the light-emitting element surface, and the second wire may be provided between the center of the second light-emitting element column and a center of the third light-emitting element column as viewed from a direction perpendicular to the light-emitting element surface.

The first light-emitting element column, the second light-emitting element column, the third light-emitting element column, the first wire, and the second wire may each extend in a first direction parallel to the light-emitting element surface and are separated from each other in a second direction that is parallel to the light-emitting element surface and orthogonal to the first direction, a width of the first wire in the second direction may be larger than an interval between the first light-emitting element column and the second light-emitting element column in the second direction, and a width of the second wire in the second direction may be larger than an interval between the second light-emitting element column and the third light-emitting element column in the second direction.

The first wire and the second wire may be formed in a same layer.

The first wire may be stacked on the plurality of first light-emitting elements and the plurality of second light-emitting elements via an insulation layer, be electrically connected to the plurality of first light-emitting elements via a first through hole provided in the insulation layer on the plurality of first light-emitting elements, and be insulated from the plurality of second light-emitting elements by the insulation layer on the plurality of second light-emitting elements, and the second wire may be stacked on the plurality of first light-emitting elements and the plurality of second light-emitting elements via the insulation layer, be electrically connected to the plurality of second light-emitting elements via a second through hole provided in the insulation layer on the plurality of second light-emitting elements, and be insulated from the plurality of first light-emitting elements by the insulation layer on the plurality of first light-emitting elements.

The plurality of first light-emitting elements may each be a vertical cavity surface emitting laser element and include a first light-emitting surface and a first electrode provided around the first light-emitting surface, the plurality of second light-emitting elements may each be a vertical cavity surface emitting laser element and include a second light-emitting surface and a second electrode provided around the second light-emitting surface, the first wire may abut on the first electrode via the first through hole in the plurality of first light-emitting elements, and the second wire may abut on the second electrode via the second through hole in the plurality of second light-emitting elements.

The plurality of first light-emitting elements and the plurality of second light-emitting elements may each have a mesa structure surrounded by a recessed portion, the light-emitting element group may include a first groove portion that connects the recessed portions to each other between the plurality of first light-emitting elements and a second groove portion that connects the recessed portions to each other between the plurality of second light-emitting elements, the first wire may have a portion formed in the first groove portion, and the second wire may have a portion formed in the second groove portion.

The light-emitting elements constituting the light-emitting element group may include a plurality of third light-emitting elements and a plurality of fourth light-emitting elements, the plurality of third light-emitting elements and the plurality of fourth light-emitting elements each having a mesa structure surrounded by a recessed portion, the recessed portion being separated from the light-emitting element surface and having a bottom surface parallel to the light-emitting element surface, an element isolation groove that electrically separates the plurality of third light-emitting elements and the plurality of fourth light-emitting elements from each other being provided in the bottom surface, and the light-emitting element array may further include:

a third wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the third light-emitting element, and is not electrically connected to the fourth light-emitting element; and a fourth wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the fourth light-emitting element, and is not electrically connected to the third light-emitting element.

The light-emitting element group may include a first light-emitting element column in which the plurality of first light-emitting elements is arrayed, a second light-emitting element column in which the plurality of second light-emitting elements is arrayed, a third light-emitting element column in which the plurality of third light-emitting elements is arrayed, and a fourth light-emitting element column in which the plurality of fourth light-emitting elements is arrayed.

The first light-emitting element column, the second light-emitting element column, the first wire, and the second wire may each extend in a first direction parallel to the light-emitting element surface, and the third light-emitting element column, the fourth light-emitting element column, the third wire, and the fourth wire may each extend in a second direction that is parallel to the light-emitting element surface and is orthogonal to the first direction.

The first light-emitting element column, the second light-emitting element column, the first wire, and the second wire may each extend in a first direction parallel to the light-emitting element surface, and the third light-emitting element column, the fourth light-emitting element column, the third wire, and the fourth wire may each extend in the first direction.

The third wire may be stacked on the bottom surface and the element isolation groove via an insulation layer, be electrically connected to the plurality of third light-emitting elements via a first opening provided in the insulation layer in a region of the bottom surface between the element isolation groove and the third light-emitting element, and be insulated from the plurality of fourth light-emitting elements by the insulation layer in a region of the bottom surface between the element isolation groove and the fourth light-emitting element, and the fourth wire may be stacked on the bottom surface and the element isolation groove via the insulation layer, be electrically connected to the plurality of fourth light-emitting elements via a second opening provided in the insulation layer in a region of the bottom surface between the element isolation groove and the fourth light-emitting element, and be insulated from the plurality of third light-emitting elements by the insulation layer in a region of the bottom surface between the element isolation groove and the third light-emitting element.

The third wire may have a width from the element isolation groove to a side of the third light-emitting element larger than a width from the element isolation groove to a side of the fourth light-emitting element, and the fourth wire may have a width from the element isolation groove to a side of the fourth light-emitting element larger than a width from the element isolation groove to a side of the third light-emitting element.

In order to achieve the above-mentioned object, a light-emitting element array according to an embodiment of the present technology includes: a light-emitting element group; a first wire; and a second wire.

The light-emitting element group is a light-emitting element group in which a plurality of first light-emitting elements and a plurality of second light-emitting elements are arrayed in a planar manner to form a light-emitting element surface, the plurality of first light-emitting elements and the plurality of second light-emitting elements each having a mesa structure surrounded by a recessed portion, the recessed portion being separated from the light-emitting element surface and having a bottom surface parallel to the light-emitting element surface, an element isolation groove that electrically separates the plurality of first light-emitting elements and the plurality of second light-emitting elements from each other being provided in the bottom surface.

The first wire extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the first light-emitting element, and is not electrically connected to the second light-emitting element.

The second wire extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the second light-emitting element, and is not electrically connected to the first light-emitting element.

BRIEF DESCRIPTION OF DRAWINGS

FIG. 40 is a plan view of the light-emitting element array showing the third wire and the fourth wire.

FIG. 51 is an enlarged plan view of the light-emitting element array showing the third wire and the fourth wire.

MODE(S) FOR CARRYING OUT THE INVENTION

A light-emitting element array according to an embodiment of the present technology will be described.

[Structure of Light-Emitting Element Array]

Figure 1:
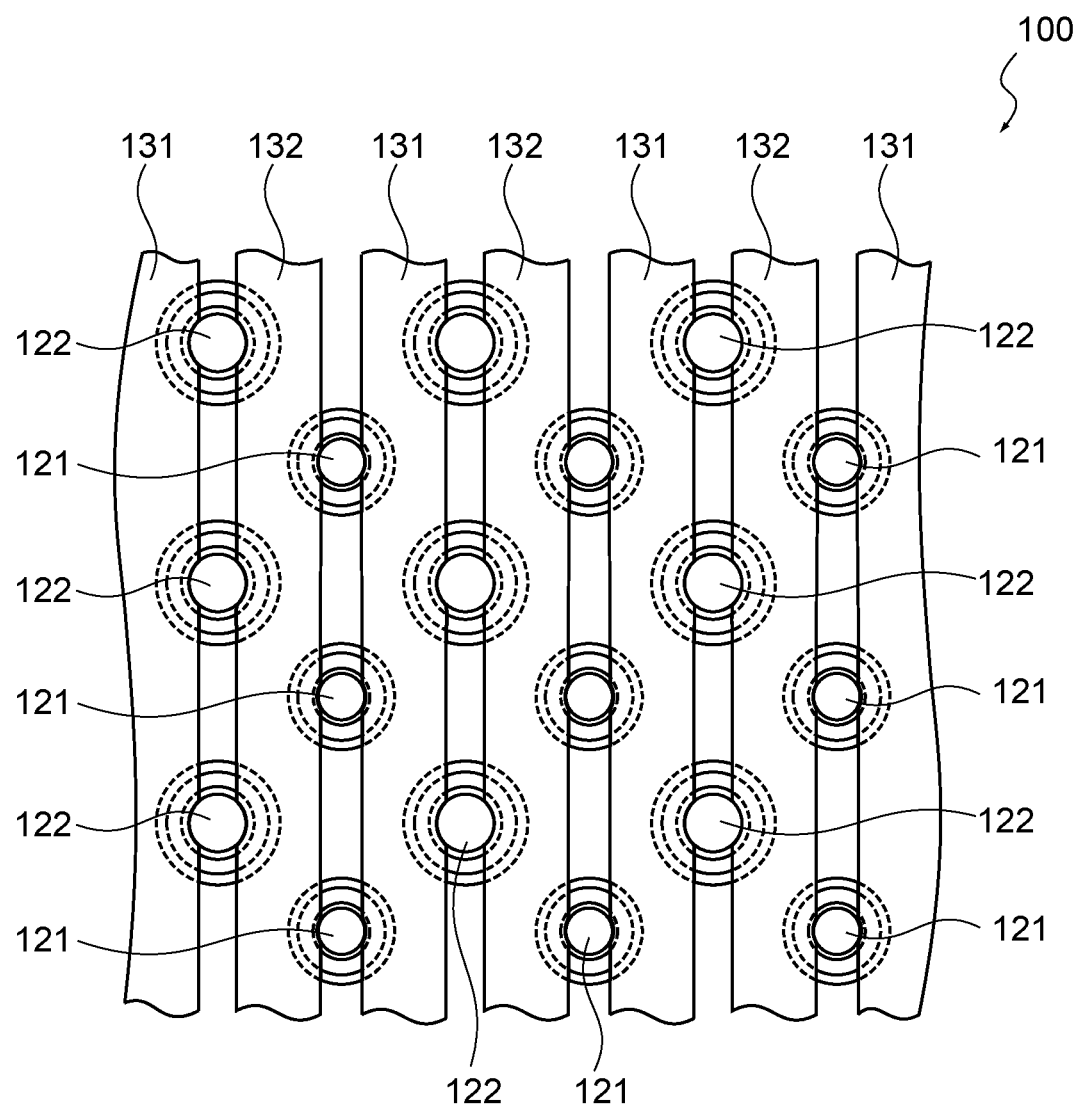
FIG. 1 is a plan view of a light-emitting element array according to an embodiment of the present technology.
Figure 2:
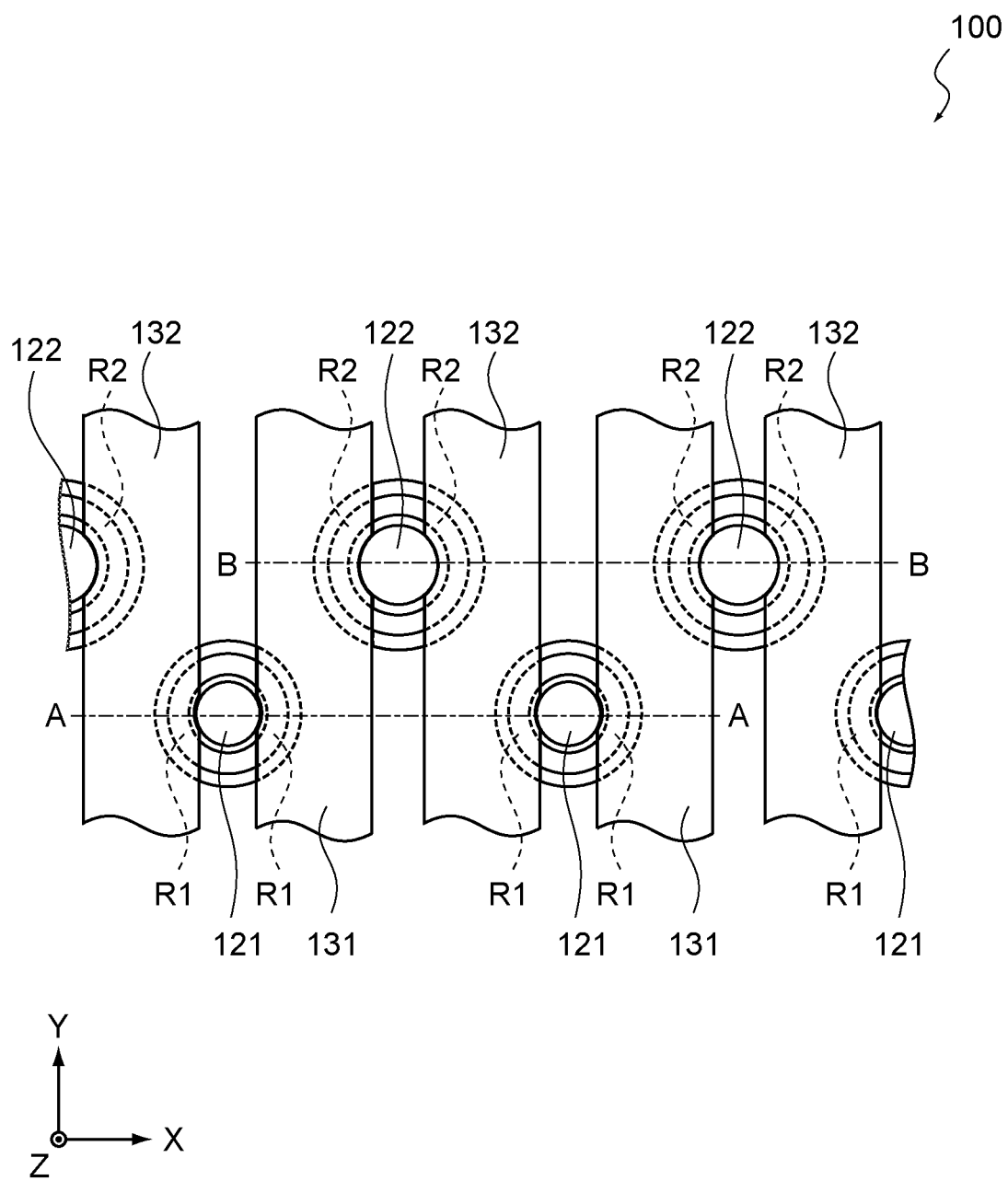
FIG. 2 is an enlarged plan view of the light-emitting element array.
Figure 3:
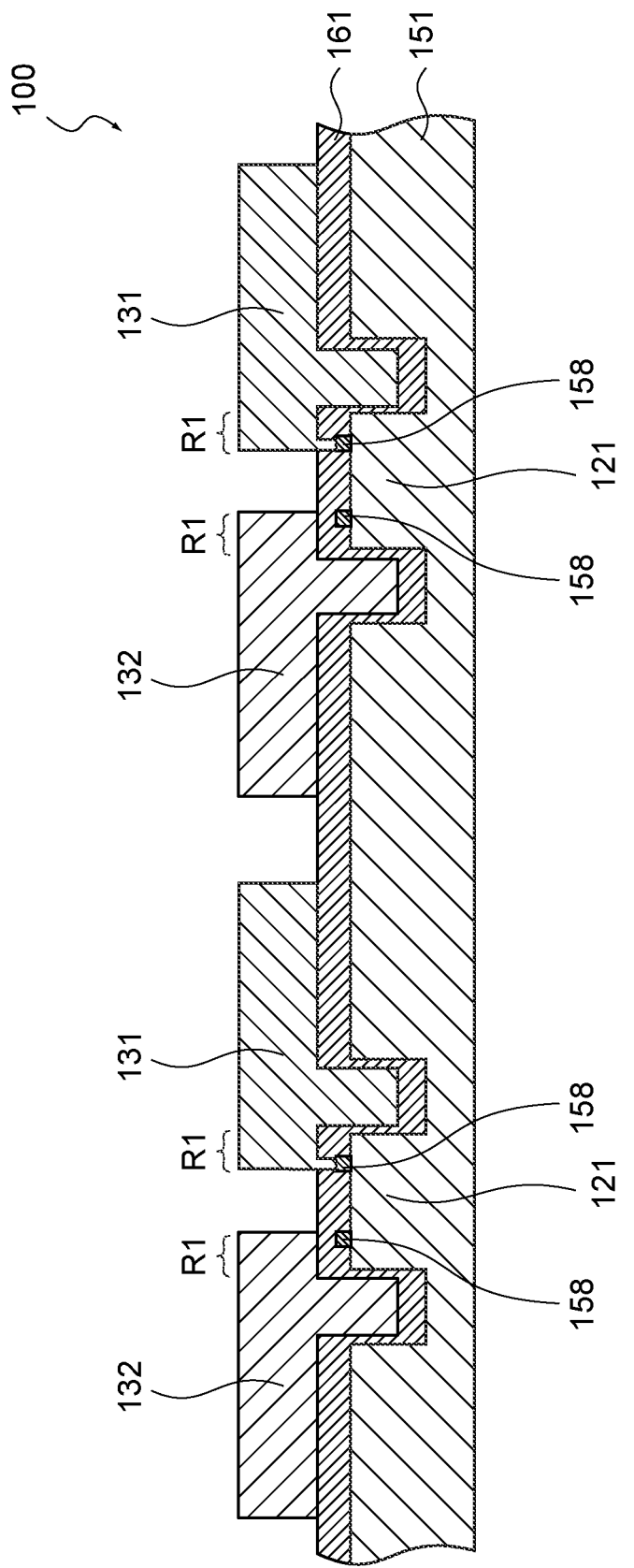
FIG. 3 is a cross-sectional view of the light-emitting element array.
Figure 4:
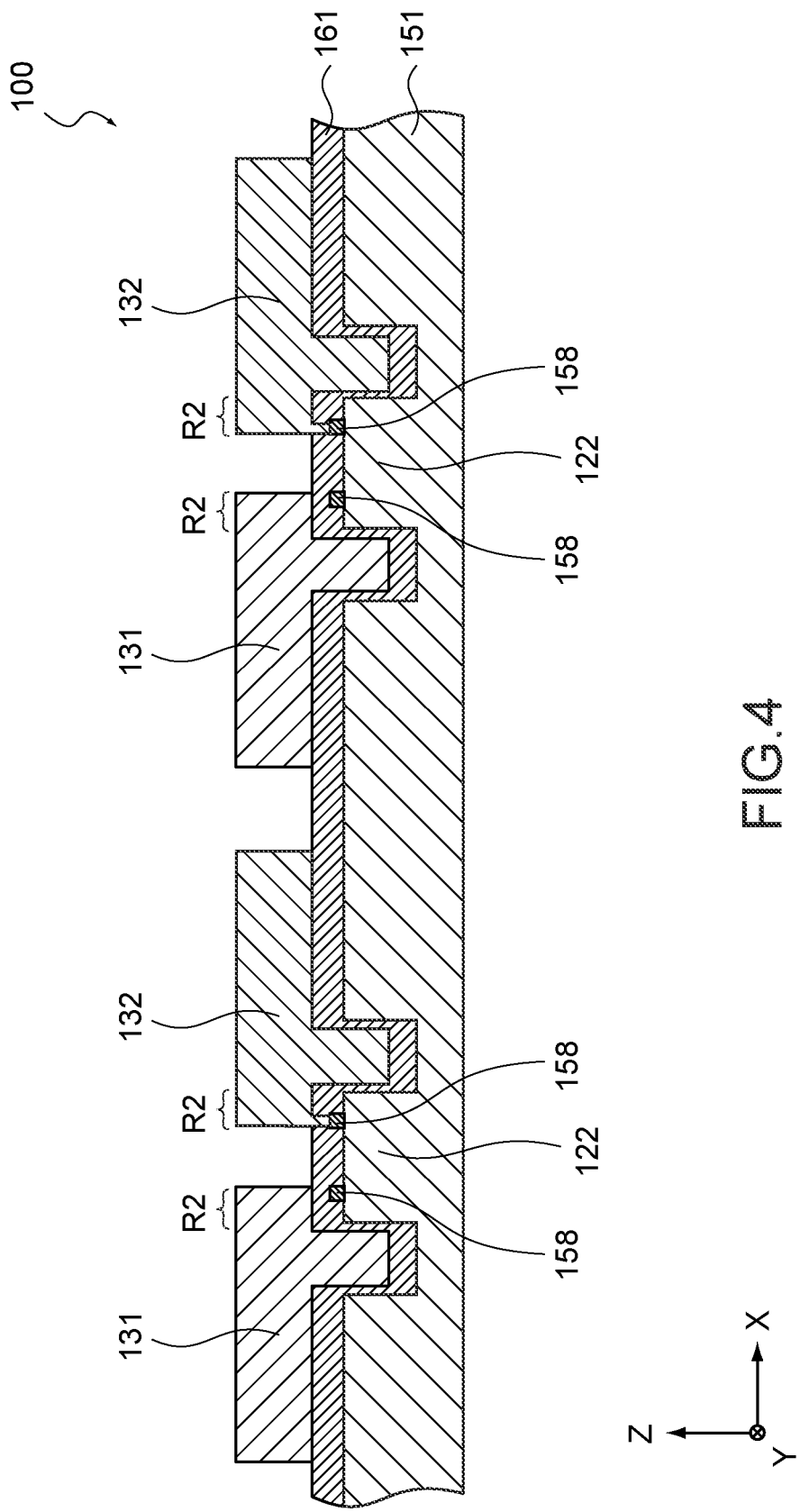
FIG. 4 is a cross-sectional view of the light-emitting element array.

FIG. 1 is a plan view of a light-emitting element array 100 according to this embodiment, and FIG. 2 is an enlarged view of FIG. 1. FIG. 3 and FIG. 4 are each a cross-sectional view of the light-emitting element array 100. FIG. 3 is a cross-sectional view taken along the line A-A in FIG. 2, and FIG. 4 is a cross-sectional view taken along the line B-B in FIG. 2. As shown in these figures, the light-emitting element array 100 includes a first light-emitting element 121, a second light-emitting element 122, a first wire 131, and a second wire 132.

Figure 5:
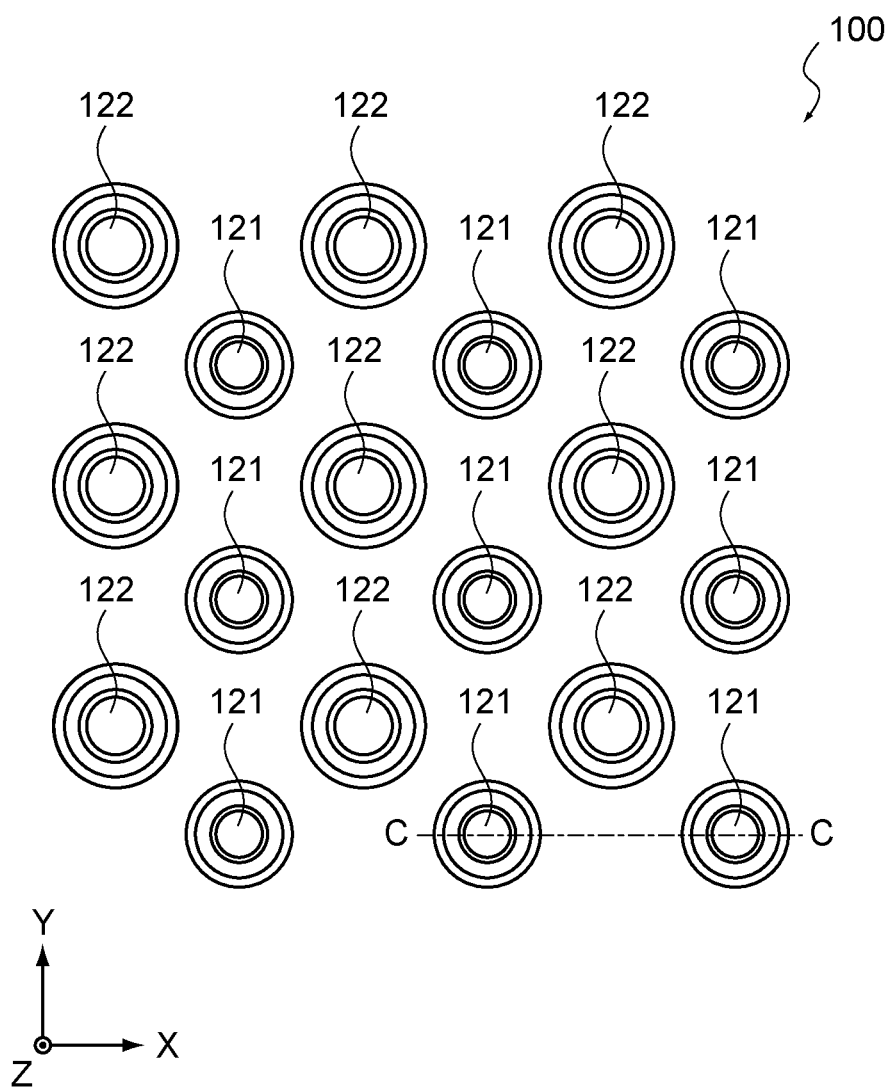
FIG. 5 is a plan view of a partial configuration of the light-emitting element array.
Figure 6:
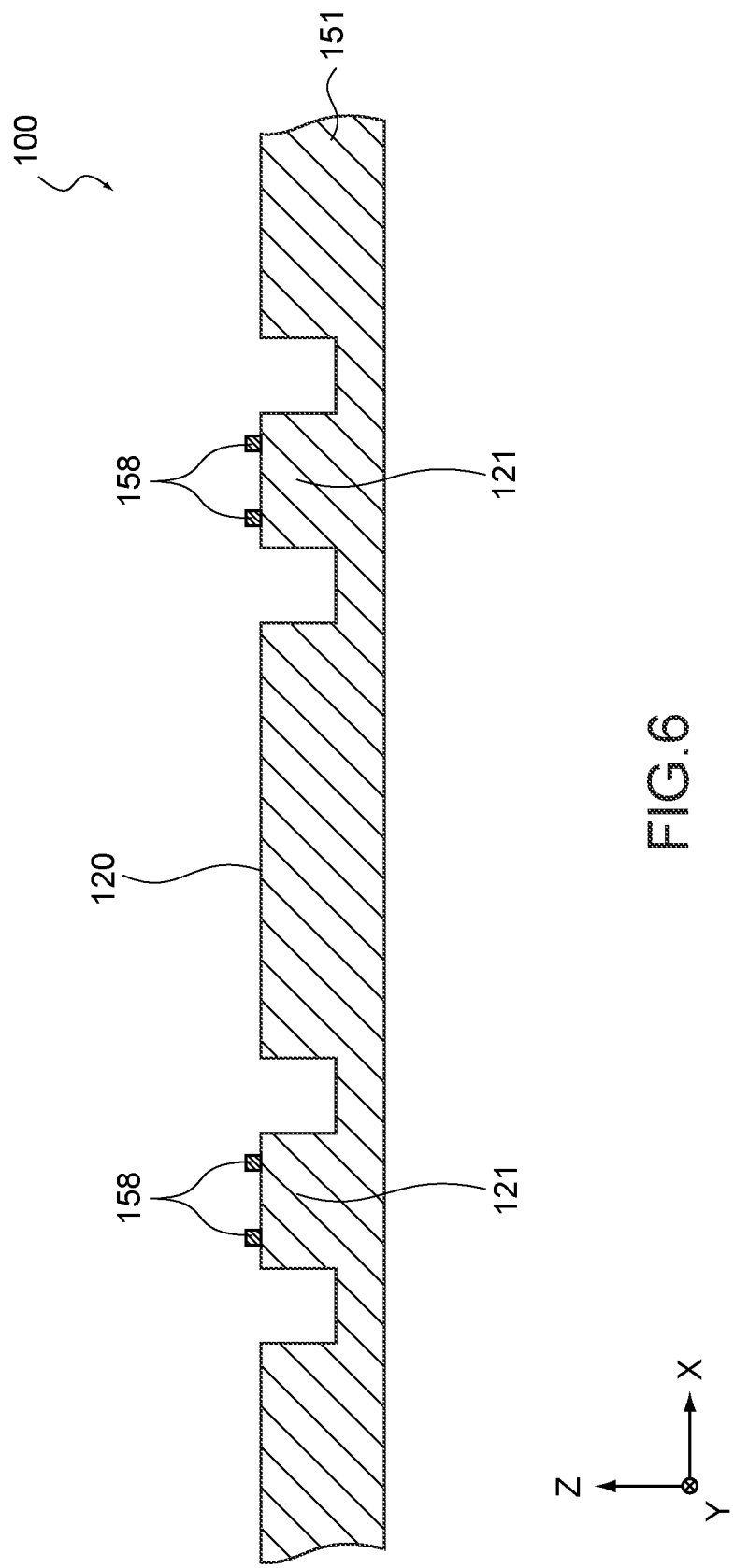
FIG. 6 is a cross-sectional view of a partial configuration of the light-emitting element array.

FIG. 5 is a plan view of the light-emitting element array 100 in which illustration of the first wire 131 and the second wire 132 is omitted. FIG. 6 is a cross-sectional view of this light-emitting element array 100 and is a cross-sectional view taken along the line C-C in FIG. 5.

As shown in FIG. 5, the light-emitting element array 100 includes a light-emitting element group configured by arraying a plurality of first light-emitting elements 121 and a plurality of second light-emitting elements 122 in a planar manner. Hereinafter, as shown in FIG. 6, a surface on which the first light-emitting element 121 and the second light-emitting element 122 are arrayed will be referred to as the light-emitting element surface 120, one surface parallel to the light-emitting element surface 120 will be referred to as the X direction, and a direction that is parallel to the light-emitting element surface 120 and is orthogonal to the X direction will be referred to as the Y direction. That is, the light-emitting element surface 120 is parallel to the X-Y plane. Further, a direction perpendicular to the light-emitting element surface 120 will be referred to as the Z direction. Note that the number of the first light-emitting elements 121 and the number of the second light-emitting elements 122 are not particularly limited and can each be, for example, several tens to several thousands.

Figure 7:
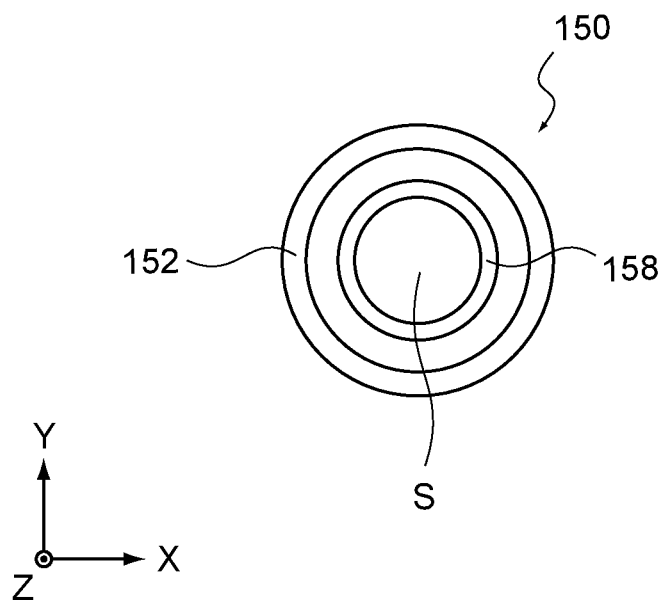
FIG. 7 is a plan view of a light-emitting element constituting the light-emitting element array.

The first light-emitting element 121 and the second light-emitting element 122 can be light-emitting elements having the same configuration. FIG. 7 is a plan view of a light-emitting element 150 capable of constituting the first light-emitting element 121 and the second light-emitting element 122, and FIG. 8 is a cross-sectional view of the light-emitting element 150.

The light-emitting element 150 is a vertical cavity surface emitting laser (VCSEL) element. As shown in FIG. 7 and FIG. 8, the light-emitting element 150 has a mesa structure in which a mesa (plateau shape) 153 is formed by being surrounded by an annular recessed portion 152 provided on a substrate 151.

Figure 8:
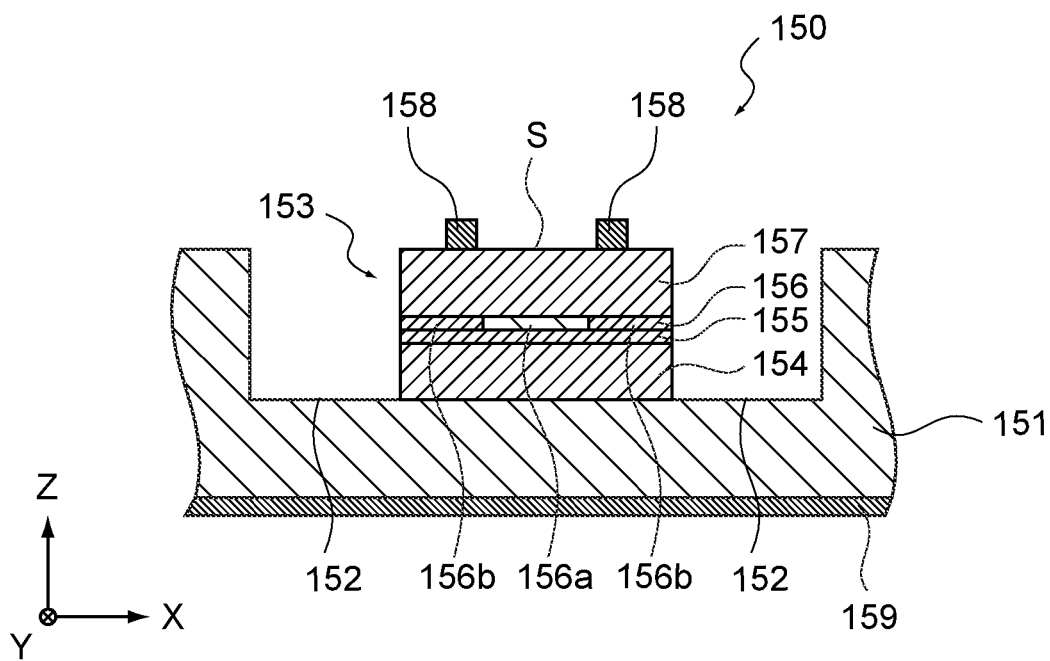
FIG. 8 is a cross-sectional view of the light-emitting element constituting the light-emitting element array.

As shown in FIG. 8, the light-emitting element 150 includes an n-type DBR layer 154, an active layer 155, a current confinement layer 156, a p-type DBR layer 157, a p-electrode 158, and an n-electrode 159. The n-type DBR layer 154, the active layer 155, the current confinement layer 156, and the p-type DBR layer 157 are stacked on the substrate 151 in this order.

The n-type DBR layer 154 is formed of an n-type semiconductor material, functions as a DBR (Distributed Bragg Reflector), and reflects light having a specific wavelength (hereinafter, the wavelength λ). The n-type DBR layer 154 constitutes an optical resonator for laser oscillation together with the p-type DBR layer 157. The active layer 155 is provided between the n-type DBR layer 154 and the p-type DBR layer 157, and emits and amplifies spontaneously emitted light. The active layer 155 can include a plurality of layers obtained by alternately stacking a quantum well layer and a barrier layer.

The current confinement layer 156 is provided in the vicinity of the active layer 155 and imparts a confinement action to a current. The current confinement layer 156 includes a non-oxidized region 156a and an oxidized region 156b. The non-oxidized region 156a is provided in the center of the current confinement layer 156 and the oxidized region 156b is provided around the non-oxidized region 156a. The oxidized region 156b can be formed by performing oxidation treatment from the outer periphery side of a mesa 153 via the recessed portion 152.

The p-type DBR layer 157 is formed of a p-type semiconductor material, functions as a DBR, and reflects light having the wavelength A. The p-type DBR layer 157 constitutes an optical resonator for laser oscillation together with the n-type DBR layer 154. The p-electrode 158 is provided on the surface of the mesa 153 and is electrically connected to the p-type DBR layer 157. As shown in FIG. 7, the p-electrode 158 has an annular shape. The n-electrode 159 is provided on the surface of the substrate 151 on the side opposite to the light-emitting element 150 and is electrically connected to the n-type DBR layer 154 via the substrate 151.

The light-emitting element 150 has the configuration as described above. In the light-emitting element 150, when a voltage is applied between the p-electrode 158 and the n-electrode 159, a current flows between the p-electrode 158 and the n-electrode 159. The current is subjected to a current confinement action by the current confinement layer 156 and is injected into the active layer 155 in the vicinity of the non-oxidized region 156a.

This injected current causes spontaneously emitted light in the active layer 155, and the spontaneously emitted light is reflected by the n-type DBR layer 154 and the p-type DBR layer 157. Of the spontaneously emitted light, a component of the oscillation wavelength A forms a standing wave between the n-type DBR layer 154 and the p-type DBR layer 157 and is amplified by the active layer 155. When the injected current exceeds a threshold value, laser oscillation of light forming a standing wave occurs, and a laser beam passes through the p-type DBR layer 157 and is emitted. In FIG. 7 and FIG. 8, a surface from which a laser beam is emitted is shown as a light-emitting surface S. The p-electrode 158 is provided around the light-emitting surface S.

Note that the configuration of the light-emitting element 150 is not limited to the one shown here. For example, the n-type and the p-type in the light-emitting element 150 may be reversed. Further, although the configuration described above shows the configuration of a surface emission type VCSEL element, the light-emitting element 150 may be a backside emission type VCSEL. Further, the light-emitting element 150 is not limited to the VCSEL and may be a light-emitting element formed of a semiconductor such as an LED (Light Emitting Diode).

As shown in FIG. 5, the light-emitting element array 100 can be a light-emitting element array in which the first light-emitting element 121 and the second light-emitting element 122, each of which has the configuration of the light-emitting element 150, are arrayed. As shown in FIG. 5, in the first light-emitting element 121 and the second light-emitting element 122, the size of the mesa 153 may differ or may be the same.

The first light-emitting element 121 and the second light-emitting element 122 have the configurations as described above. Here, the first light-emitting element 121 and the second light-emitting element 122 are configured to be capable of emitting light independently of each other. Specifically, as shown in FIG. 8, the n-electrode 159 is uniformly formed on the back surface of the substrate 151 and is a common electrode between the first light-emitting element 121 and the second light-emitting element 122.

Meanwhile, the p-electrode 158 is provided on each mesa 153 and is an independent electrode for each of the first light-emitting element 121 and the second light-emitting element 122. Therefore, when a voltage is applied between the p-electrode 158 and the n-electrode 159 provided in the first light-emitting element 121, the first light-emitting element 121 can be caused to emit light. When a voltage is applied between the p-electrode 158 and the n-electrode 159 provided in the second light-emitting element 122, the second light-emitting element 122 can be caused to emit light. Note that in the figures other than FIG. 8, illustration of the layer structure of the light-emitting element 150 is omitted and only the p-electrode 158 is illustrated.

Figure 9:
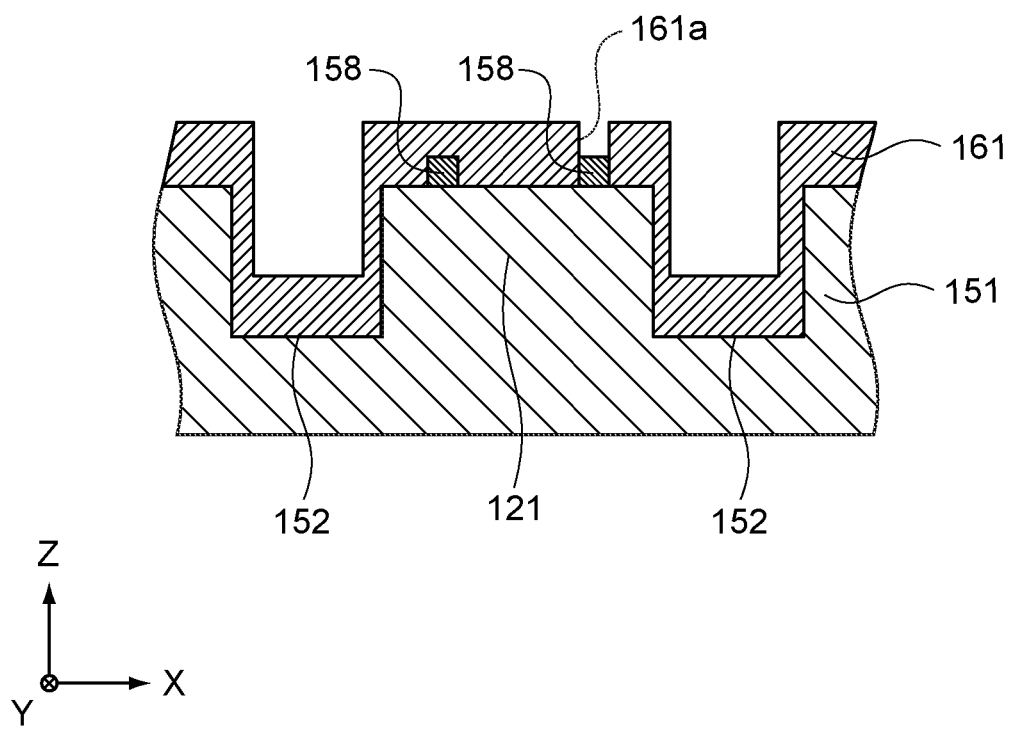
FIG. 9 is a cross-sectional view showing an insulation layer included in the light-emitting element array.
Figure 10:
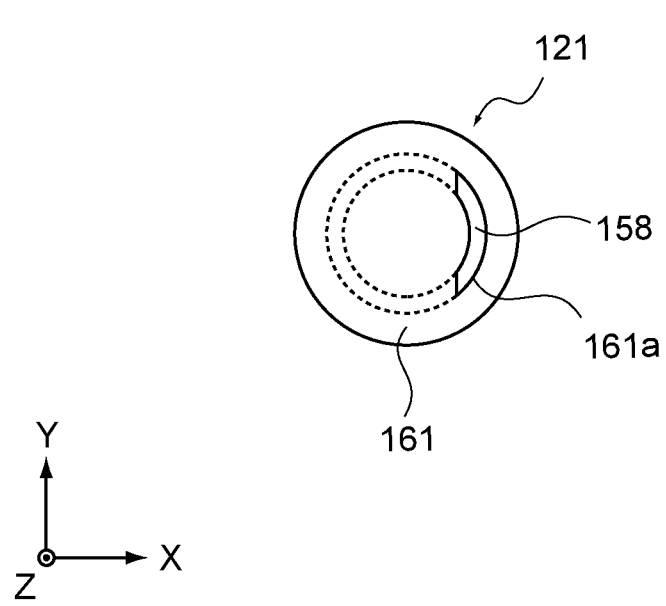
FIG. 10 is a plan view showing the insulation layer included in the light-emitting element array.

Further, in the light-emitting element array 100, an insulation layer 161 is provided on the light-emitting element surface 120. FIG. 9 is a cross-sectional view showing the insulation layer 161 on the first light-emitting element 121, and FIG. 10 is a plan view of the insulation layer 161 on the first light-emitting element 121. As shown in these figures, a first through hole 161a is provided in the insulation layer 161 on the first light-emitting element 121. The first through hole 161a penetrates the insulation layer 161 and exposes part of the p-electrode 158 of the first light-emitting element 121.

Figure 11:
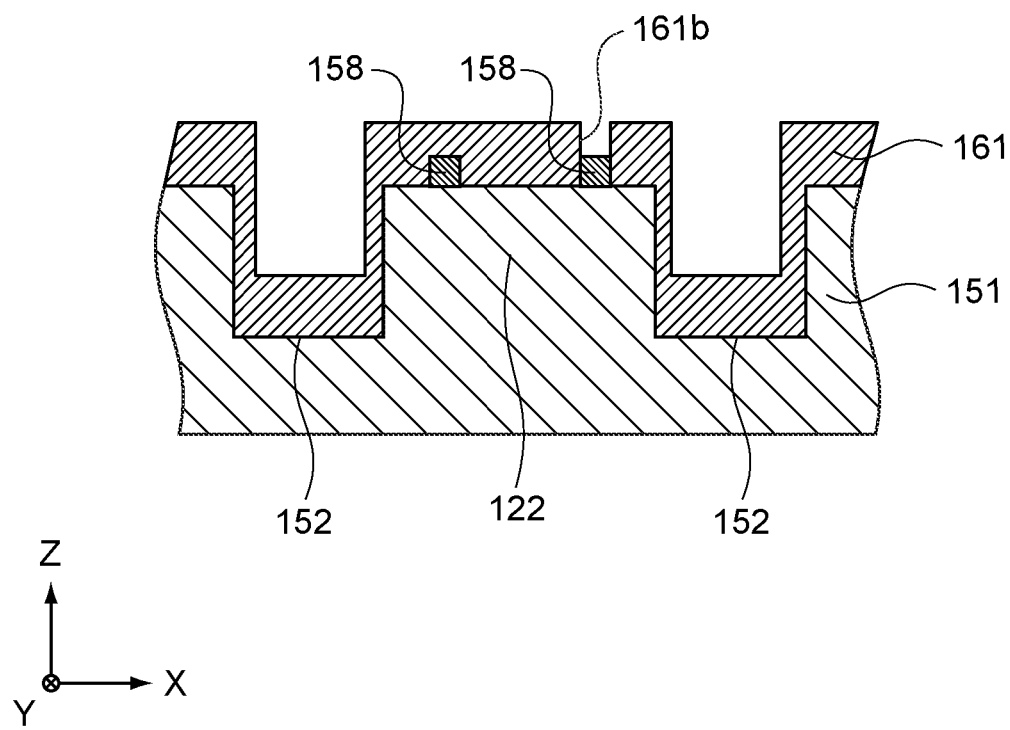
FIG. 11 is a cross-sectional view showing the insulation layer included in the light-emitting element array.
Figure 12:
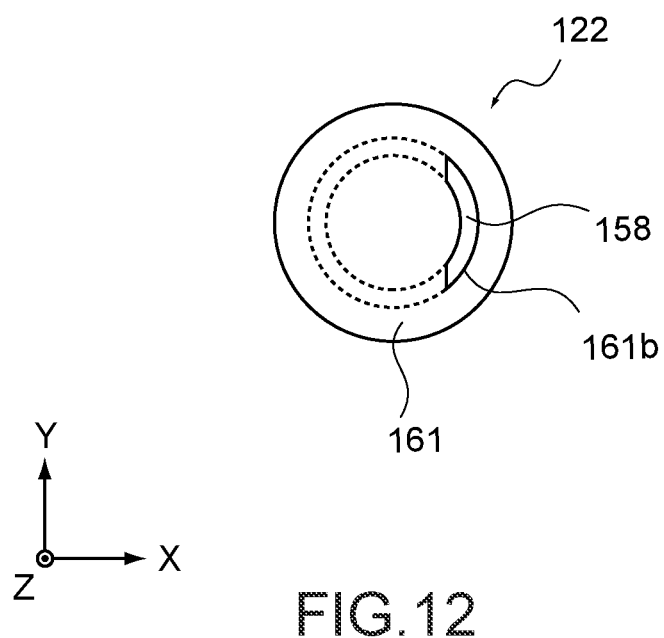
FIG. 12 is a plan view showing the insulation layer included in the light-emitting element array.

FIG. 11 is a cross-sectional view showing the insulation layer 161 on the second light-emitting element 122, and FIG. 12 is a plan view of the insulation layer 161 on the second light-emitting element 122. As shown in these figures, a second through hole 161b is provided in the insulation layer 161 on the second light-emitting element 122. The second through hole 161b penetrates the insulation layer 161 and exposes part of the p-electrode 158 of the second light-emitting element 122. Note that in FIG. 1, FIG. 2, and FIG. 5, illustration of the insulation layer 161 is omitted.

The first wire 131 and the second wire 132 are each formed of a conductive material such as Au and are formed in the same layer as shown in FIG. 3 and FIG. 4. Further, as shown in FIG. 1 to FIG. 4, the first wire 131 and the second wire 132 extend in parallel to the light-emitting element surface (X-Y plane) 120 and are separated from each other. The first wire 131 and the second wire 132 each have regions overlapping with the first light-emitting element 121 and the second light-emitting element 122 as viewed from a direction (the Z direction) perpendicular to the light-emitting element surface 120.

In FIG. 2 to FIG. 4, the regions of the first wire 131 and the second wire 132 overlapping with the first light-emitting element 121 are shown as regions R1, and the regions of the first wire 131 and the second wire 132 overlapping with the second light-emitting element 122 are shown as regions R2. As shown in these figures, both the first wire 131 and the second wire 132 have the region R1 and the region R2. The region R1 and the region R2 are formed on the outer periphery side than the p-electrode 158 so as not to shield the light-emitting surface S (see FIG. 8). Further, the region R1 and the region R2 may be formed on the inner periphery side than the p-electrode 158 as long as the light-emitting surface S is not shielded. Further, in the case of prioritizing the increase in the width of the first wire 131 and the second wire 132, the region R1 and the region R2 can be formed so as to partially shield the light-emitting surface S.

Figure 13:
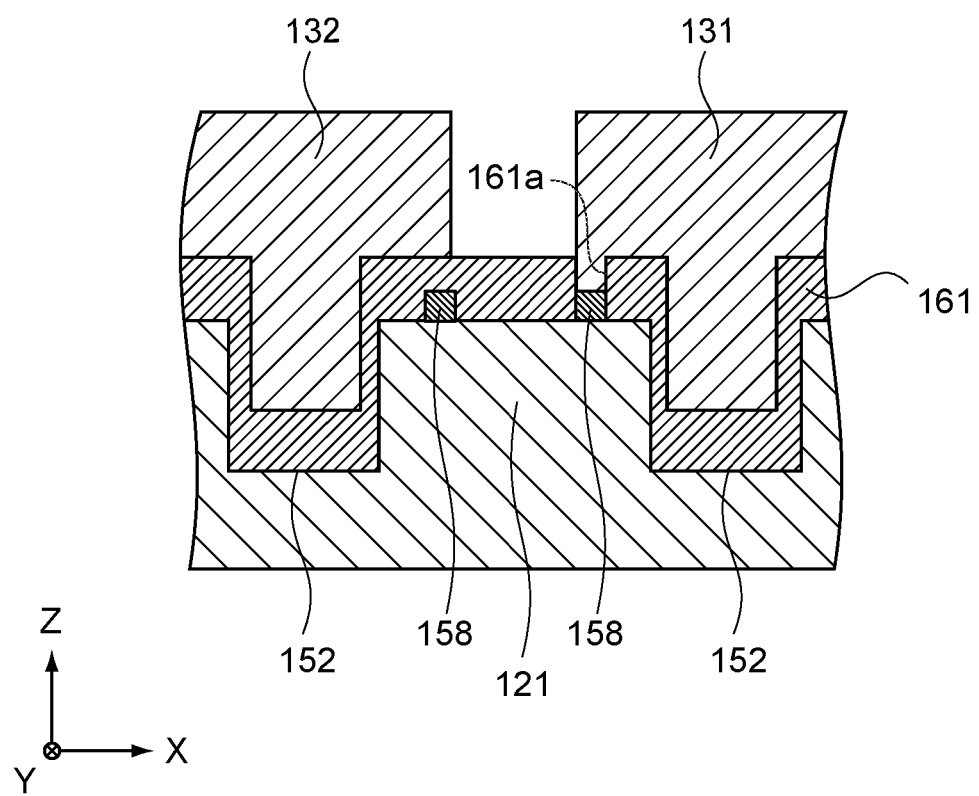
FIG. 13 is a cross-sectional view showing a connection relationship between a first light-emitting element, a first wire, and a second wire in the light-emitting element array.

The first wire 131 is electrically connected to the first light-emitting element 121, and the second wire 132 is electrically connected to the second light-emitting element 122. FIG. 13 is a cross-sectional view showing a connection relationship between the first light-emitting element 121 and the first wire 131 and the second wire 132. As shown in the figure, the first wire 131 comes into contact with the p-electrode 158 of the first light-emitting element 121 via the first through hole 161a and is electrically connected to the p-electrode 158 of the first light-emitting element 121.

Meanwhile, the second wire 132 is insulated from the p-electrode 158 of the first light-emitting element 121 by the insulation layer 161 provided between the second wire 132 and the p-electrode 158 of the first light-emitting element 121. Similarly, also the other first light-emitting elements 121 included in the light-emitting element array 100 are each electrically connected to the first wire 131 and insulated from the second wire 132.

Figure 14:
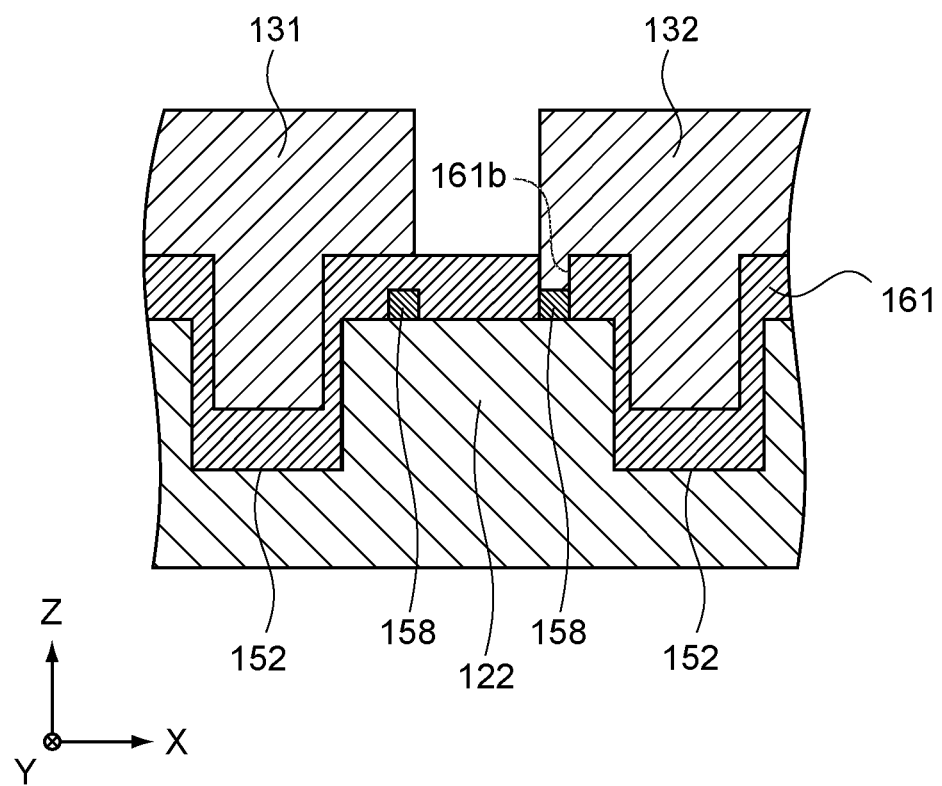
FIG. 14 is a cross-sectional view showing a connection relationship between a second light-emitting element, the first wire, and the second wire in the light-emitting element array.

FIG. 14 is a cross-sectional view showing a connection relationship between the second light-emitting element 122 and the first wire 131 and the second wire 132. As shown in the figure, the second wire 132 comes into contact with the p-electrode 158 of the second light-emitting element 122 vis the second through hole 161b and is electrically connected to the p-electrode 158 of the second light-emitting element 122. Meanwhile, the first wire 131 is insulated from the p-electrode 158 of the second light-emitting element 122 by the insulation layer 161 provided between the first wire 131 and the p-electrode 158 of the second light-emitting element 122. Similarly, also the other second light-emitting elements 122 included in the light-emitting element array 100 are each electrically connected to the second wire 132 and insulated from the first wire 131.

[Regarding Array of Light-Emitting Elements and Arrangement of Wires]

Figure 15:
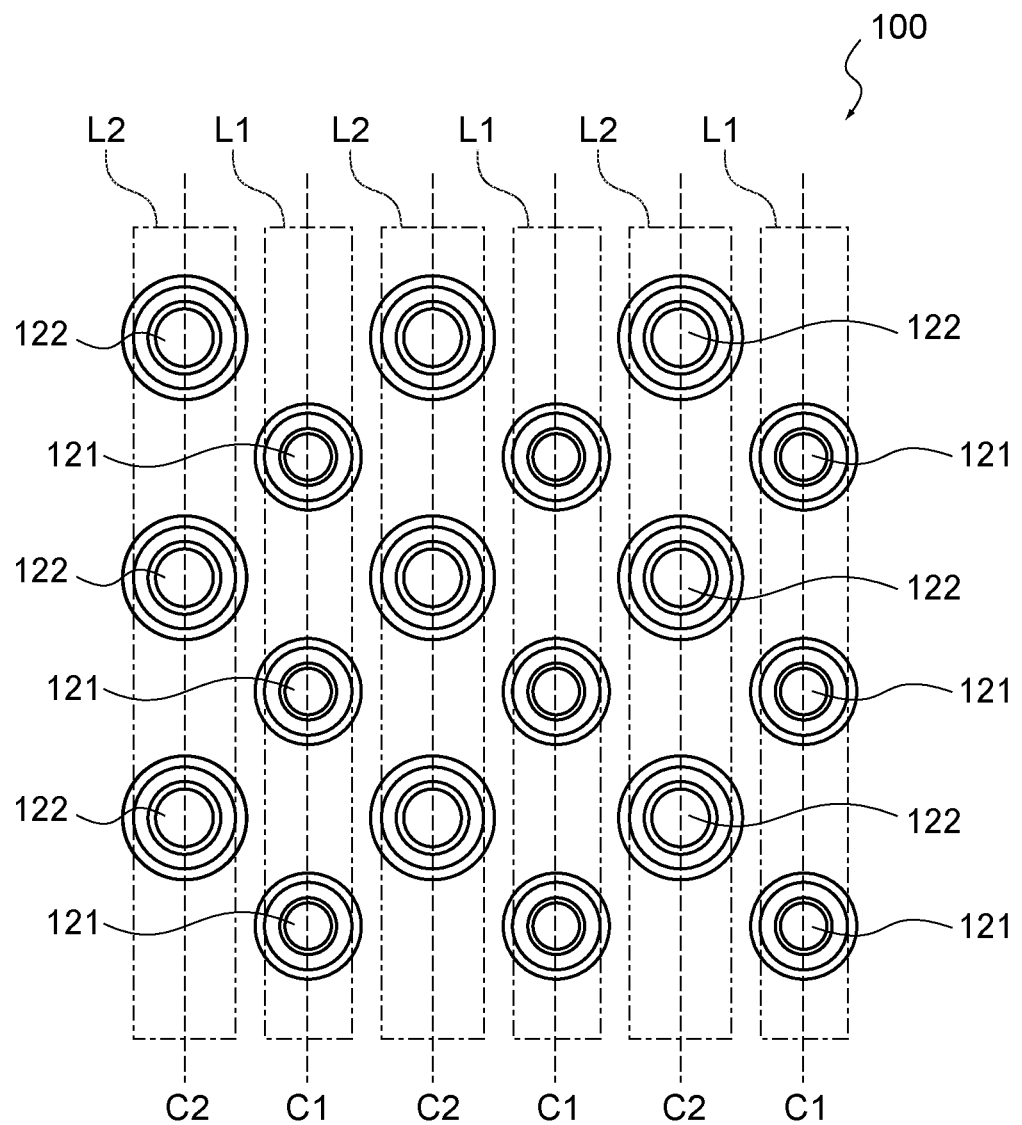
FIG. 15 is a plan view showing a light-emitting element column in the light-emitting element array.

The array of the first light-emitting element 121 and the second light-emitting element 122 in the light-emitting element array 100 will be described. FIG. 15 is a schematic diagram showing the array of the first light-emitting element 121 and the second light-emitting element 122.

As shown in the figure, the first light-emitting elements 121 are arrayed along one direction (Y direction) in the light-emitting element surface 120 to form a plurality of light-emitting element columns L1. Further, the second light-emitting elements 122 are arrayed along a direction (Y direction) parallel to the light-emitting element column L1 in the light-emitting element surface 120 to form a plurality of light-emitting element columns L2. The light-emitting element column L1 and the light-emitting element column L2 are alternately arranged and are separated from each other in a direction (X direction) orthogonal to the extending direction (Y direction). Further, the line connecting the centers of the first light-emitting elements 121 to each other is shown as a center C1 of the light-emitting element column L1, and the line connecting the centers of the second light-emitting element 122 to each other is shown as a center C2 of the light-emitting element column L2.

Figure 16:
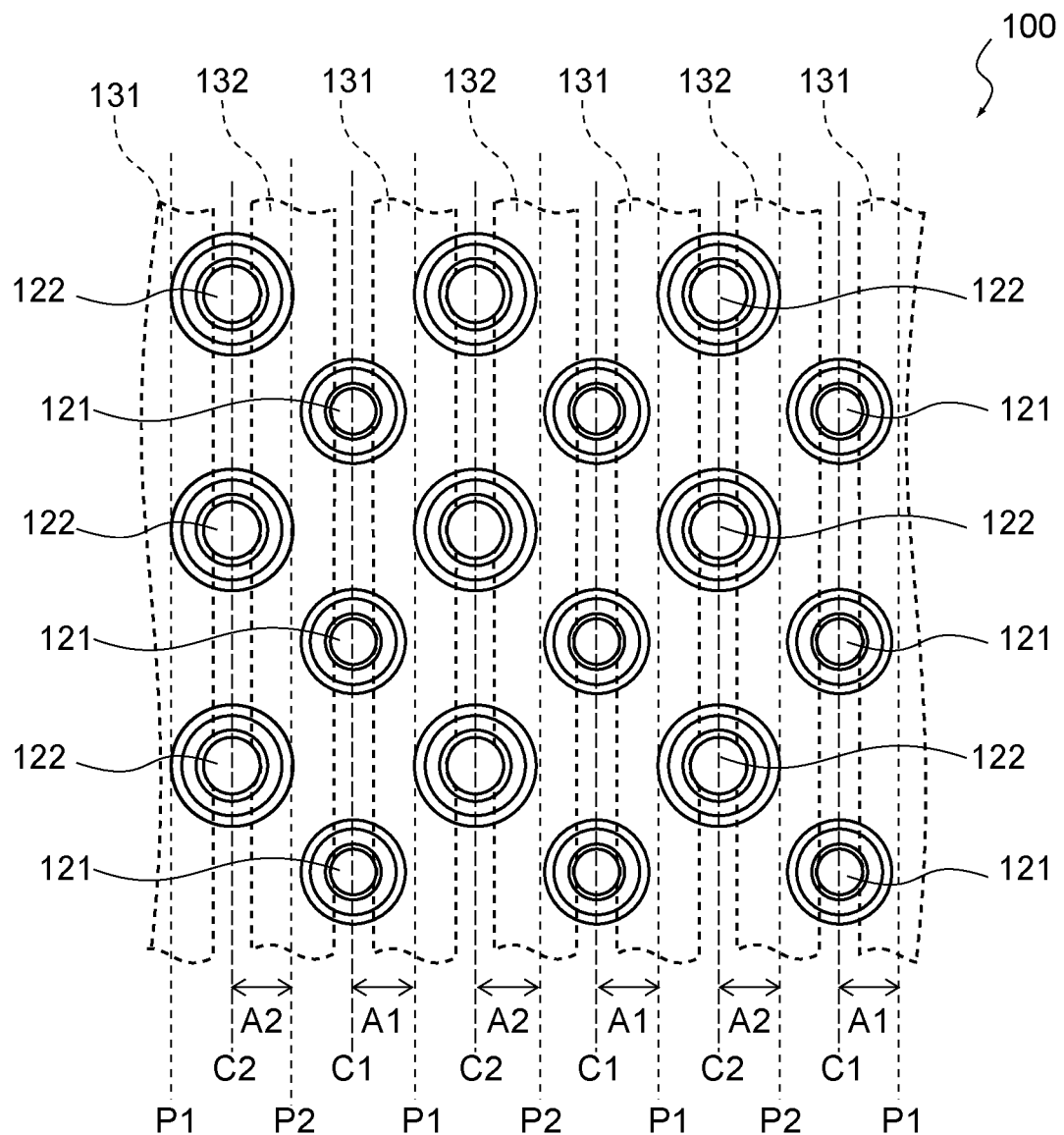
FIG. 16 is a plan view showing a positional relationship between the light-emitting element column, the first wire, and the second wire in the light-emitting element array.
Figure 17:
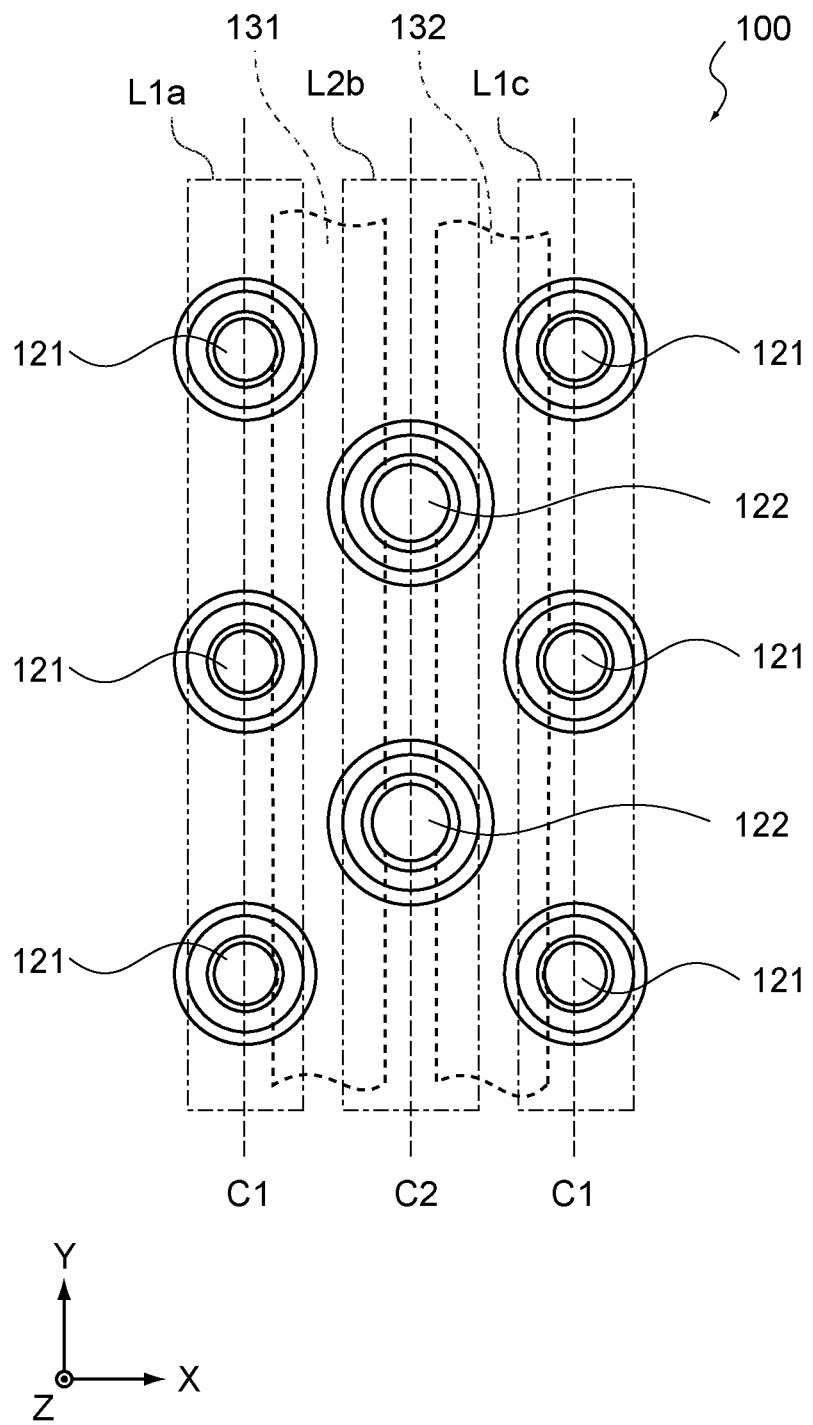
FIG. 17 is a plan view showing a positional relationship between first to third light-emitting element columns, the first wire, and the second wire in the light-emitting element array.

FIG. 16 and FIG. 17 are each a schematic diagram showing the arrangement of the first wire 131 and the second wire 132. As shown in FIG. 16, the first wire 131 and the second wire 132 are alternately provided between the center C1 of the light-emitting element column L1 and the center C2 of the light-emitting element column L2 as viewed from a direction (Z direction) perpendicular to the light-emitting element surface 120, extend along the extending direction (Y direction) of the light-emitting element column L1 and the light-emitting element column L2, and are separated from each other in a direction (X direction) orthogonal to the extending direction.

More specifically, as shown in FIG. 17, one of the light-emitting element columns L1 is defined as a first light-emitting element column L1a, and the light-emitting element column L2 adjacent to the first light-emitting element column L1a is defined as a second light-emitting element column L2b. Further, the light-emitting element column L1 provided on the side opposite to the first light-emitting element column L1a with respect to the second light-emitting element column L2b is defined as a third light-emitting element column L1c.

In this case, the first wire 131 is provided between the center C1 of the first light-emitting element column L1a and the center C2 of the second light-emitting element column L2b as viewed from the Z direction, and the second wire 132 is provided between the center C2 of the second light-emitting element column L2b and the center C1 of the third light-emitting element column L1c as viewed from the Z direction. Also the other first wires 131 and the other second wires 132 are arranged with respect to the light-emitting element columns L1 and the light-emitting element columns L2 such that a similar positional relationship is achieved.

Further, as shown in FIG. 16, the center of the first wire 131 is defined as a center P1 and the center of the second wire 132 is defined as a center P2. The center P1 is offset in the X direction with respect to the center C1 as shown by an arrow A1 and is separated from the center C1. The center P2 is offset in the X direction with respect to the center C2 as shown by an arrow A2 and is separated from the center C2.

Figure 18:
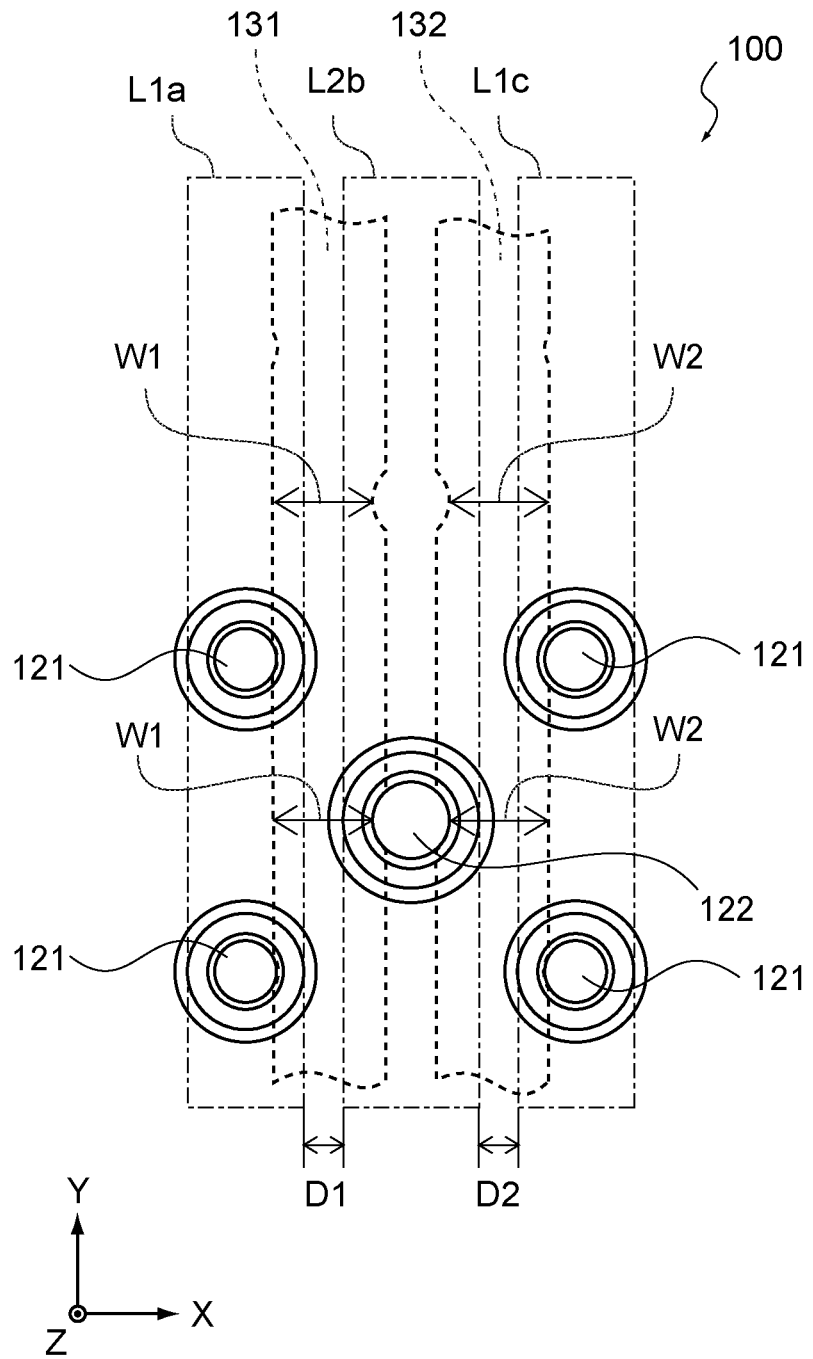
FIG. 18 is a plan view showing widths of the first wire and the second wire in the light-emitting element array.

By arranging the first wire 131 and the second wire 132 in this way, it is possible to increase the widths of the first wire 131 and the second wire 132. FIG. 18 is a schematic diagram showing the widths of the first wire 131 and the second wire 132. As shown in the figure, the minimum width of the first wire 131 in the X direction is defined as a width W1 and the minimum width of the second wire 132 in the X direction is defined as a width W2.

Further, the interval between the first light-emitting element column L1a and the second light-emitting element column L2b in the X direction is defined as D1 and the interval between the second light-emitting element column L2b and the third light-emitting element column L1c in the X direction is defined as D2. In this case, the width W1 can be larger than the interval D1 and the width W2 can be larger than the interval D2. This can be realized by causing the first wire 131 and the second wire 132 to overlap with the first light-emitting element 121 and the second light-emitting element 122, i.e., by forming the region R1 and the region R2 (see FIG. 2).

[Effects of Light-Emitting Element Array]

Figure 19:
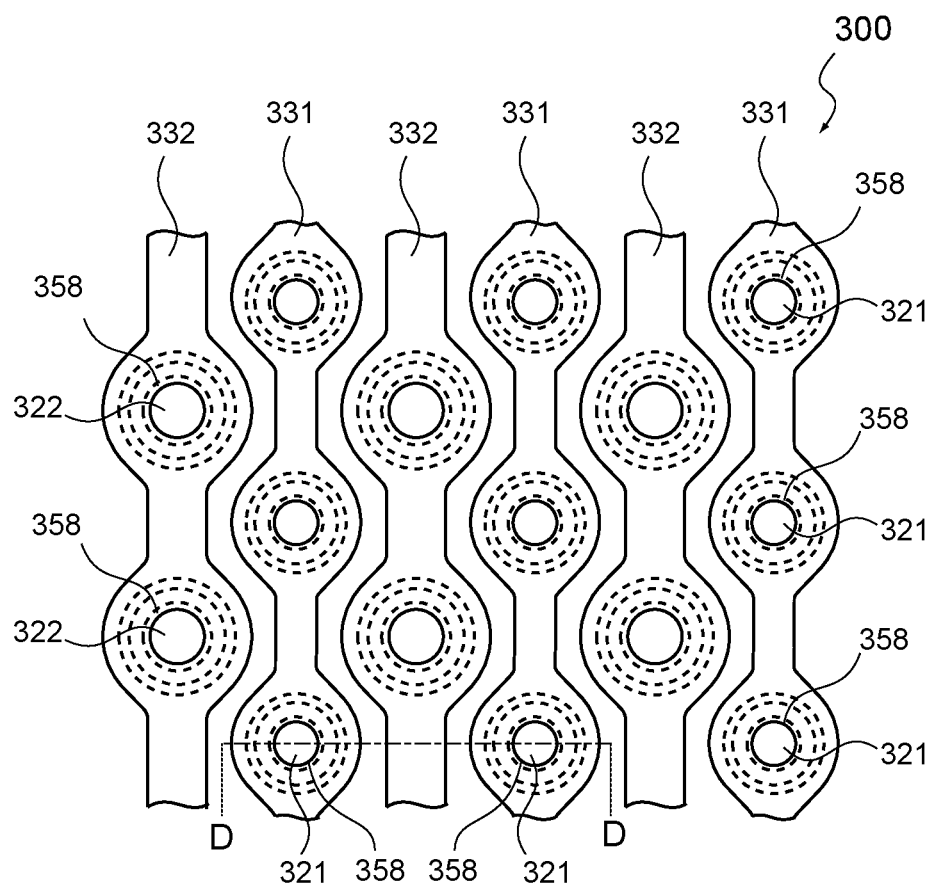
FIG. 19 is a plan view of a light-emitting element array according to a Comparative Example.
Figure 20:
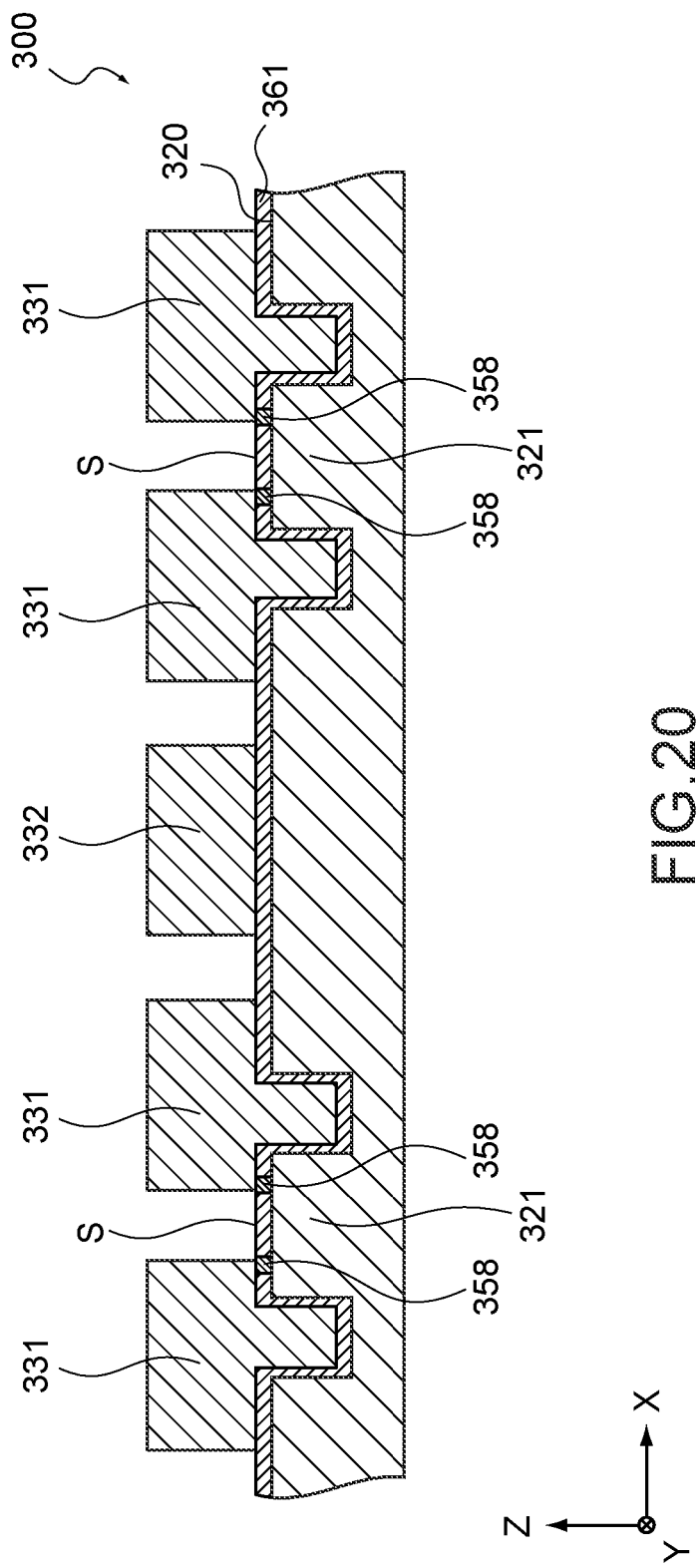
FIG. 20 is a cross-sectional view of the light-emitting element array according to the Comparative Example.

The effects of the light-emitting element array 100 will be described as compared with Comparative Example. FIG. 19 is a plan view of a light-emitting element array 300 according to a Comparative Example, and FIG. 20 is a cross-sectional view of the light-emitting element array 300. FIG. 20 is a cross-sectional view taken along the line D-D in FIG. 19.

As shown in these figures, the light-emitting element array 300 includes a first light-emitting element 321, a second light-emitting element 322, a first wire 331, and a second wire 332. The first light-emitting element 321 and the second light-emitting element 322 are arrayed in a planar manner to form a light-emitting element surface 320. The first light-emitting elements 321 and the second light-emitting elements 322 are each arrayed along one direction (Y direction) on the light-emitting element surface 320 to form a plurality of light-emitting element columns.

As shown in FIG. 20, the first wire 331 and the second wire 332 are formed on the light-emitting element surface 320 via an insulation layer 361. As shown in FIG. 19, the first wire 331 extends on the column of the first light-emitting elements 321 and is electrically connected to a p-electrode 358 of the first light-emitting element 321 as shown in FIG. 20. As a result, the first light-emitting element 321 emits light by the drive current supplied from the first wire 331. The first wire 331 is provided on the peripheral edge of the first light-emitting element 321 so as not to shield the light-emitting surface S on the first light-emitting element 321.

As shown in FIG. 19, the second wire 332 extends on the column of the second light-emitting elements 322 and is electrically connected to the p-electrode 358 of the second light-emitting element 322, similarly to the first wire 331. As a result, the second light-emitting element 322 emits light by the drive current supplied from the second wire 332. The second wire 332 is provided on the peripheral edge of the second light-emitting element 322 so as not to shield the light-emitting surface S on the second light-emitting element 322.

with such a structure of the light-emitting element array 300, since the first wire 331 and the second wire 332 do not shield the light-emitting surface S and it is necessary to maintain the interval between adjacent wires in order to prevent a short circuit, it is difficult to increase the width of the wire. For this reason, when the number of arrays of light-emitting elements increases or the density of light-emitting elements increases, the influence of the wiring resistance becomes large and a problem that the amount of light emitted on the downstream side of the wire decreases occurs. Further, it is not easy to increase the thickness of the wire from the viewpoint of the production process.

By providing a multilayer structure of the first wire 331 and the second wire 332 via an insulation layer instead of forming these layers in the same layer, it is possible to increase the width of the wire but the production process is complicated. Further, in the case of providing a multilayer structure, there is a problem that the light-emitting properties vary due to the increased thickness of the insulation layer on the light-emitting element.

Meanwhile, in the light-emitting element array 100, the first wire 131 and the second wire 132 are arranged so as to overlap with the first light-emitting element 121 and the second light-emitting element 122 (see FIG. 2). As a result, it is possible to increase the widths of the wires while forming the first wire 131 and the second wire 132 in the same layer and suppress the wiring resistance of the first wire 131 and the second wire 132.

Further, in the case of making the widths of the first wire 131 and the second wire 132 the same as those in the Comparative Example, it is possible to bring the light-emitting elements and the wirings closer to each other and improve the density thereof. Further, since the first wire 131 and the second wire 132 are in the same layer, the production process is not complicated and it is possible to suppress the influence on the light-emitting properties.

[Regarding Groove Structure]

Figure 21:
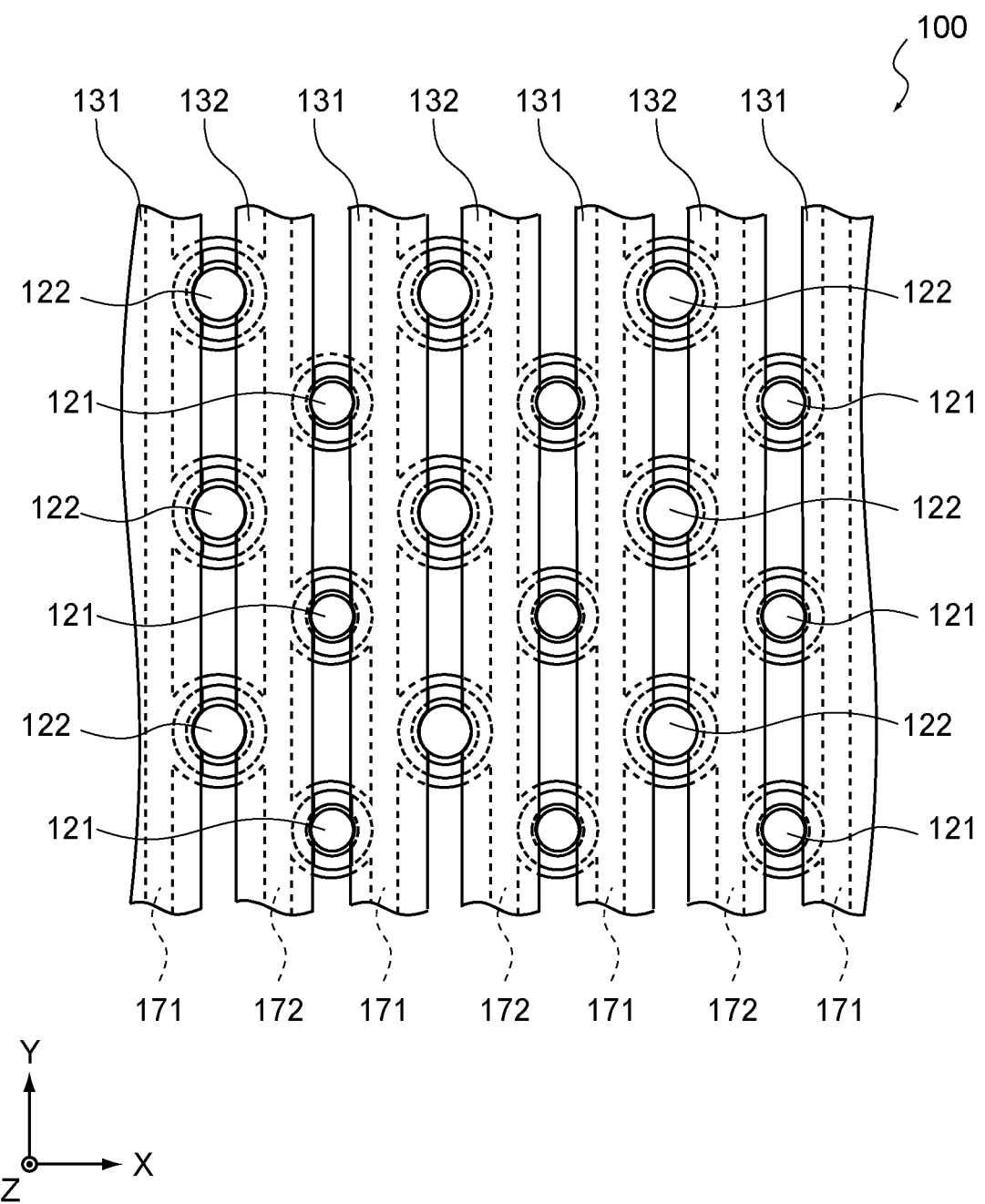
FIG. 21 is a plan view of a light-emitting element array in which a groove portion is provided according to an embodiment of the present technology.
Figure 22:
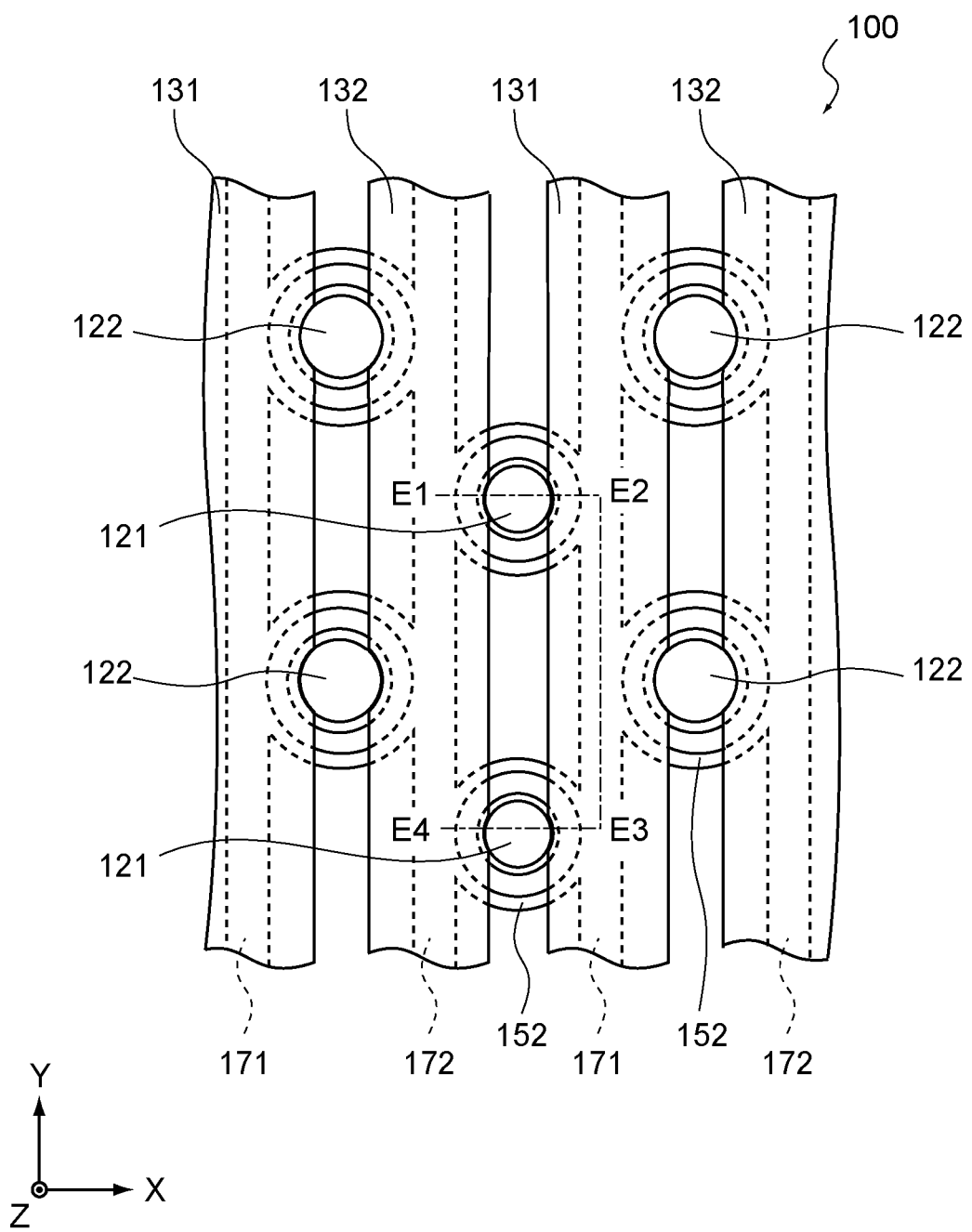
FIG. 22 is an enlarged plan view of the light-emitting element array.
Figure 23:
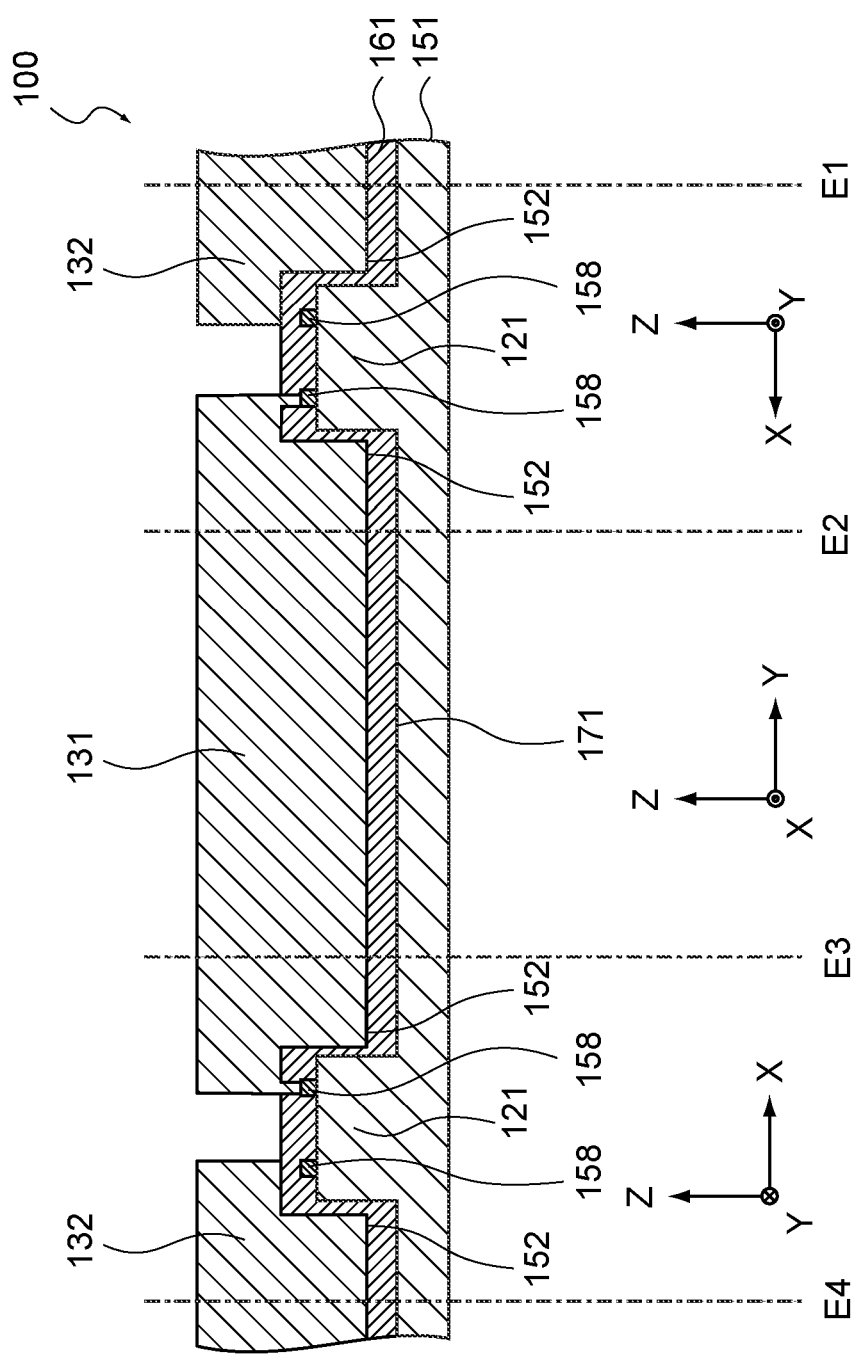
FIG. 23 is a cross-sectional view of the light-emitting element array.

The light-emitting element array 100 may include groove portions for the first wire 131 and the second wire 132 in addition to the configuration described above. FIG. 21 is a plan view of the light-emitting element array 100 including a groove portion, and FIG. 22 is an enlarged view of FIG. 21. FIG. 23 is a cross-sectional view of this light-emitting element array 100 and is a cross-sectional view taken along the line E1 to E4 in FIG. 22.

Figure 24:
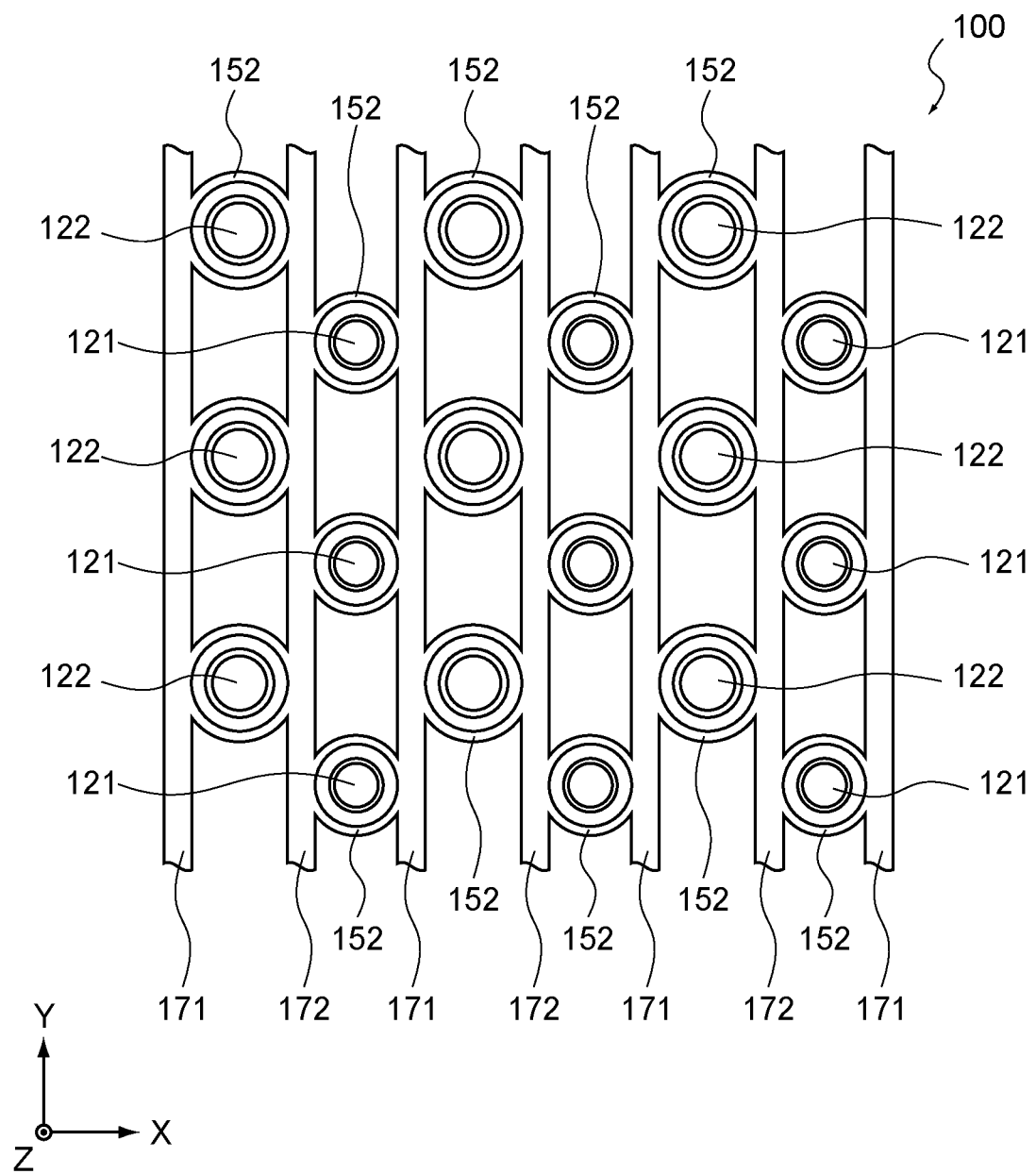
FIG. 24 is a plan view of a partial configuration of the light-emitting element array.

FIG. 24 is a plan view of this light-emitting element array 100 in which illustration of the first wire 131 and the second wire 132 is omitted. As shown in the figure, a first groove portion 171 that connects between the recessed portions 152 (see FIG. 8) of the first light-emitting element 121 and a second groove portion 172 that connects between the recessed portions 152 (see FIG. 8) of the second light-emitting element 122 are provided in the substrate 151. As shown in FIG. 24, the first groove portion 171 may be connected also to the recessed portion 152 of the second light-emitting element 122 and does not necessarily need to be connected thereto. Further, the second groove portion 172 may be connected to the recessed portion 152 of the first light-emitting element 121 and does not necessarily need to be connected thereto.

As shown in FIG. 23, the first wire 131 is formed in the first groove portion 171 continuously from the recessed portion 152 of the first light-emitting element 121 and is continuous with the recessed portion 152 of the adjacent first light-emitting element. Similarly, also the second wire 132 is formed in the second groove portion 172 continuously from the recessed portion 152 of the second light-emitting element 122 and is continuous with the recessed portion 152 of the adjacent second light-emitting element.

As a result, the thickness of each of the first wire 131 and the second wire 132 increases as compared with the case where the first groove portion 171 and the second groove portion 172 are not provided, and it is possible to further suppress the wiring resistance and contribute to the increase in the density of light-emitting elements and wires.

Modified Example

Figure 25:
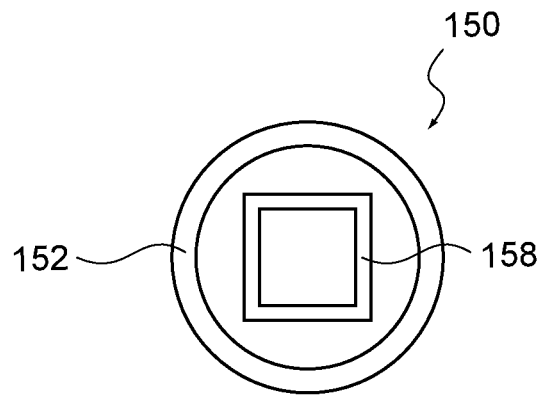
FIG. 25 is a plan view of a light-emitting element constituting a light-emitting element array according to a modified example of the present technology.
Figure 26:
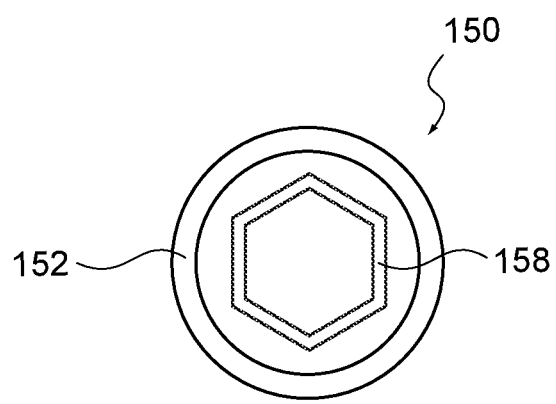
FIG. 26 is a plan view of the light-emitting element constituting the light-emitting element array according to the modified example of the present technology.

Although the p-electrode 158 has an annular shape (see FIG. 7) as described above, the p-electrode 158 may have another shape. FIG. 25 to FIG. 31 are each a schematic diagram showing another shape of the p-electrode 158. The p-electrode 158 may have a rectangular annular shape as viewed from a direction (Z direction) perpendicular to the light-emitting element surface 120 as shown in FIG. 25, or may have a hexagonal annular shape as viewed from the Z direction as shown in FIG. 26. Further, the p-electrode 158 may have a polygonal shape or another annular shape as viewed from the Z direction.

Figure 27:
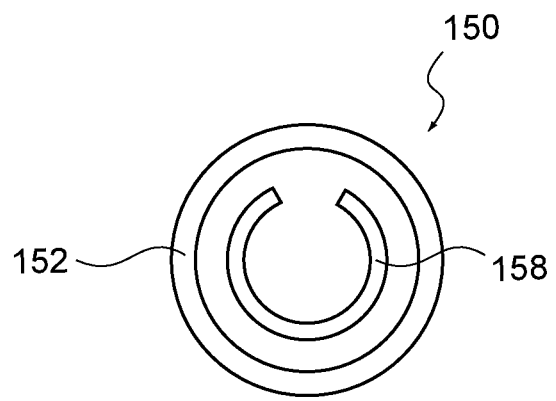
FIG. 27 is a plan view of the light-emitting element constituting the light-emitting element array according to the modified example of the present technology.
Figure 28:
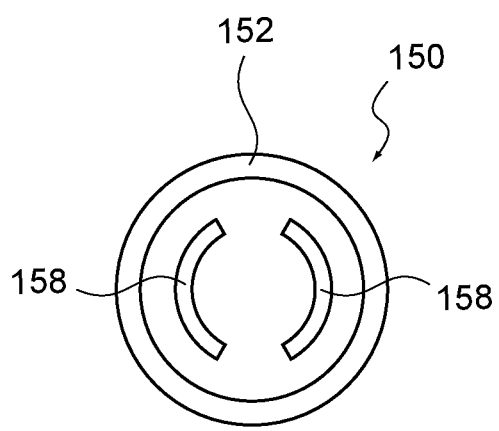
FIG. 28 is a plan view of the light-emitting element constituting the light-emitting element array according to the modified example of the present technology.
Figure 29:
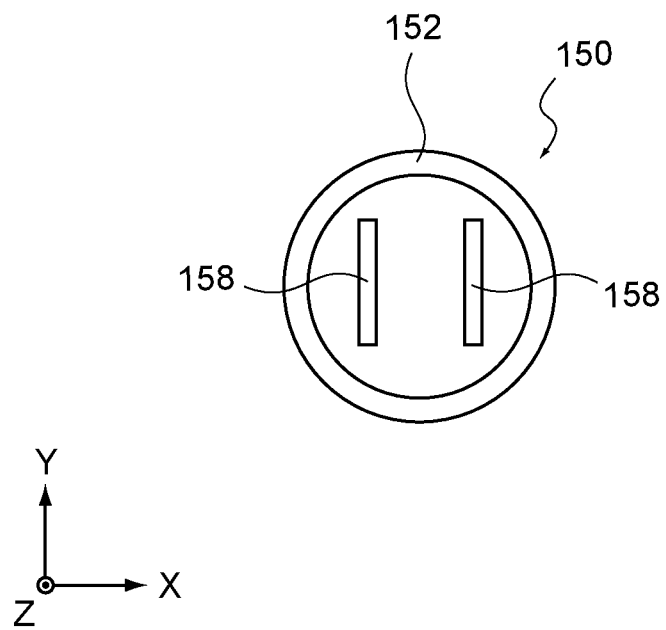
FIG. 29 is a plan view of the light-emitting element constituting the light-emitting element array according to the modified example of the present technology.

Further, as shown in FIG. 27, the p-electrode 158 may have a C-shape as viewed from a direction (Z direction) perpendicular to the light-emitting element surface 120 or may have various annular shapes from which part thereof is missing. Further, the p-electrode 158 may have a pair of arc shapes facing each other as viewed from the Z direction as shown in FIG. 28 or may have a pair of linear shapes facing each other as viewed from the Z direction as shown in FIG. 29.

Figure 30:
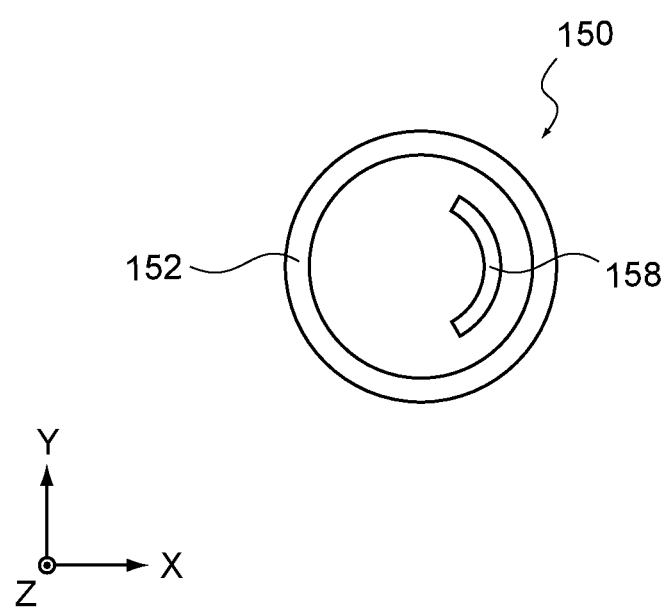
FIG. 30 is a plan view of the light-emitting element constituting the light-emitting element array according to the modified example of the present technology.
Figure 31:
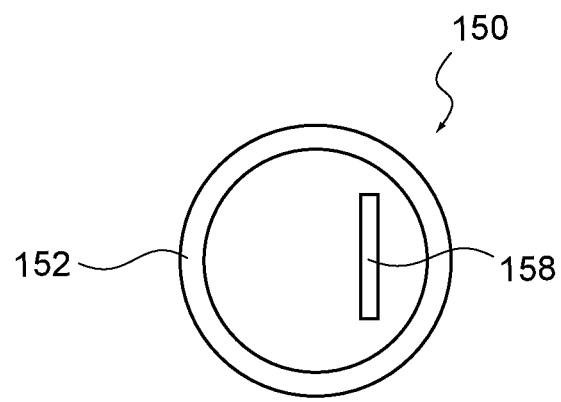
FIG. 31 is a plan view of the light-emitting element constituting the light-emitting element array according to the modified example of the present technology.

Further, the p-electrode 158 may have one arc shape as viewed from the Z direction as shown in FIG. 30 or may have one linear shape as viewed from the Z direction as shown in FIG. 31. In the case of the shapes shown in FIG. 30 and FIG. 31, the p-electrode 158 is provided at a position overlapping with the first wire 131 or the second wire 132 to be connected (see FIG. 3 and FIG. 4) as viewed from the Z direction. In addition to the above, the p-electrode 158 may have various shapes.

Figure 32:
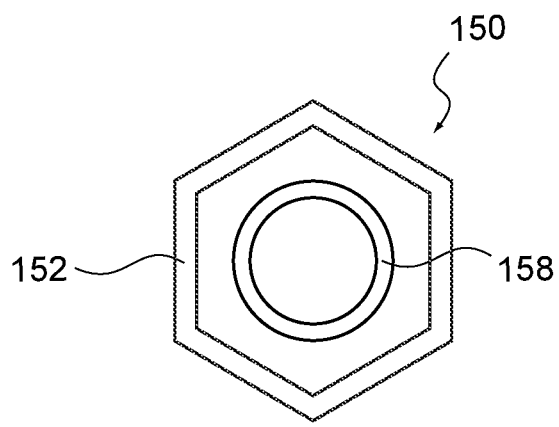
FIG. 32 is a plan view of the light-emitting element constituting the light-emitting element array according to the modified example of the present technology.
Figure 33:
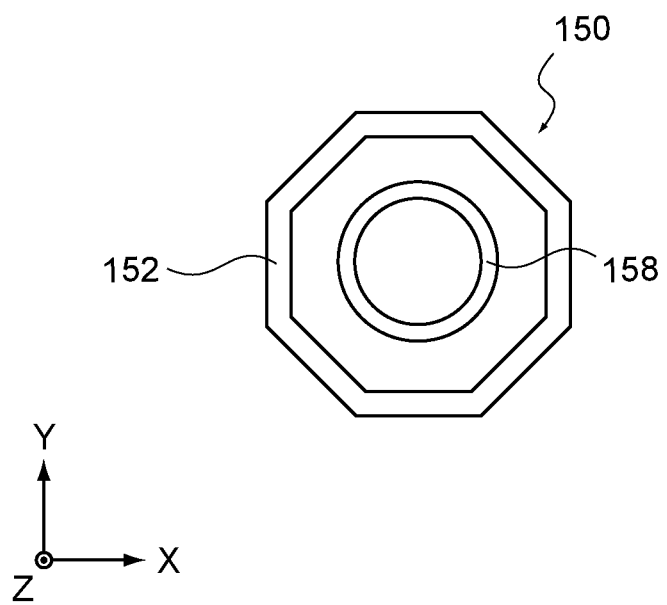
FIG. 33 is a plan view of the light-emitting element constituting the light-emitting element array according to the modified example of the present technology.
Figure 34:
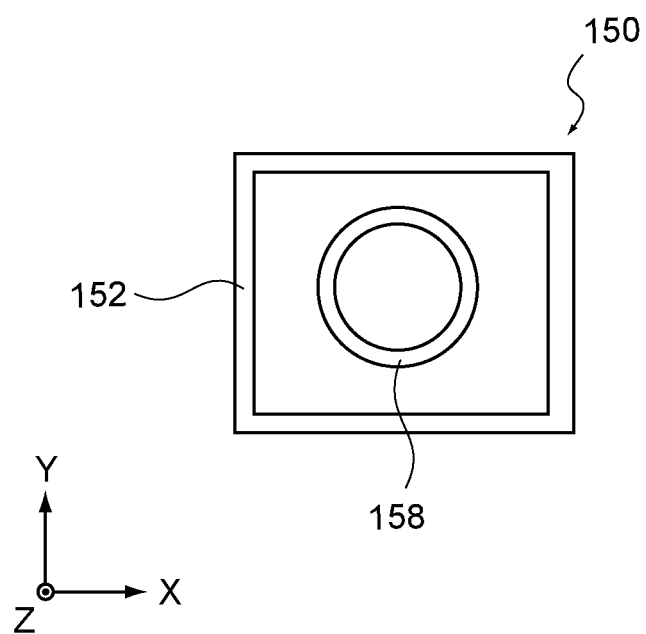
FIG. 34 is a plan view of the light-emitting element constituting the light-emitting element array according to the modified example of the present technology.

Further, although the light-emitting element 150 has been described to include the mesa 153 having a cylindrical shape (see FIG. 7), the shape of the mesa 153 is not limited to a cylindrical shape. FIG. 32 to FIG. 34 are each a schematic diagram showing another shape of the mesa 153.

The mesa 153 may have a hexagonal column shape as shown in FIG. 32 or may have an octagonal column shape as shown in FIG. 33. Further, the mesa 153 may have a quadrangular column shape as shown in FIG. 34. In addition, the mesa 153 can have a polygonal column shape including a pentagonal column shape and a heptagonal column shape, or another columnar shape.

Figure 35:
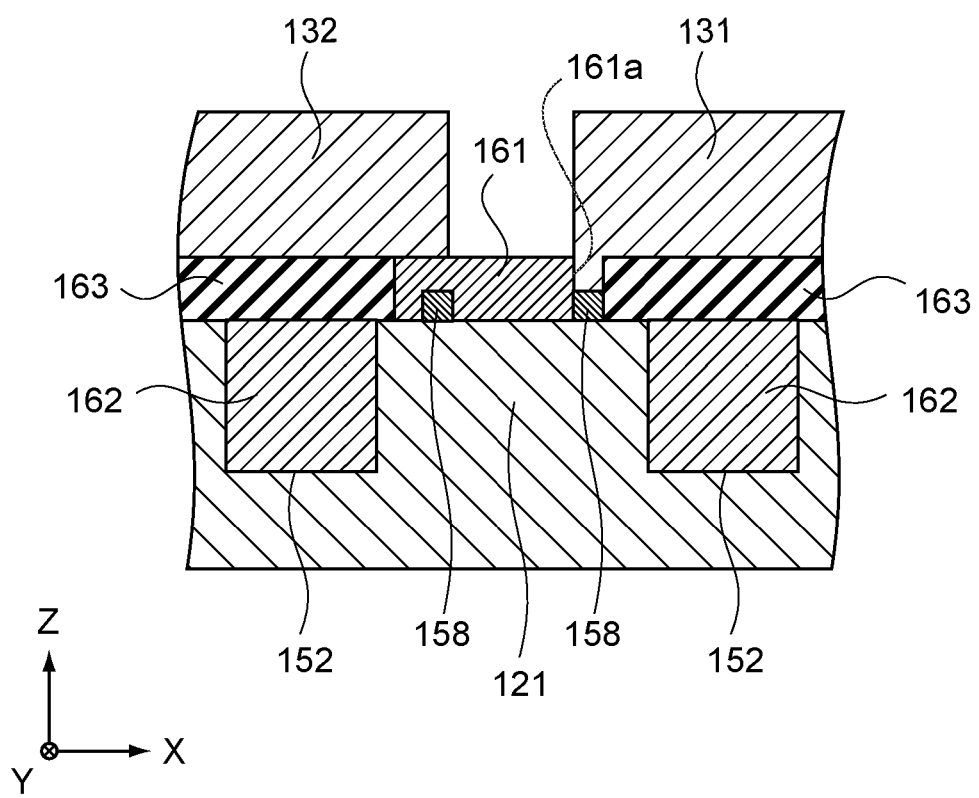
FIG. 35 is a cross-sectional view of the light-emitting element array according to the modified example of the present technology.

Further, although the first wire 131 and the second wire 132 have been described to be formed in the recessed portion 152 (see FIG. 13) together with the insulation layer 161, the present technology is not limited thereto. FIG. 35 is a schematic diagram showing another configuration in the recessed portion 152. As shown in the figure, an embed material 162 may be embedded in the recessed portion 152 and may be covered with an insulation film 163. The first wire 131 and the second wire 132 can be formed on the insulation film 163. Further, in the case where the embed material 162 is formed of an insulating material, the insulation film 163 does not need to be provided.

Further, in the case where the embed material 162 is formed of a metal material, the embed material 162 may be used as the first wire 131 or the second wire 132 without providing the insulation film 163. However, in this case, the embed material 162 can be used as only one of the first wire 131 and the second wire 132, and the other wire needs to be provided on the insulation film 163.

Figure 36:
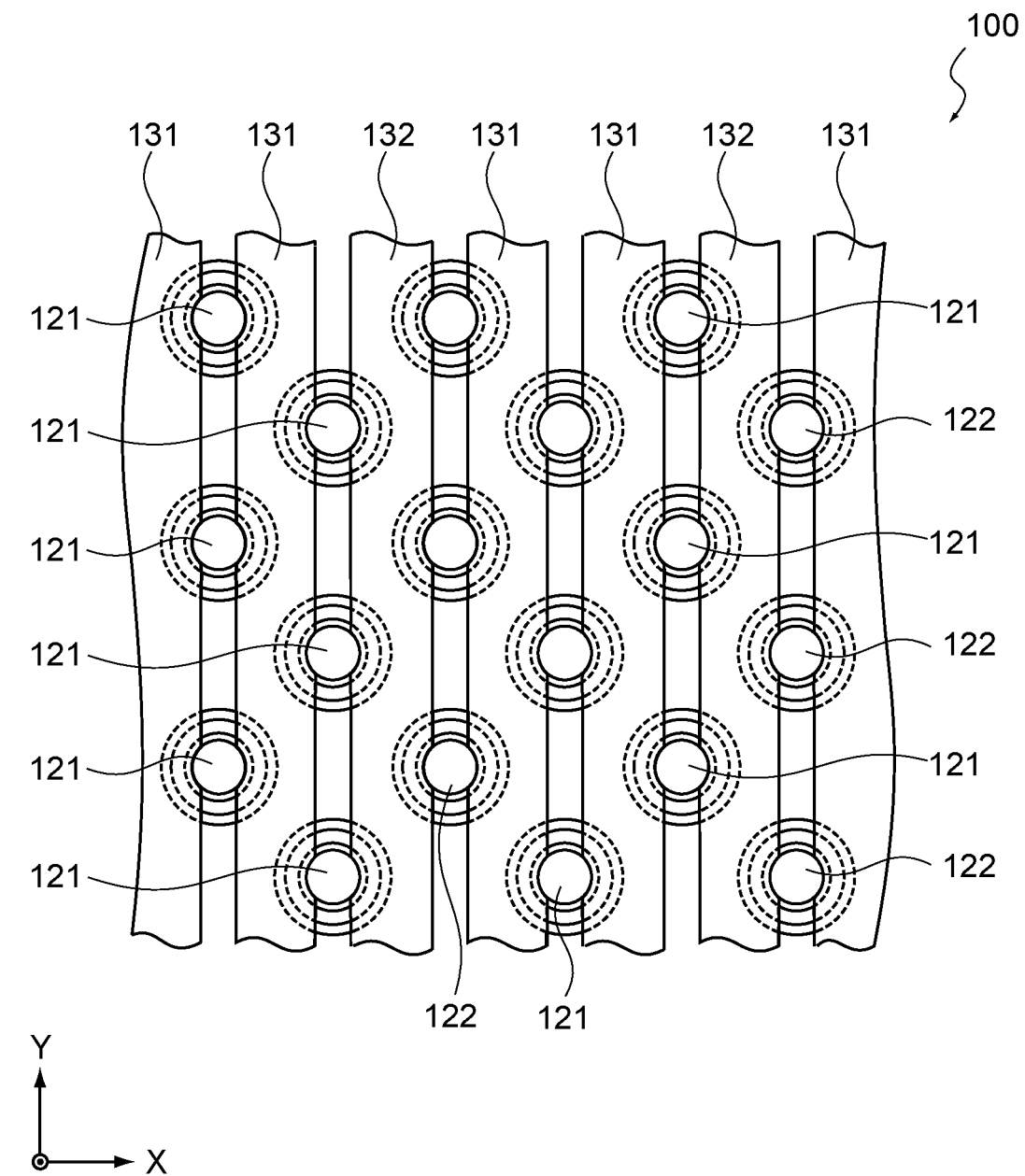
FIG. 36 is a plan view of the light-emitting element array according to the modified example of the present technology.
Figure 37:
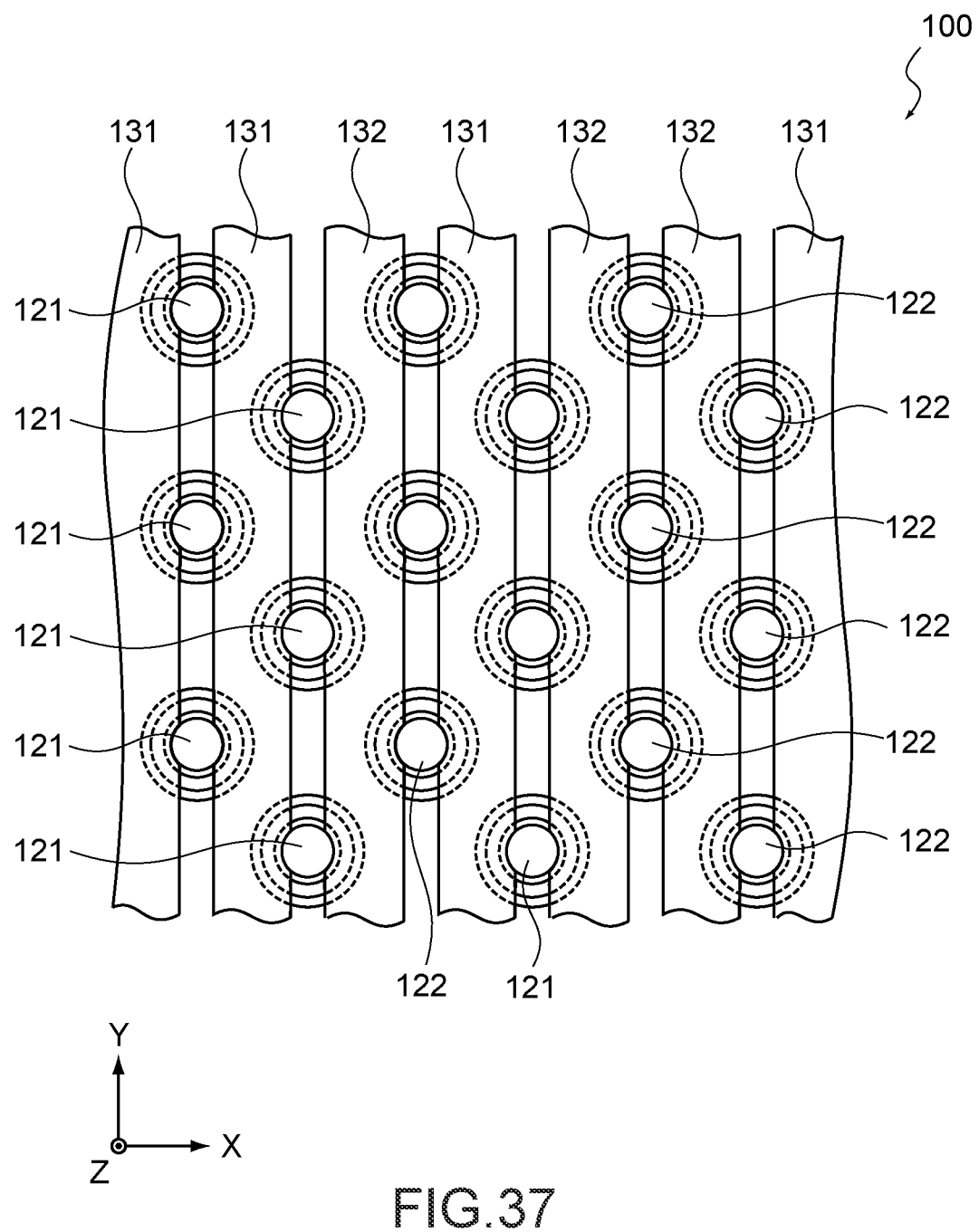
FIG. 37 is a plan view of the light-emitting element array according to the modified example of the present technology.

Further, although the first wire 131 and the second wire 132 have been described to be alternately arranged (see FIG. 1), the present technology is not limited thereto. FIG. 36 and FIG. 37 are each a schematic diagram showing another arrangement of the first wire 131 and the second wire 132. The first wire 131 and the second wire 132 may be arranged as shown in these figures. As shown in FIG. 36 and FIG. 37, the plurality of first wire 131 is adjacent to each other, the plurality of adjacent first wires 131 may be used as one first wire 131. Similarly, in the case where the plurality of second wires 132 is adjacent to each other, the plurality of adjacent second wires 132 may be used as one second wire 132.

Further, although the light-emitting element column L1 and the light-emitting element column L2 have been described as a linear column extending in the Y direction, the present technology is not limited thereto. The light-emitting element column L1 and the light-emitting element column L2 may extend in a curved shape, a spiral shape, a comb tooth shape, or the like. Also in this case, the first wire 131 and the second wire 132 each have the regions R1 and R2 (see FIG. 2) overlapping with the first light-emitting element 121 and the second light-emitting element 122 and make it possible to increase the density of light-emitting elements and wires.

[Usage Example of Light-Emitting Element Array]

The light-emitting element array 100 can be used for a distance measurement light source device or the like capable of emitting short-distance light and long-distance light because the first light-emitting element 121 and the second light-emitting element 122 can be caused to independently emit light as described above.

[Regarding Third Light-Emitting Element and Fourth Light-Emitting Element]

Figure 38:
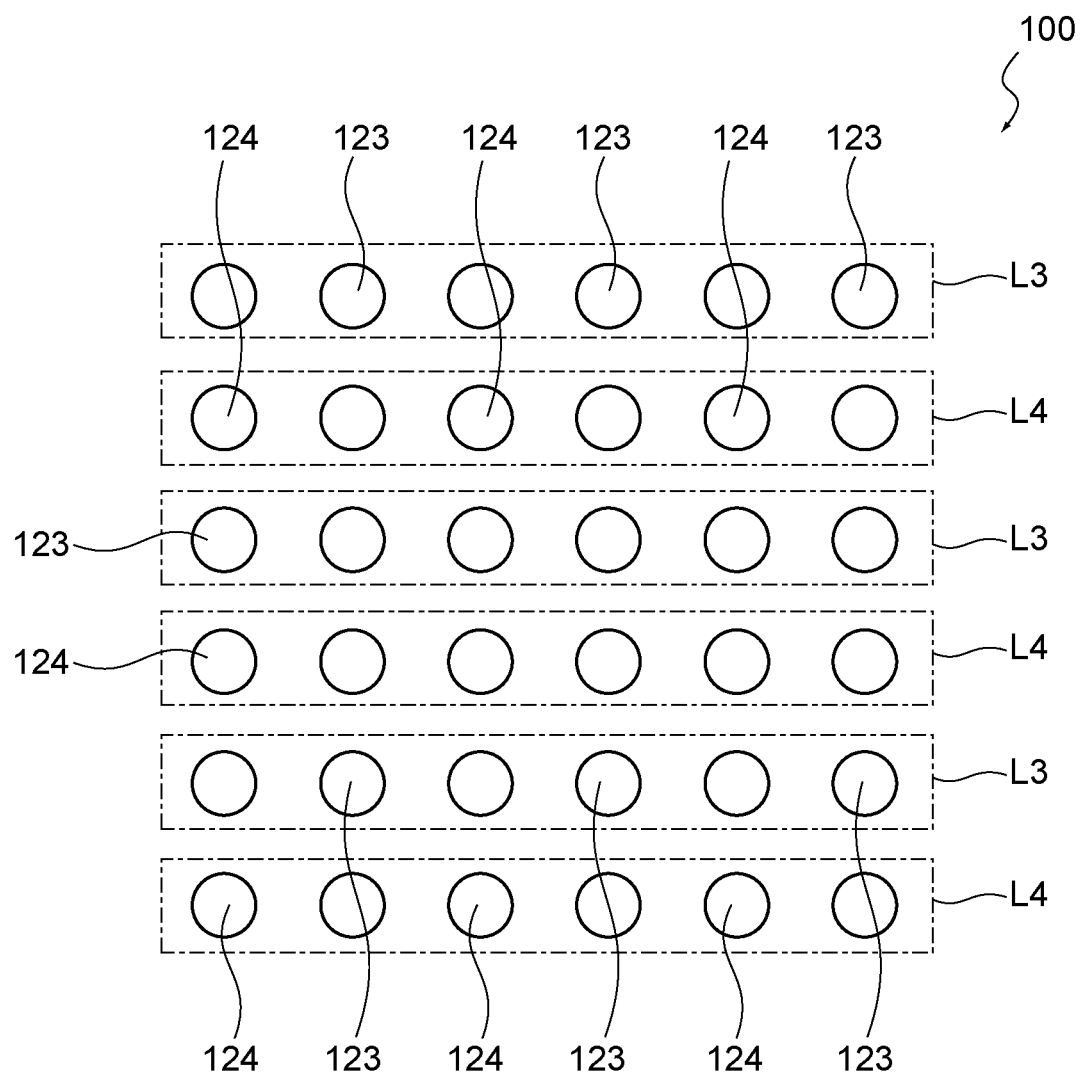
FIG. 38 is a plan view of a light-emitting element array that includes a third light-emitting element and a fourth light-emitting element according to an embodiment of the present technology.

As described above, the light-emitting element group constituting the light-emitting element array 100 includes the first light-emitting element 121 and the second light-emitting element 122. Further, the light-emitting element group constituting the light-emitting element array 100 can include a third light-emitting element 123 and a fourth light-emitting element 124. FIG. 38 is a plan view of the light-emitting element array 100 that includes the third light-emitting element 123 and the fourth light-emitting element 124.

As shown in the figure, the third light-emitting elements 123 are arrayed along one direction in the light-emitting element surface 120 to form a plurality of light-emitting element columns L3. Further, the fourth light-emitting elements 124 are arrayed along a direction parallel to the light-emitting element column L3 in the light-emitting element surface 120 to form a plurality of light-emitting element columns L4. The light-emitting element column L3 and the light-emitting element column L4 are alternately arranged and are separated from each other in a direction orthogonal to the extending direction.

Figure 39:
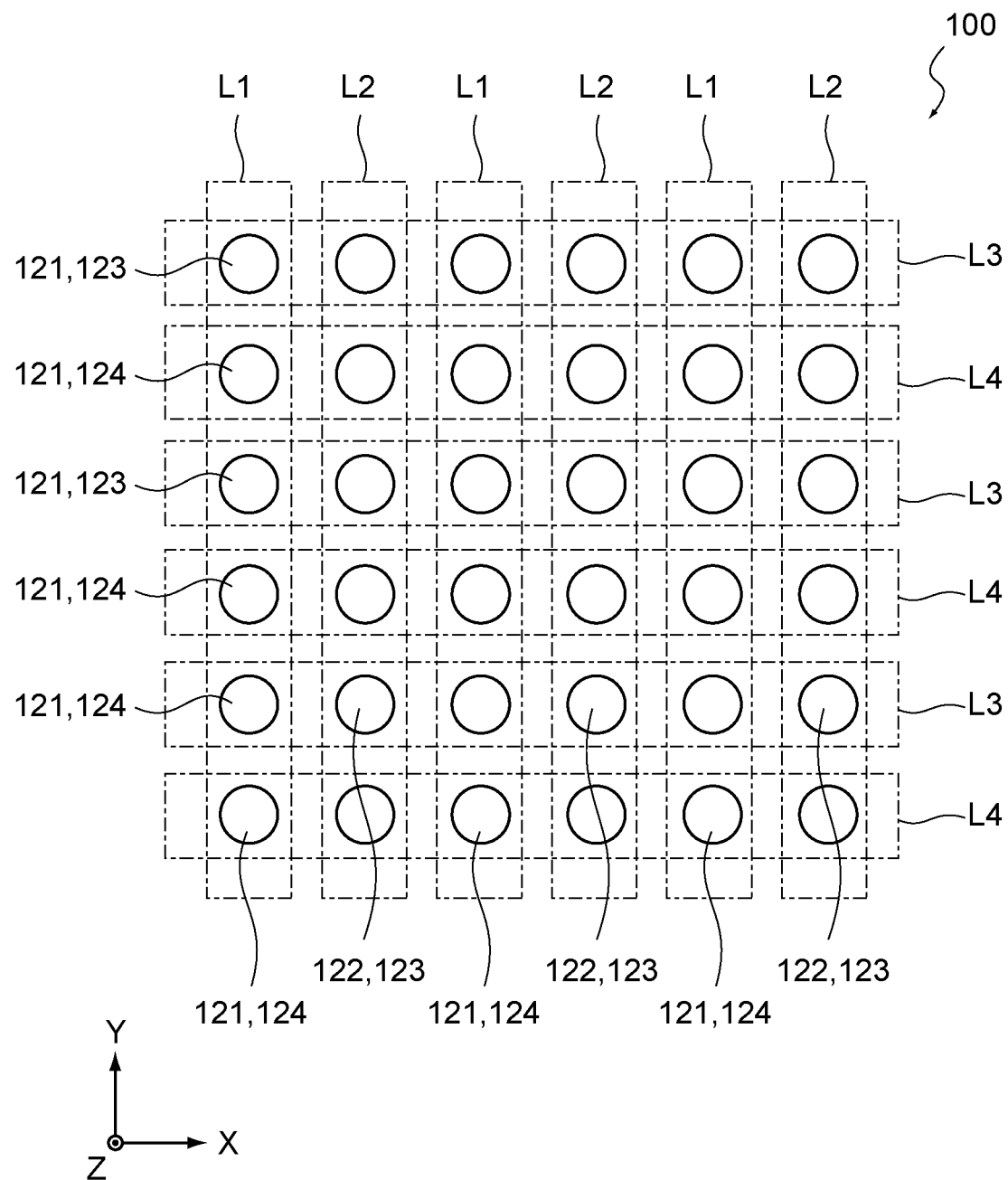
FIG. 39 is a schematic diagram showing a light-emitting element column of the light-emitting element array.

FIG. 39 is a schematic diagram showing a relationship between the light-emitting element column L1 and the light-emitting element column L2 and the light-emitting element column L3 and the light-emitting element column L4. As shown in FIG. 39, the light-emitting element column L3 and the light-emitting element column L4 extend in a direction (X direction) orthogonal to the extending direction (Y direction) of the light-emitting element column L1 and the light-emitting element column L2. Therefore, the third light-emitting elements 123 include some of the first light-emitting elements 121 and some of the second light-emitting elements 122, and the fourth light-emitting elements 124 include the others of the first light-emitting element 121 and the others of the second light-emitting element 122.

The first light-emitting element 121 and the second light-emitting element 122 are defined by whether the wire connected to the p-side (see FIG. 8) of each light-emitting element 150 is the first wire 131 or the second wire 132 as described above. Meanwhile, the third light-emitting element 123 and the fourth light-emitting element 124 are defined by the wire connected to the n-side of each light-emitting element 150 as described below. The wiring structure on this n-side will be described below.

[Wiring Structure 1 on N-Side]

Although the n-electrode 159 has been provided on the surface of the substrate 151 on the side opposite to the light-emitting element 150 (see FIG. 8) and the electrical connection has been made on the n-side of the light-emitting element 150 via the n-electrode 159 in the light-emitting element array 100 in the above description, the electrical connection on the n-side can be made as follows.

Figure 40:
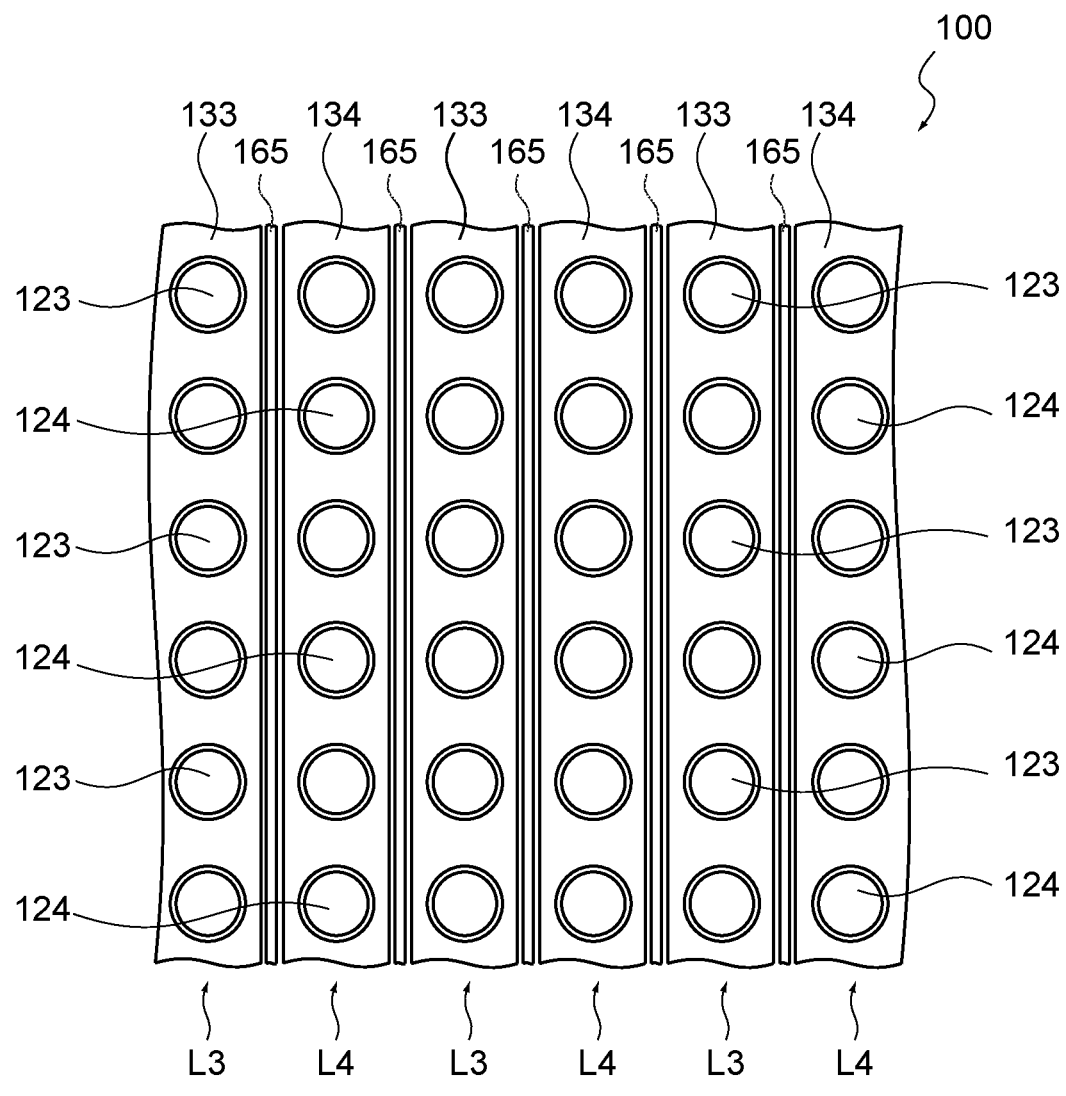
FIG. 40 is a plan view of the light-emitting element array showing a third wire and a fourth wire.
Figure 41:
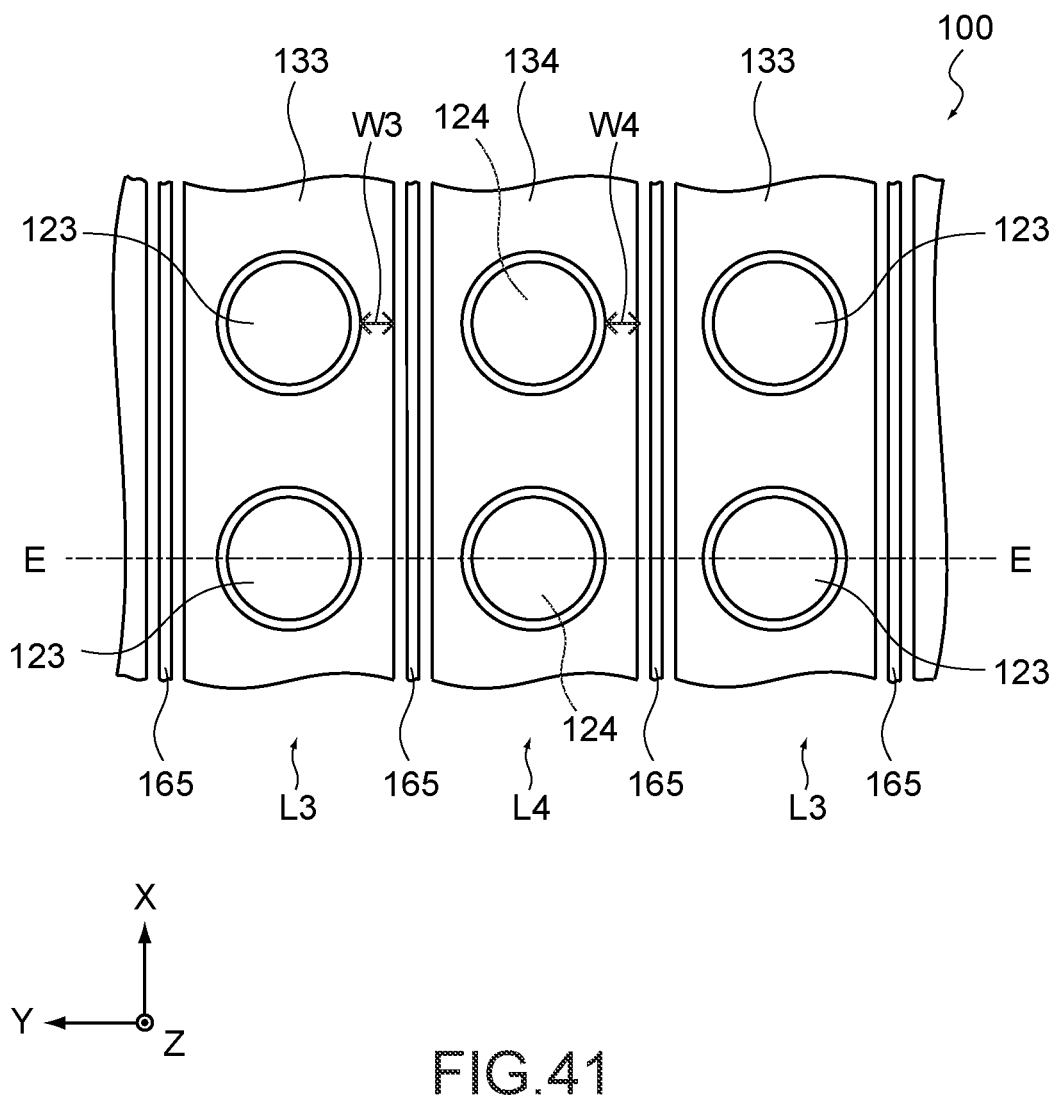
FIG. 41 is an enlarged plan view of the light-emitting element array showing the third wire and the fourth wire.
Figure 42:
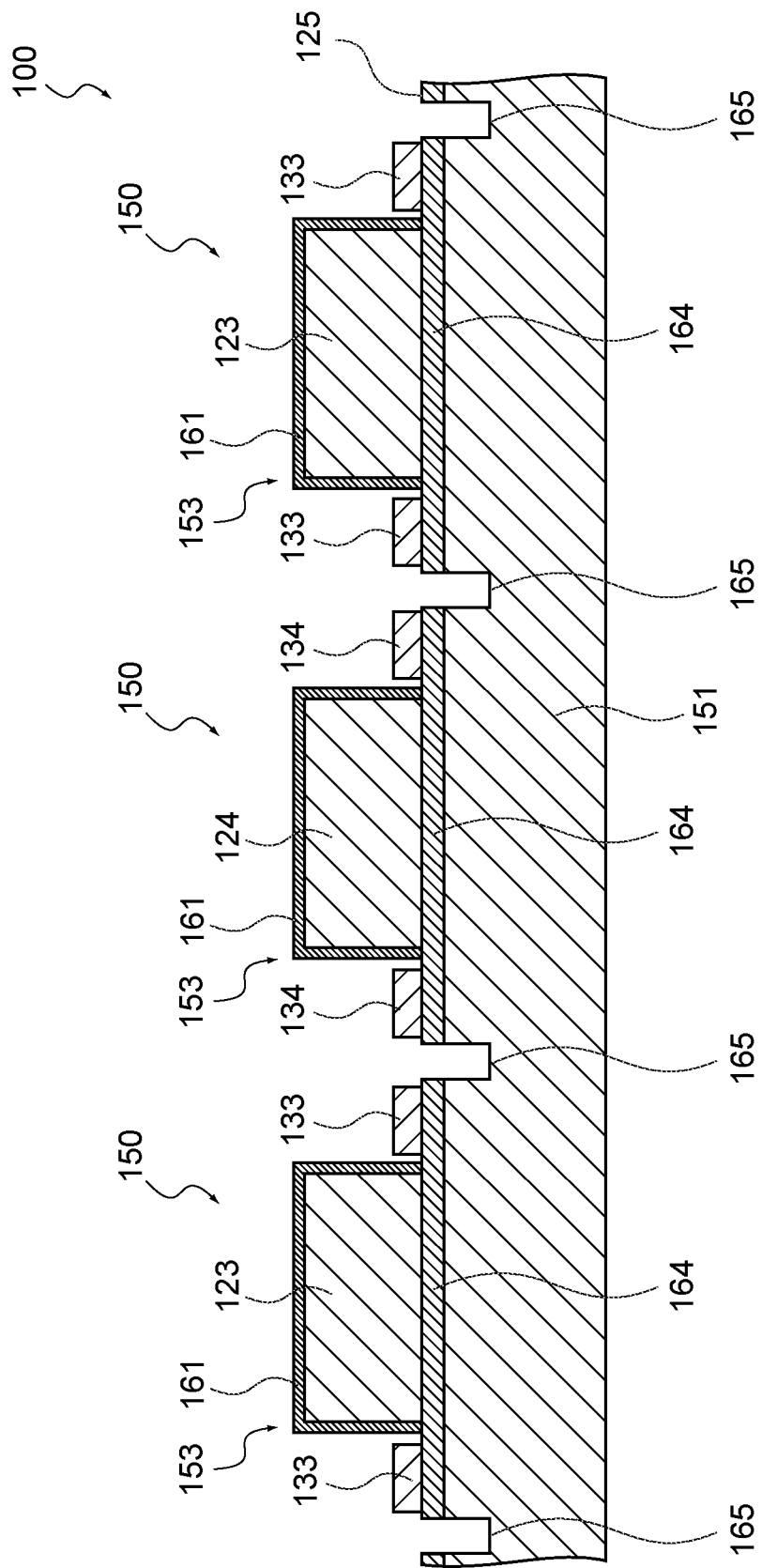
FIG. 42 is a cross-sectional view of the light-emitting element array showing the third wire and the fourth wire.

FIG. 40 is a plan view showing a wiring structure on the n-side of the light-emitting element array 100, and FIG. 41 is an enlarged view of FIG. 40. FIG. 42 is a cross-sectional view of the light-emitting element array 100 and is a cross-sectional view taken along the line E-E in FIG. 41. As shown in these figures, the light-emitting element array 100 includes a third wire 133 and a fourth wire 134 as n-side wires. Note that in FIG. 40 to FIG. 42, illustration of a partial configuration such as the p-electrode 158, the first wire 131, and the second wire 132 is omitted.

As shown in FIG. 41 and FIG. 42, the third light-emitting element 123 and the fourth light-emitting element 124 each have a mesa structure in which the mesa (plateau shape) 153 is formed by being surrounded by the recessed portion 152 provided in the substrate 151. The recessed portion 152 has a bottom surface 125 that is separated from the light-emitting element surface 120 (see FIG. 6) and is parallel to the light-emitting element surface 120.

As shown in FIG. 42, the bottom surface 125 is a surface formed by an n-contact layer 164. The re-contact layer 164 is formed of an n-type semiconductor material and is provided adjacent to the n-type DBR layer 154 on the substrate 151 side of the n-type DBR layer 154. An element isolation groove 165 is provided in the bottom surface 125. As shown in FIG. 40, the element isolation groove 165 is provided between the light-emitting element column L3 and the light-emitting element column L4 and extend along the extending direction of the light-emitting element column L3 and the light-emitting element column L4. The element isolation groove 165 has a depth at which at least the n-contact layer 164 can be separated and electrically separates the third light-emitting element 123 and the fourth light-emitting element 124 from each other by separating the n-contact layer 164.

The third wire 133 and the fourth wire 134 are each formed of a conductive material such as Au and is formed on the bottom surface 125. Specifically, the third wire 133 is provided between the element isolation grooves 165 and around the third light-emitting element 123 as viewed from a direction (Z direction) perpendicular to the bottom surface 125 and extends along the extending direction (X direction) of the light-emitting element column L3. Further, the fourth wire 134 is provided between the element isolation grooves 165 and around the fourth light-emitting element 124 as viewed from a direction (Z direction) perpendicular to the bottom surface 125 and extends along the extending direction (X direction) of the light-emitting element column L4.

By making the third wire 133 and the fourth wire 134 have the configuration as described above, it is possible to switch the light-emitting element 150 that emits light. Specifically, by applying a voltage between the first wire 131 and the third wire 133, it is possible to cause the light-emitting element 150 (see FIG. 39) included in both the light-emitting element column L1 and the light-emitting element column L3 to emit light.

Further, by applying a voltage between the first wire 131 and the fourth wire 134, it is possible to cause the light-emitting element 150 included in both the light-emitting element column L1 and the light-emitting element column L4 to emit light. Similarly, by applying a voltage between the second wire 132 and the third wire 133, it is possible to cause the light-emitting element 150 included in both the light-emitting element column L2 and the light-emitting element column L3 to emit light. Further, by applying a voltage between the second wire 132 and the fourth wire 134, it is possible to cause the light-emitting element 150 included in both the light-emitting element column L2 and the light-emitting element column L4 to emit light.

Here, the widths of the third wire 133 and the fourth wire 134 will be examined. As shown in FIG. 41, the minimum width of the third wire 133 in the Y direction is defined as a width W3 and the minimum width of the fourth wire 134 in the Y direction is defined as a width W4. By making the width W3 and the width W4 wider, the wiring resistance of the third wire 133 and the fourth wire 134 can be reduced. Meanwhile, when the width W3 and the width W4 are widened, the density of light-emitting elements decreases and the light emission intensity of the light-emitting element array 100 is reduced. Hereinafter, a configuration the width W3 and the width W4 are widened while maintaining the density of light-emitting elements will be described.

Note that the structure described above can be formed by etching the mesa 153 up to the n-contact layer 164 by RIE (Reactive Ion Etching). After that, the mesa 153 is covered with the insulation layer 161 and the insulation layer 161 around the mesa 153 is further opened by RIE. As a result, the bottom surface 125 is exposed, so that the third wire 133 and the fourth wire 134 can be formed on the bottom surface 125.

[Wiring Structure 2 on N-Side]

Figure 43:
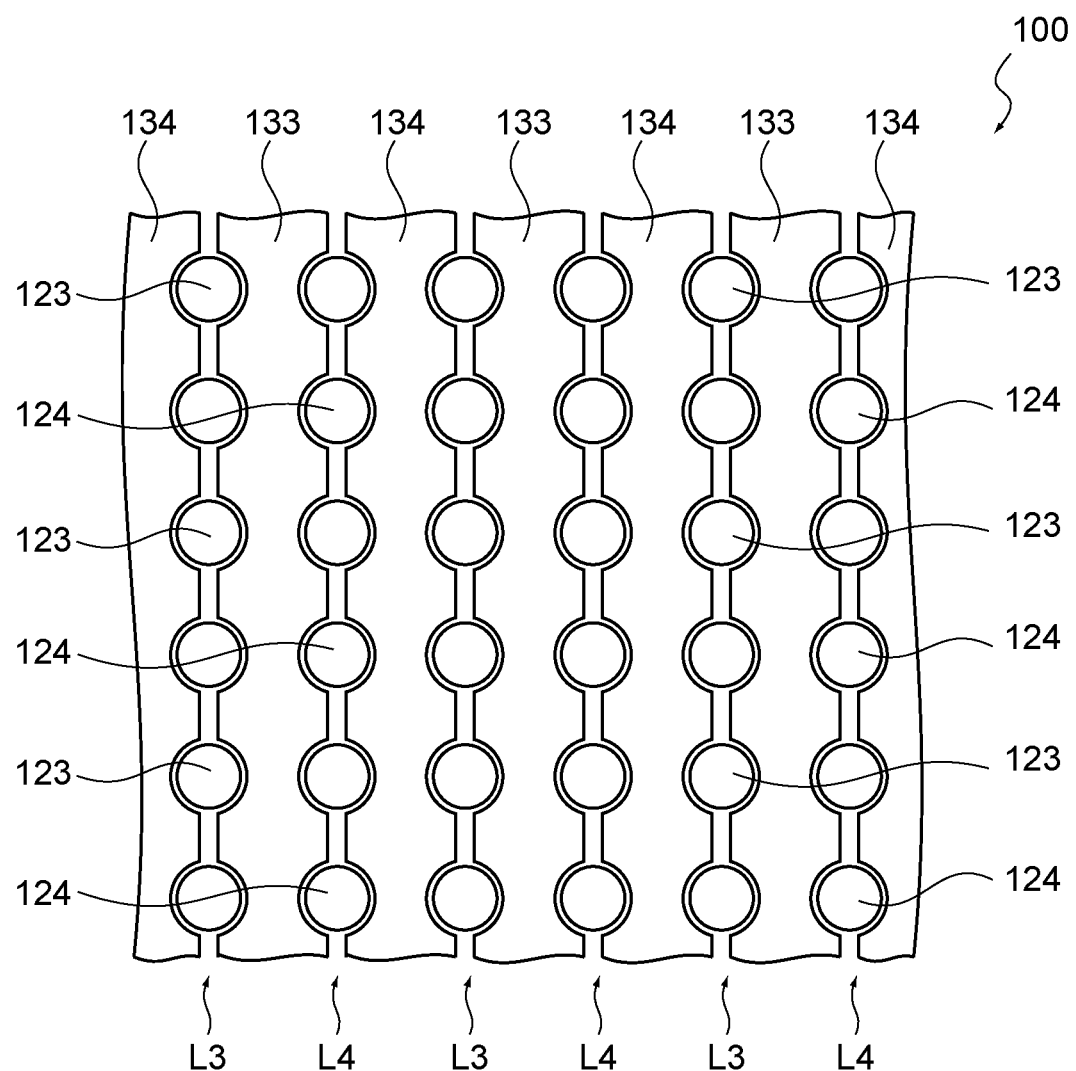
FIG. 43 is a plan view of the light-emitting element array showing the third wire and the fourth wire.
Figure 44:
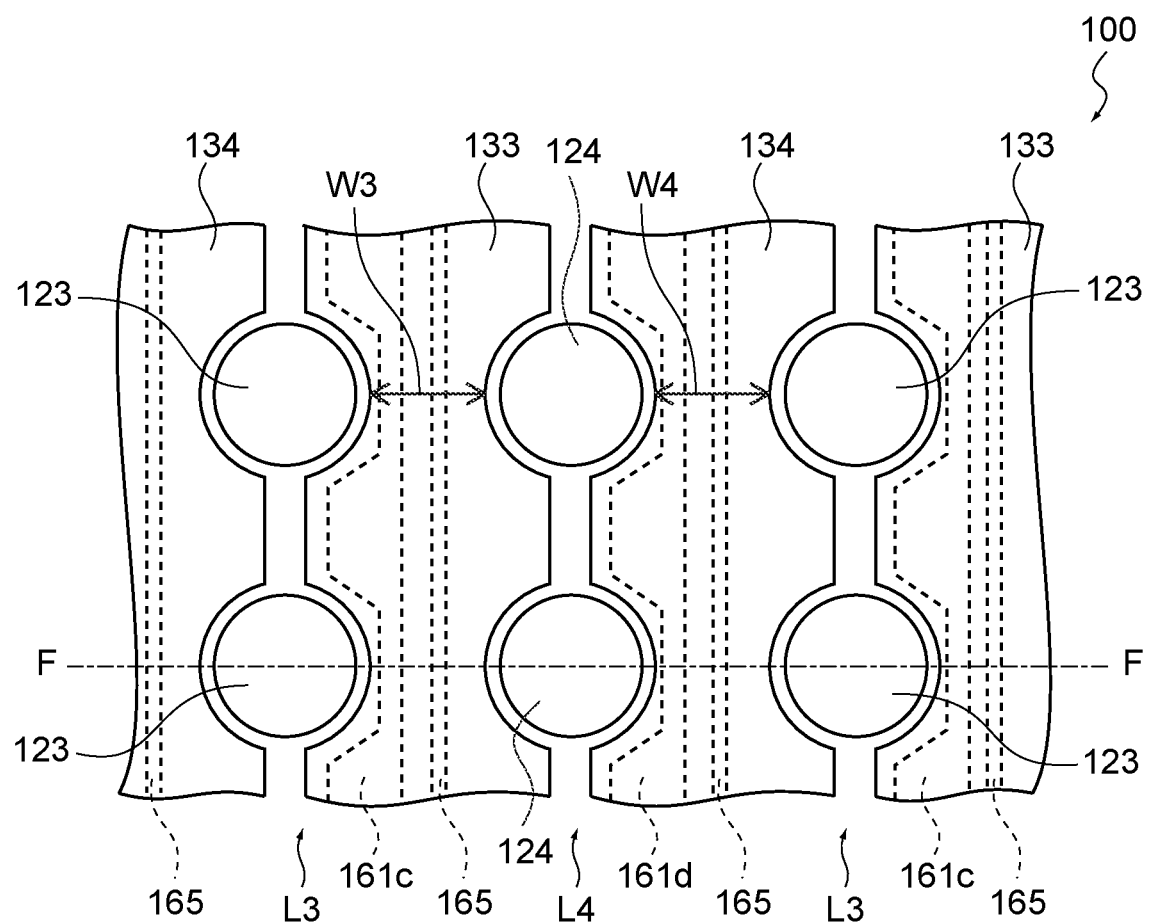
FIG. 44 is an enlarged plan view of the light-emitting element array showing the third wire and the fourth wire.
Figure 45:
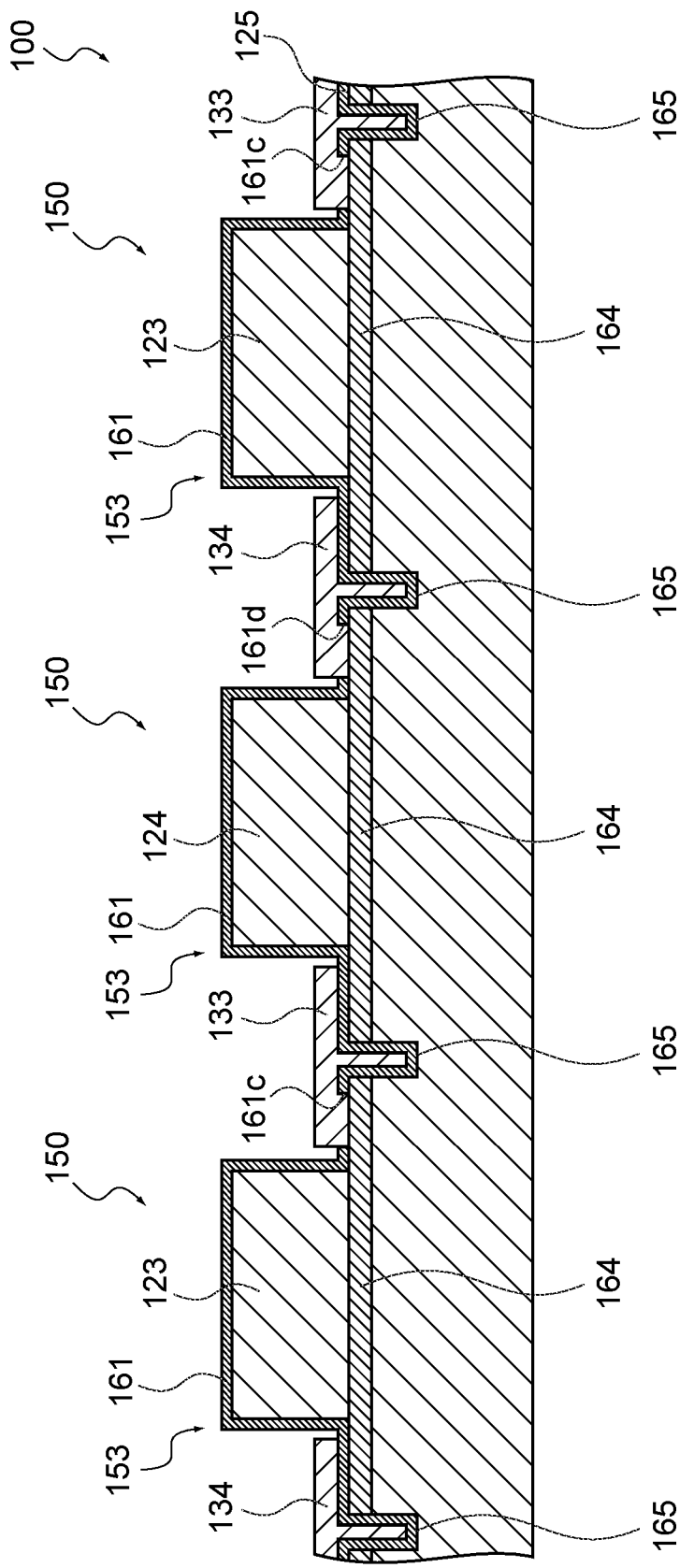
FIG. 45 is a cross-sectional view of the light-emitting element array showing the third wire and the fourth wire.

Another example of the wiring structure on the n-side of the light-emitting element array 100 will be described. FIG. 43 is a plan view showing this wiring structure, and FIG. 44 is an enlarged view of FIG. 43. FIG. 45 is a cross-sectional view of the light-emitting element array 100, and is a cross-sectional view taken along the line F-F in FIG. 44. Note that in FIG. 43 to FIG. 45, illustration of a partial configuration such as the p-electrode 158, the first wire 131, and the second wire 132 is omitted. As shown in FIG. 43 and FIG. 44, the third wire 133 and the fourth wire 134 are each arranged between the light-emitting element column L3 and the light-emitting element column L4. Further, as shown in FIG. 45, the third wire 133 and the fourth wire 134 are provided on the bottom surface 125 and the element isolation groove 165.

Figure 46:
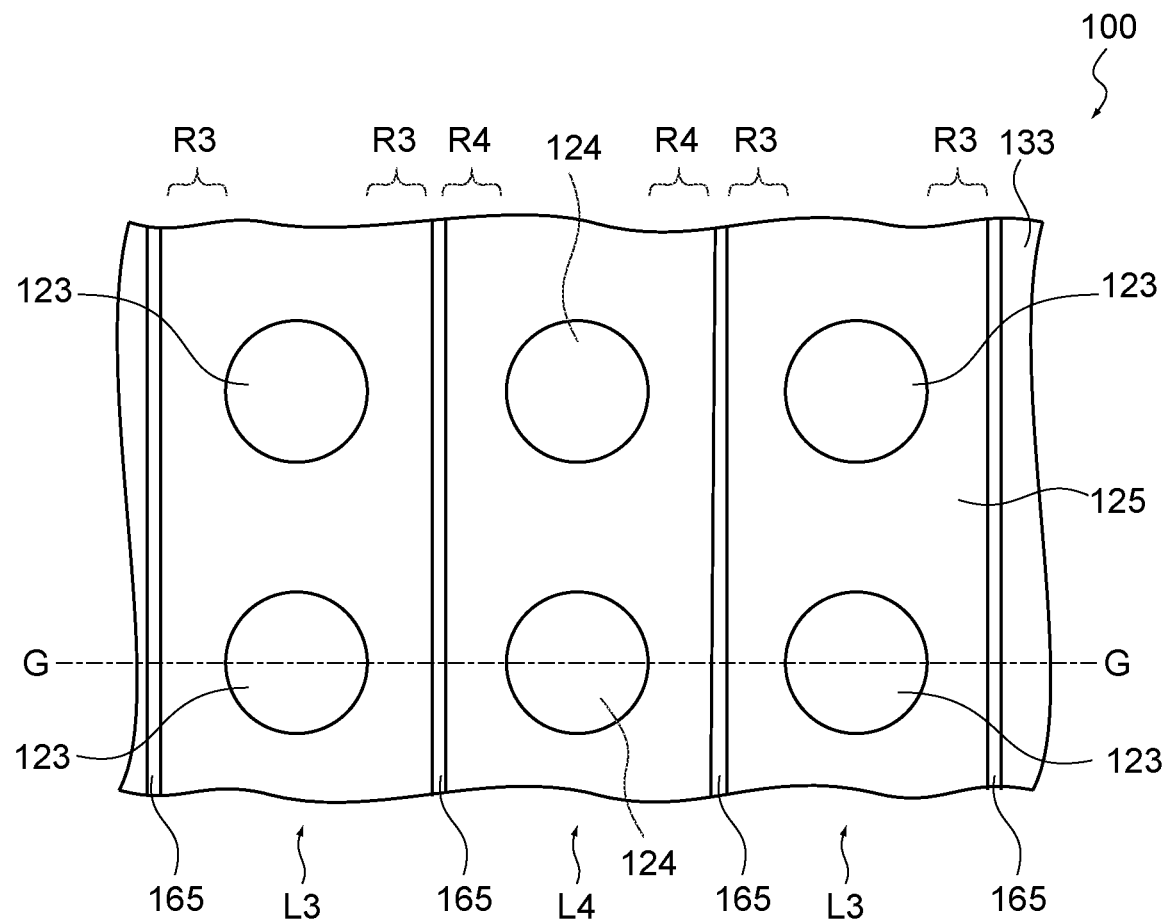
FIG. 46 is a plan view of the light-emitting element array showing a bottom surface of a recessed portion.
Figure 47:
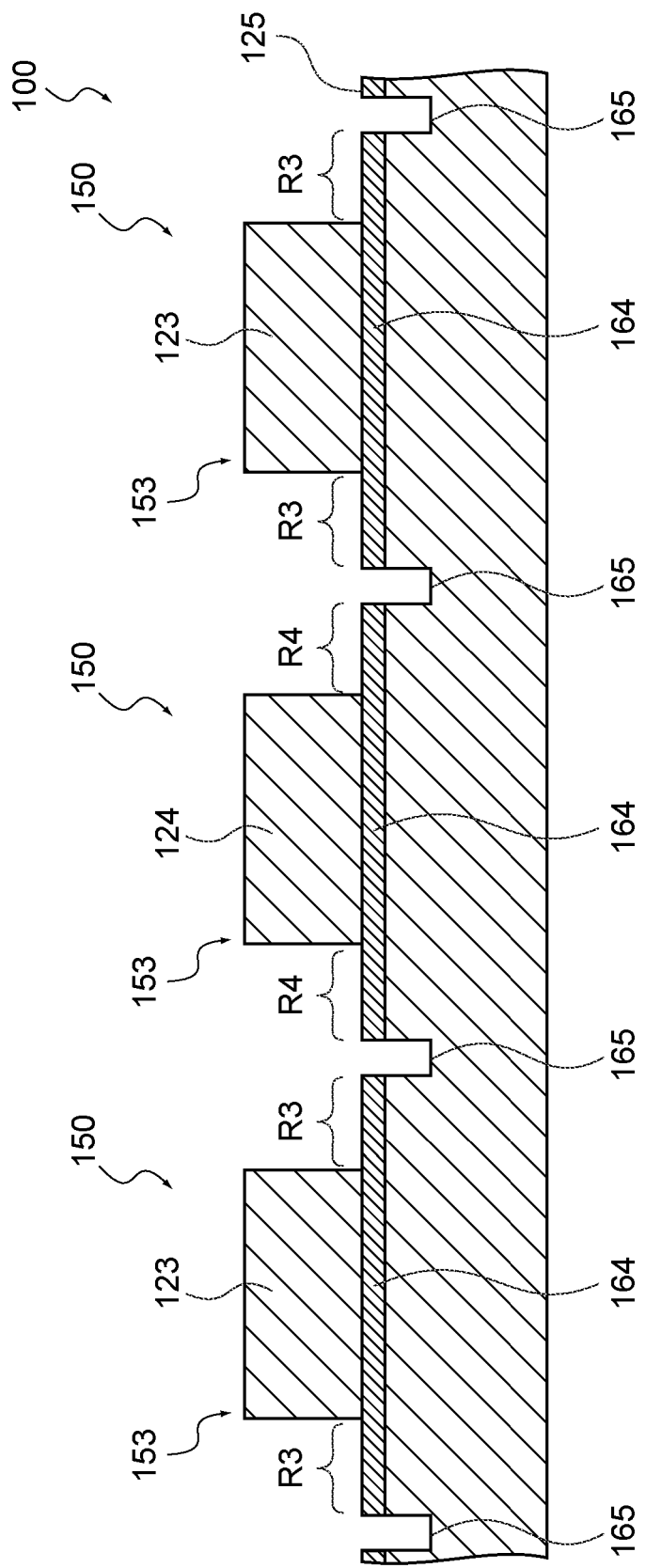
FIG. 47 is a cross-sectional view of the light-emitting element array showing the bottom surface of the recessed portion.

FIG. 46 is a plan view showing the bottom surface 125, and FIG. 47 is a cross-sectional view taken along the line G-G in FIG. 46. As shown in these figures, a region of the bottom surface 125 between the element isolation groove 165 and the third light-emitting element 123 is defined as a region R3. Further, a region of the bottom surface 125 between the element isolation groove 165 and the fourth light-emitting element 124 is defined as a region R4.

Figure 48:
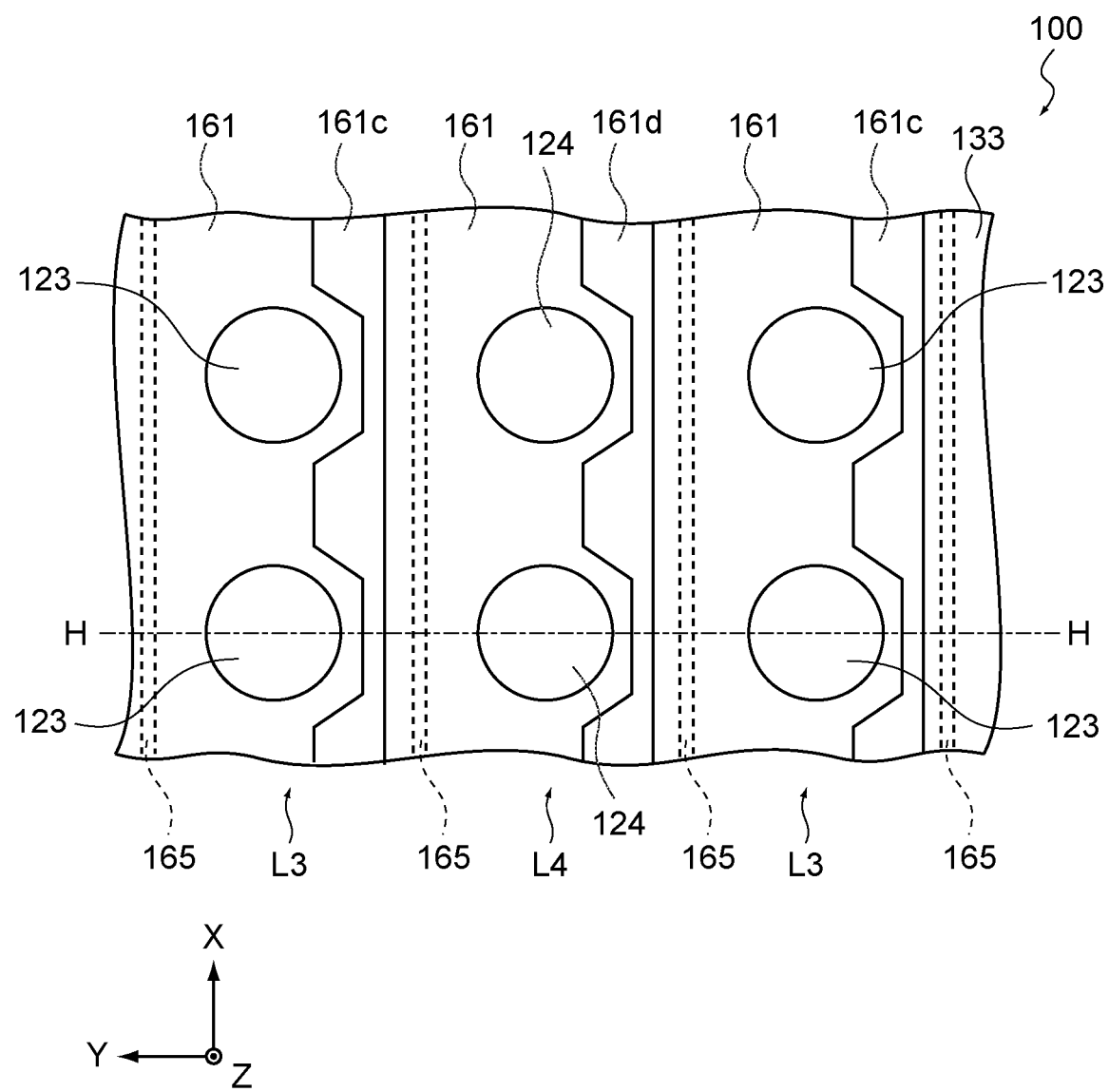
FIG. 48 is a plan view of the light-emitting element array showing an opening of an insulation layer.
Figure 49:
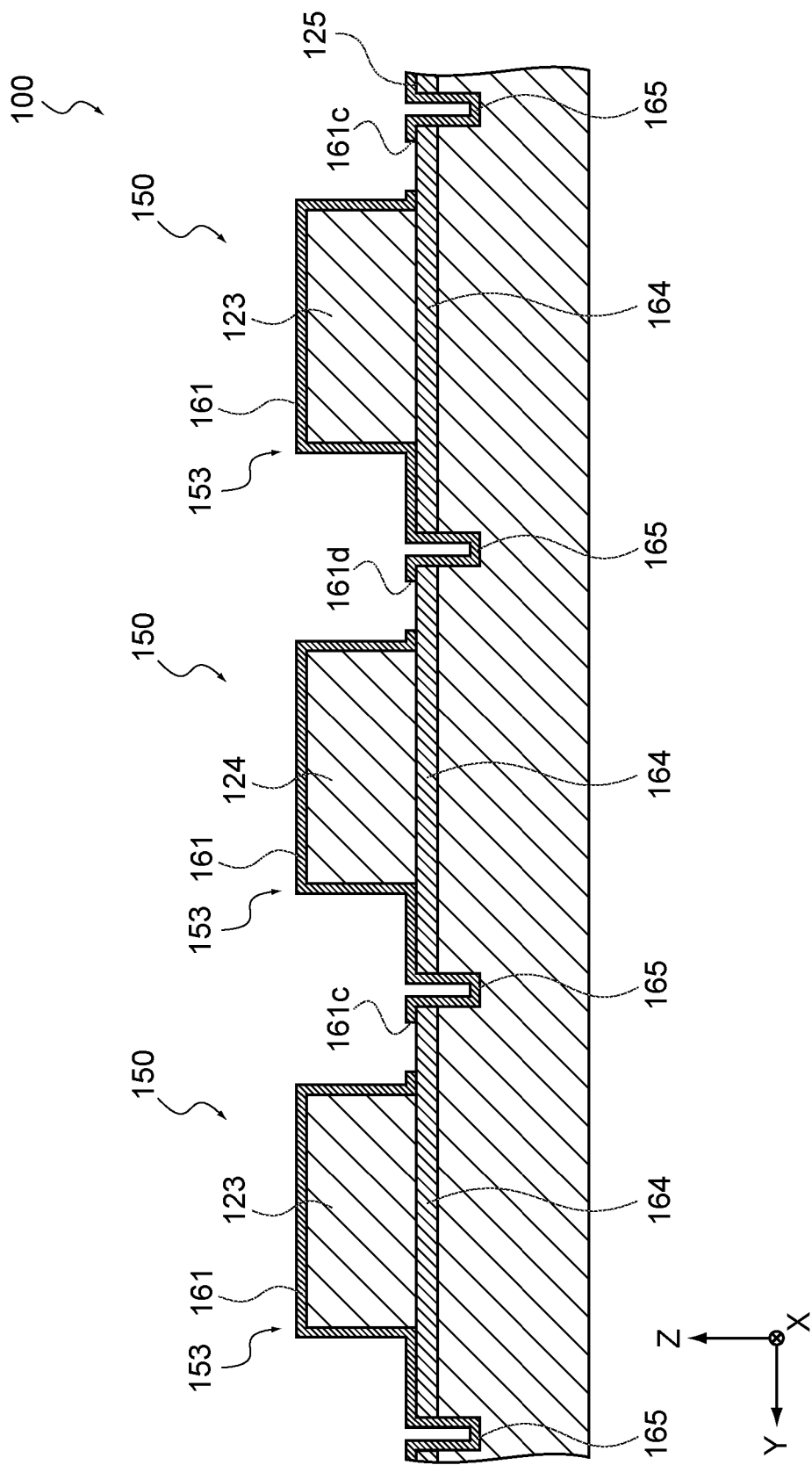
FIG. 49 is a cross-sectional view of the light-emitting element array showing the opening of the insulation layer.

As shown in FIG. 45, the insulation layer 161 is provided in the element isolation groove 165 and on the bottom surface 125. FIG. 48 is a plan view showing the insulation layer 161, and FIG. 49 is a cross-sectional view taken along the line H-H in FIG. 48. As shown in FIG. 48 and FIG. 49, A first opening 161c that is an opening of the insulation layer 161 is provided on one of the regions R3 (see FIG. 47) on both sides of the third light-emitting element 123. Further, as shown in FIG. 48 and FIG. 49, a second opening 161d that is an opening of the insulation layer 161 is provided on one of the regions R4 (see FIG. 47) on both sides of the fourth light-emitting element 124.

As shown in FIG. 44 and FIG. 45, the third wire 133 is provided on the insulation layer 161 and in the element isolation groove 165, which are provided on the bottom surface 125, and overlaps with the region R3, the region R4, and the element isolation groove 165 as viewed from a direction (Z direction) perpendicular to the bottom surface 125. The third wire 133 comes into contact with the n-contact layer 164 of the third light-emitting element 123 via the first opening 161c provided on the region R3 and is electrically connected to the n-contact layer 164 of the third light-emitting element 123. Further, the third wire 133 is insulated from the n-contact layer 164 of the fourth light-emitting element 124 by the insulation layer 161 on the region R4.

Further, as shown in FIG. 44 and FIG. 45, the fourth wire 134 is provided on the insulation layer 161 and in the element isolation groove 165, which are provide on the bottom surface 125, and overlaps with the region R3, the region R4, and the element isolation groove 165 as viewed from a direction (Z direction) perpendicular to the bottom surface 125. The fourth wire 134 comes into contact with the n-contact layer 164 of the fourth light-emitting element 124 via the second opening 161d provided on the region R4 and is electrically connected to the n-contact layer 164 of the fourth light-emitting element 124. Further, the fourth wire 134 is insulated from the n-contact layer 164 of the third light-emitting element 123 by the insulation layer 161 on the region R3.

In this structure, as shown in FIG. 44, the minimum width W3 of the third wire 133 in the Y direction and the minimum width W4 of the fourth wire 134 in the Y direction can be widened while maintaining the density of light-emitting elements. As a result, it is possible to reduce the wiring resistance of the third wire 133 and the fourth wire 134.

Note that the structure described above can be formed by etching the mesa 153 up to the n-contact layer 164 by RIE. After that, the mesa 153 is covered with the insulation layer 161, and the first opening 161c and the second opening 161d are formed by RIE. As a result, it is possible to form the third wire 133 on the first opening 161c and the insulation layer 161 and form the fourth wire 134 on the second opening 161d and the insulation layer 161.

[Wiring Structure 3 on N-Side]

Figure 50:
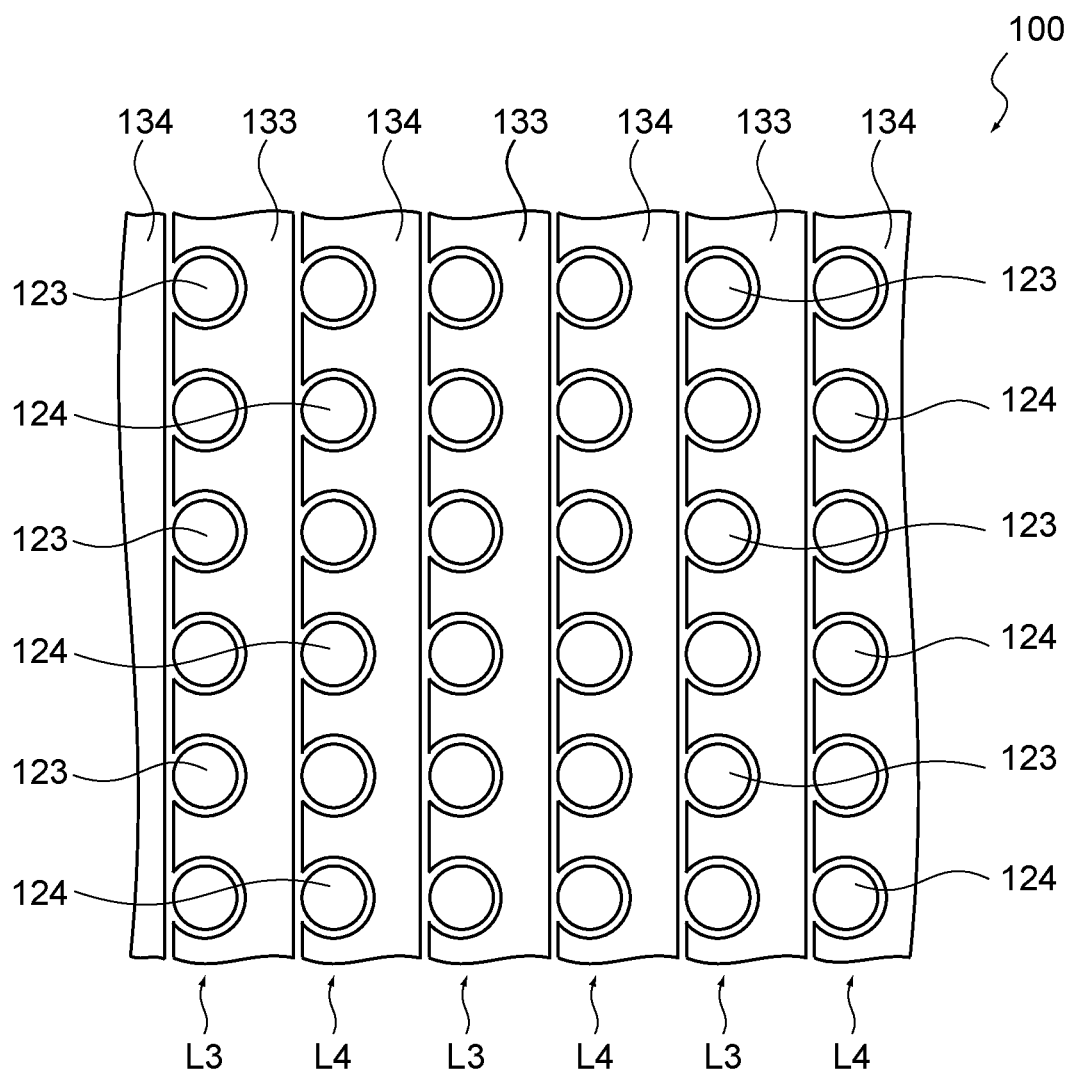

Another example of the wiring structure of the light-emitting element array 100 on the n-side will be described. FIG. 50 is a plan view showing this wiring structure, and FIG. 51 is an enlarged view of FIG. 50. The cross-sectional view taken along the line I-I of this light-emitting element array 100 is the same as that in FIG. 45. Note that in FIG. 50 and FIG. 51, illustration of a partial configuration such as the p-electrode 158, the first wire 131, and the second wire 132 is omitted. As shown in these figures, the third wire 133 and the fourth wire 134 are different from the third wire 133 and the fourth wire 134 (see FIG. 43) shown in the wiring structure 2 in the separation positions of the wires.

Figure 52:
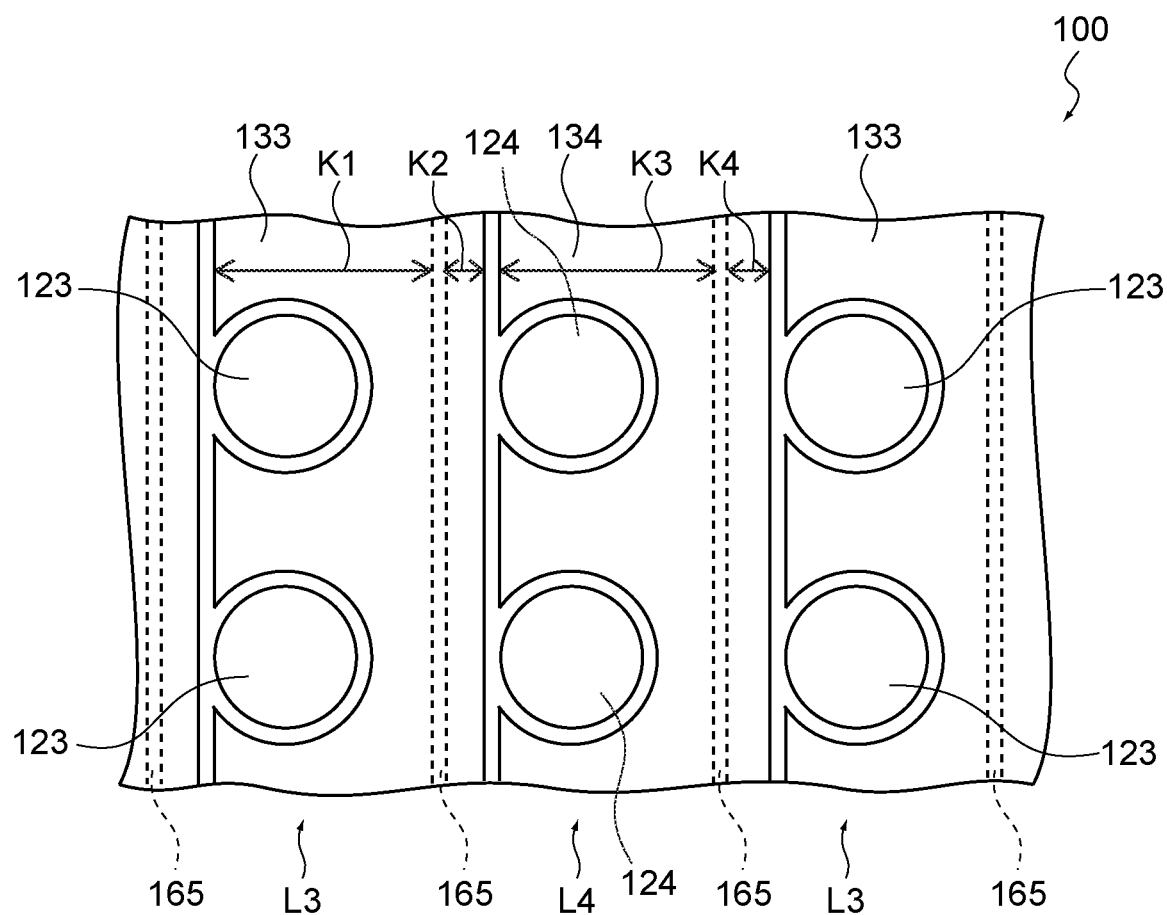
FIG. 52 is an enlarged plan view of the light-emitting element array showing the third wire and the fourth wire.

FIG. 52 is a plan view showing the shapes of the third wire 133 and the fourth wire 134. As shown in the figure, when the width of the third wire 133 in the Y direction from the element isolation groove 165 to the third light-emitting element 123 side is defined as a width K1 and the width of the third wire 133 in the Y direction from the element isolation groove 165 to the fourth light-emitting element 124 side is defined as a width K2, the width K1 is larger than the width K2. Further, the width of the fourth wire 134 in the Y direction from the element isolation groove 165 to the fourth light-emitting element 124 side is defined as a width K3 and the width of the fourth wire 134 in the Y direction from the element isolation groove 165 to the third light-emitting element 123 side is defined as a width K4, the width K3 is larger than the width K4.

By forming the third wire 133 and the fourth wire 134 in such shapes, the opening areas of the first opening 161c and the second opening 161d can be increased as shown in FIG. 51 while the minimum width W3 of the third wire 133 and the minimum width W4 of the fourth wire 134 are the same as those in the wiring structure 2. As a result, it is possible to reduce the contact resistance between the third wire 133 and the n-contact layer 164 of the third light-emitting element 123, which are in contact with each other via the first opening 161c. Further, it is possible to reduce the contact resistance between the fourth wire 134 and the n-contact layer 164 of the fourth light-emitting element 124, which are in contact with each other via the second opening 161d.

Modified Example

Figure 53:
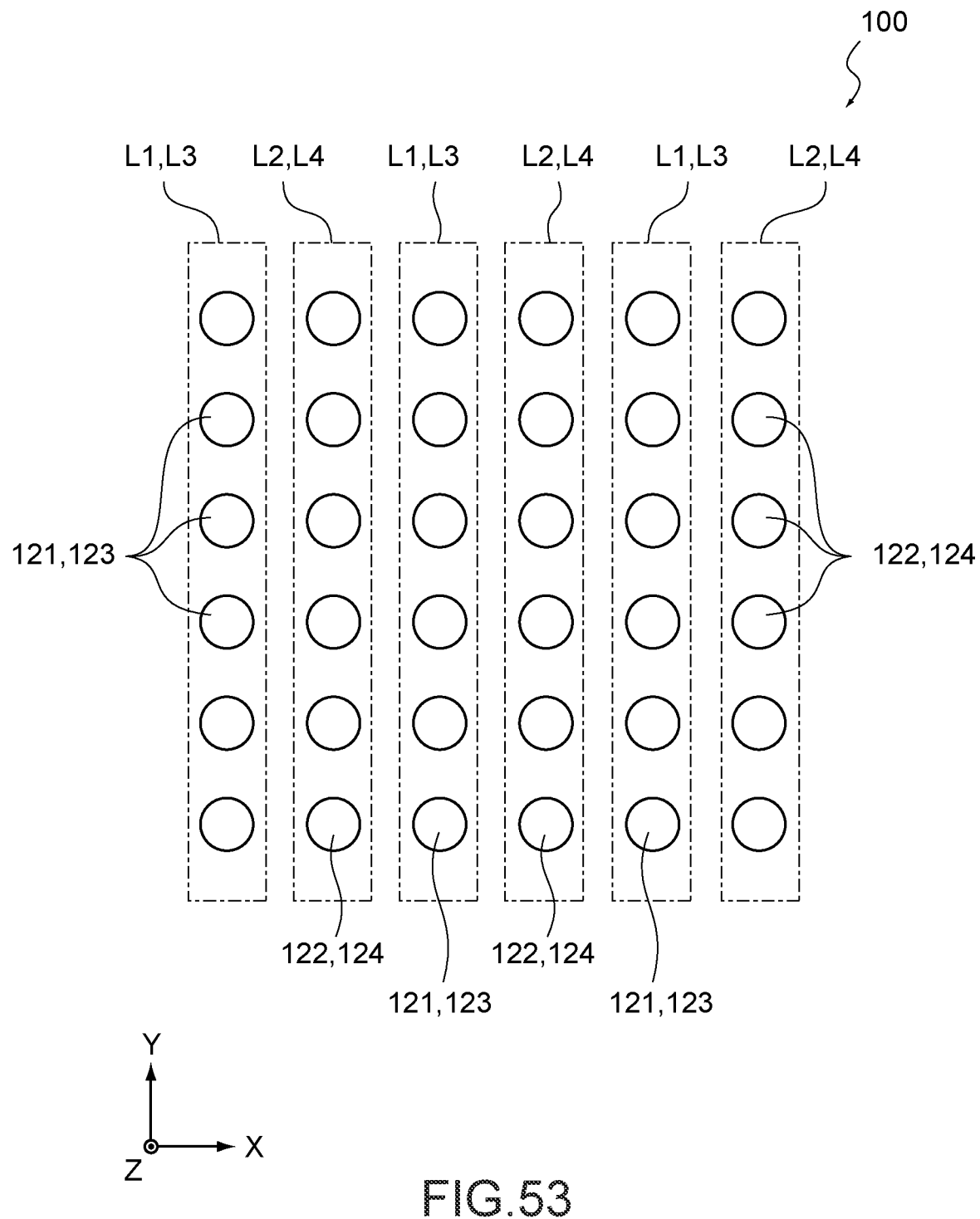
FIG. 53 is a schematic diagram showing a light-emitting element column of the light-emitting element array.

Although the light-emitting element column L3 and the light-emitting element column L4 have extent in a direction (X direction) orthogonal to the extending direction (Y direction) of the light-emitting element column L1 and the light-emitting element column L2 in the above description (see FIG. 39), the extending direction of the light-emitting element column L3 and the light-emitting element column L4 is not limited thereto. FIG. 53 is a schematic diagram showing another extending direction of the light-emitting element column L3 and the light-emitting element column L4. As shown in the figure, the extending direction of the light-emitting element column L3 and the light-emitting element column L4 can be the Y direction that is the same as the extending direction of the light-emitting element column L1 and the light-emitting element column L2. In this case, the third light-emitting element 123 coincides with the first light-emitting element 121 and the fourth light-emitting element 124 coincides with the second light-emitting element 122.

By making the third wire 133 and the fourth wire 134 have the configuration as described above, the light-emitting element 150 included in the light-emitting element column L1 (same as the light-emitting element column L3) can be caused to emit light by applying a voltage between the first wire 131 and the third wire 133. By applying a voltage between the second wire 132 and the fourth wire 134, the light-emitting element 150 included in the light-emitting element column L2 (same as the light-emitting element column L4) can be caused to emit light. In addition, the extending direction of the light-emitting element column L3 and the light-emitting element column L4 can be any direction parallel to the X-Y plane.

Further, in the light-emitting element array 100 described above, the first wire 131 and the second wire 132 that are p-side wires have had a configuration according to the present technology (see FIG. 2) and the third wire 133 and the fourth wire 134 that are n-side wires also have had a configuration according to the present technology (see FIG. 45). Here, in the light-emitting element array 100, both the wires on the p-side and the n-side do not necessarily need to have a configuration according to the present technology. That is, in the light-emitting element array 100, only the p-side wire may have a configuration according to the present technology and the n-side wire may have a general wiring structure in a light-emitting element array. Further, in the light-emitting element array 100, only the n-side wire may have a configuration according to the present technology and the p-side wire may have a general wiring structure in a light-emitting element array.

Note that although the first wire 131 and the second wire 132 have been the p-side wires and the third wire 133 and the fourth wire 134 have been the n-side wires in the above description, the n-type and the p-type in the light-emitting element 150 may be reversed. In this case, the first wire 131 and the second wire 132 are n-side wires and the third wire 133 and the fourth wire 134 are p-side wires.

[Regarding Present Disclosure]

The effects described in the present disclosure are merely examples and are not limited, and additional effects may be exerted. The description of the plurality of effects described above does not necessarily mean that these effects are exerted at the same time. It means that at least one of the effects described above can be achieved and there is a possibility that an effect that is not described in the present disclosure is exerted. Further, at least two feature parts of the feature parts described in the present disclosure may be arbitrarily combined with each other.

It should be noted that the present technology may also take the following configurations.

(1) A light-emitting element array, including:
    a light-emitting element group that includes a plurality of first light-emitting elements and a plurality of second light-emitting elements that are arrayed in a planar manner to form a light-emitting element surface;
    a first wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of first light-emitting elements, and is not electrically connected to the plurality of second light-emitting elements; and
    a second wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of second light-emitting elements, and is not electrically connected to the plurality of first light-emitting elements.

(2) The light-emitting element array according to (1) above, in which the light-emitting element group includes a first light-emitting element column in which the plurality of first light-emitting elements is arrayed, and a second light-emitting element column in which the plurality of second light-emitting elements is arrayed,
a center of the first wire is separated from a center of the first light-emitting element column in a direction parallel to the light-emitting element surface, and
a center of the second wire is separated from a center of the second light-emitting element column in a direction parallel to the light-emitting element surface.

(3) The light-emitting element array according to (2) above, in which
the light-emitting element group further includes a third light-emitting element column in which the plurality of first light-emitting elements is arrayed, the third light-emitting element column being provided on a side opposite to the first light-emitting element column with respect to the second light-emitting element column,
the first wire is provided between the center of the first light-emitting element column and the center of the second light-emitting element column as viewed from a direction perpendicular to the light-emitting element surface, and
the second wire is provided between the center of the second light-emitting element column and a center of the third light-emitting element column as viewed from a direction perpendicular to the light-emitting element surface.

(4) The light-emitting element array according to (3) above, in which
the first light-emitting element column, the second light-emitting element column, the third light-emitting element column, the first wire, and the second wire extend in a first direction parallel to the light-emitting element surface and are separated from each other in a second direction that is parallel to the light-emitting element surface and orthogonal to the first direction,
a width of the first wire in the second direction is larger than an interval between the first light-emitting element column and the second light-emitting element column in the second direction, and
a width of the second wire in the second direction is larger than an interval between the second light-emitting element column and the third light-emitting element column in the second direction.

(5) The light-emitting element array according to any one of (1) to (4) above, in which
the first wire and the second wire are formed in a same layer.

(6) The light-emitting element array according to (5) above, in which
the first wire is stacked on the plurality of first light-emitting elements and the plurality of second light-emitting elements via an insulation layer, is electrically connected to the plurality of first light-emitting elements via a first through hole provided in the insulation layer on the plurality of first light-emitting elements, and is insulated from the plurality of second light-emitting elements by the insulation layer on the plurality of second light-emitting elements, and
the second wire is stacked on the plurality of first light-emitting elements and the plurality of second light-emitting elements via the insulation layer, is electrically connected to the plurality of second light-emitting elements via a second through hole provided in the insulation layer on the plurality of second light-emitting elements, and is insulated from the plurality of first light-emitting elements by the insulation layer on the plurality of first light-emitting elements.

(7) The light-emitting element array according to (6) above, in which
the plurality of first light-emitting elements is each a vertical cavity surface emitting laser element and includes a first light-emitting surface and a first electrode provided around the first light-emitting surface,
the plurality of second light-emitting elements is each a vertical cavity surface emitting laser element and includes a second light-emitting surface and a second electrode provided around the second light-emitting surface,
the first wire abuts on the first electrode via the first through hole in the plurality of first light-emitting elements, and
the second wire abuts on the second electrode via the second through hole in the plurality of second light-emitting elements.

(8) The light-emitting element array according to any one of (1) to (7) above, in which
the plurality of first light-emitting elements and the plurality of second light-emitting elements each have a mesa structure surrounded by a recessed portion,
the light-emitting element group includes a first groove portion that connects the recessed portions to each other between the plurality of first light-emitting elements and a second groove portion that connects the recessed portions to each other between the plurality of second light-emitting elements,
the first wire may have a portion formed in the first groove portion, and
the second wire may have a portion formed in the second groove portion.

(9) The light-emitting element array according to any one of (1) to (8) above, in which
the light-emitting elements constituting the light-emitting element group include a plurality of third light-emitting elements and a plurality of fourth light-emitting elements, the plurality of third light-emitting elements and the plurality of fourth light-emitting elements each having a mesa structure surrounded by a recessed portion, the recessed portion being separated from the light-emitting element surface and having a bottom surface parallel to the light-emitting element surface,
an element isolation groove that electrically separates the plurality of third light-emitting elements and the plurality of fourth light-emitting elements from each other being provided in the bottom surface,
the light-emitting element array further including:
a third wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the third light-emitting element, and is not electrically connected to the fourth light-emitting element; and
a fourth wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the fourth light-emitting element, and is not electrically connected to the third light-emitting element.

(10) The light-emitting element array according to (9) above, in which
the light-emitting element group includes a first light-emitting element column in which the plurality of first light-emitting elements is arrayed, a second light-emitting element column in which the plurality of second light-emitting elements is arrayed, a third light-emitting element column in which the plurality of third light-emitting elements is arrayed, and a fourth light-emitting element column in which the plurality of fourth light-emitting elements is arrayed.

(11) The light-emitting element array according to (10) above, in which
the first light-emitting element column, the second light-emitting element column, the first wire, and the second wire each extend in a first direction parallel to the light-emitting element surface, and
the third light-emitting element column, the fourth light-emitting element column, the third wire, and the fourth wire each extend in a second direction that is parallel to the light-emitting element surface and is orthogonal to the first direction.

(12) The light-emitting element array according to (10) above, in which
the first light-emitting element column, the second light-emitting element column, the first wire, and the second wire each extend in a first direction parallel to the light-emitting element surface, and
the third light-emitting element column, the fourth light-emitting element column, the third wire, and the fourth wire each extend in the first direction.

(13) The light-emitting element array according to any one of (9) to (12) above, in which
the third wire is stacked on the bottom surface and the element isolation groove via an insulation layer, is electrically connected to the plurality of third light-emitting elements via a first opening provided in the insulation layer in a region of the bottom surface between the element isolation groove and the third light-emitting element, and is insulated from the plurality of fourth light-emitting elements by the insulation layer in a region of the bottom surface between the element isolation groove and the fourth light-emitting element, and
the fourth wire is stacked on the bottom surface and the element isolation groove via the insulation layer, is electrically connected to the plurality of fourth light-emitting elements via a second opening provided in the insulation layer in a region of the bottom surface between the element isolation groove and the fourth light-emitting element, and is insulated from the plurality of third light-emitting elements by the insulation layer in a region of the bottom surface between the element isolation groove and the third light-emitting element.

(14) The light-emitting element array according to any one of (9) to (13) above, in which
the third wire has a width from the element isolation groove to a side of the third light-emitting element larger than a width from the element isolation groove to a side of the fourth light-emitting element, and
the fourth wire has a width from the element isolation groove to a side of the fourth light-emitting element larger than a width from the element isolation groove to a side of the third light-emitting element.

(15) A light-emitting element array, including:
a light-emitting element group in which a plurality of first light-emitting elements and a plurality of second light-emitting elements are arrayed in a planar manner to form a light-emitting element surface, the plurality of first light-emitting elements and the plurality of second light-emitting elements each having a mesa structure surrounded by a recessed portion, the recessed portion being separated from the light-emitting element surface and having a bottom surface parallel to the light-emitting element surface, an element isolation groove that electrically separates the plurality of first light-emitting elements and the plurality of second light-emitting elements from each other being provided in the bottom surface.
a first wire that extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the first light-emitting element, and is not electrically connected to the second light-emitting element;
a second wire that extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the second light-emitting element, and is not electrically connected to the first light-emitting element.

REFERENCE SIGNS LIST 100 light-emitting element array
120 light-emitting element surface
121 first light-emitting element
122 second light-emitting element
123 third light-emitting element
124 fourth light-emitting element
125 bottom surface
131 first wire
132 second wire
133 third wire
134 fourth wire
150 light-emitting element
151 substrate
152 recessed portion
153 mesa
154 n-type DBR layer
155 active layer
156 current confinement layer
157 p-type DBR layer
158 p-electrode
159 n-electrode
161 insulation layer
161a first through hole
161b second through hole
161c first opening 161*d* second opening
164 n-contact layer
165 element isolation groove
171 first groove portion
172 second groove portion

The invention claimed is:
1. A light-emitting element array, comprising:
a light-emitting element group that includes a plurality of first light-emitting elements and a plurality of second light-emitting elements that are arrayed in a planar manner to form a light-emitting element surface, a first light-emitting element column in which the plurality of first light-emitting elements is arrayed, a second light-emitting element column in which the plurality of second light-emitting elements is arrayed, and a third light-emitting element column in which the plurality of first light-emitting elements is arrayed, wherein the third light-emitting element column is provided on a side opposite to the first light-emitting element column with respect to the second light-emitting element column;
a first wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is provided between the center of the first light-emitting element column and the center of the second light-emitting element column as viewed from a direction perpendicular to the light-emitting element surface, is electrically connected to the plurality of first light-emitting elements, and is not electrically connected to the plurality of second light-emitting elements, and wherein a center of the first wire is separated from a center of the first light-emitting element column in a direction parallel to the light-emitting element surface; and
a second wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is provided between the center of the second light-emitting element column and a center of the third light-emitting element column as viewed from a direction perpendicular to the light-emitting element surface, is electrically connected to the plurality of second light-emitting elements, and is not electrically connected to the plurality of first light-emitting elements, and wherein a center of the second wire is separated from a center of the second light-emitting element column in a direction parallel to the light-emitting element surface.

2. The light-emitting element array according to claim 1, wherein
the first light-emitting element column, the second light-emitting element column, the third light-emitting element column, the first wire, and the second wire extend in a first direction parallel to the light-emitting element surface and are separated from each other in a second direction that is parallel to the light-emitting element surface and orthogonal to the first direction,
a width of the first wire in the second direction is larger than an interval between the first light-emitting element column and the second light-emitting element column in the second direction, and
a width of the second wire in the second direction is larger than an interval between the second light-emitting element column and the third light-emitting element column in the second direction.

3. The light-emitting element array according to claim 1, wherein
the first wire and the second wire are formed in a same layer.

4. The light-emitting element array according to claim 3, wherein
the first wire is stacked on the plurality of first light-emitting elements and the plurality of second light-emitting elements via an insulation layer, is electrically connected to the plurality of first light-emitting elements via a first through hole provided in the insulation layer on the plurality of first light-emitting elements, and is insulated from the plurality of second light-emitting elements by the insulation layer on the plurality of second light-emitting elements, and
the second wire is stacked on the plurality of first light-emitting elements and the plurality of second light-emitting elements via the insulation layer, is electrically connected to the plurality of second light-emitting elements via a second through hole provided in the insulation layer on the plurality of second light-emitting elements, and is insulated from the plurality of first light-emitting elements by the insulation layer on the plurality of first light-emitting elements.

5. The light-emitting element array according to claim 4, wherein
the plurality of first light-emitting elements is each a vertical cavity surface emitting laser element and includes a first light-emitting surface and a first electrode provided around the first light-emitting surface,
the plurality of second light-emitting elements is each a vertical cavity surface emitting laser element and includes a second light-emitting surface and a second electrode provided around the second light-emitting surface,
the first wire abuts on the first electrode via the first through hole in the plurality of first light-emitting elements, and
the second wire abuts on the second electrode via the second through hole in the plurality of second light-emitting elements.

6. The light-emitting element array according to claim 1, wherein
the plurality of first light-emitting elements and the plurality of second light-emitting elements each have a mesa structure surrounded by a recessed portion,
the light-emitting element group includes a first groove portion that connects the recessed portions to each other between the plurality of first light-emitting elements and a second groove portion that connects the recessed portions to each other between the plurality of second light-emitting elements,
the first wire may have a portion formed in the first groove portion, and
the second wire may have a portion formed in the second groove portion.

7. A light-emitting element array, comprising:
a light-emitting element group that includes a plurality of first light-emitting elements and a plurality of second light-emitting elements that are arrayed in a planar manner to form a light-emitting element surface;

the light-emitting elements constituting the light-emitting element group include a plurality of third light-emitting elements and a plurality of fourth light-emitting elements, the plurality of third light-emitting elements and the plurality of fourth light-emitting elements each having a mesa structure surrounded by a recessed portion, the recessed portion being separated from the light-emitting element surface and having a bottom surface parallel to the light-emitting element surface, an element isolation groove that electrically separates the plurality of third light-emitting elements and the plurality of fourth light-emitting elements from each other being provided in the bottom surface, the light-emitting element array further comprising:
  a first wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of first light-emitting elements, and is not electrically connected to the plurality of second light-emitting elements;
  a second wire that extends in a direction parallel to the light-emitting element surface, has a region overlapping with the plurality of first light-emitting elements and a region overlapping with the plurality of second light-emitting elements as viewed from a direction perpendicular to the light-emitting element surface, is electrically connected to the plurality of second light-emitting elements, and is not electrically connected to the plurality of first light-emitting elements;
  a third wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the third light-emitting element, and is not electrically connected to the fourth light-emitting element; and
  a fourth wire that extends in a direction parallel to the bottom surface, has a region of the bottom surface between the element isolation groove and the third light-emitting element and a region of the bottom surface between the element isolation groove and the fourth light-emitting element as viewed from a direction perpendicular to the bottom surface, overlaps with the element isolation groove, is electrically connected to the fourth light-emitting element, and is not electrically connected to the third light-emitting element.

8. The light-emitting element array according to claim 7, wherein
  the light-emitting element group includes a first light-emitting element column in which the plurality of first light-emitting elements is arrayed, a second light-emitting element column in which the plurality of second light-emitting elements is arrayed, a third light-emitting element column in which the plurality of third light-emitting elements is arrayed, and a fourth light-emitting element column in which the plurality of fourth light-emitting elements is arrayed.

9. The light-emitting element array according to claim 8, wherein
  the first light-emitting element column, the second light-emitting element column, the first wire, and the second wire each extend in a first direction parallel to the light-emitting element surface, and
  the third light-emitting element column, the fourth light-emitting element column, the third wire, and the fourth wire each extend in a second direction that is parallel to the light-emitting element surface and is orthogonal to the first direction.

10. The light-emitting element array according to claim 8, wherein
  the first light-emitting element column, the second light-emitting element column, the first wire, and the second wire each extend in a first direction parallel to the light-emitting element surface, and
  the third light-emitting element column, the fourth light-emitting element column, the third wire, and the fourth wire each extend in the first direction.

11. The light-emitting element array according to claim 7, wherein
  the third wire is stacked on the bottom surface and the element isolation groove via an insulation layer, is electrically connected to the plurality of third light-emitting elements via a first opening provided in the insulation layer in a region of the bottom surface between the element isolation groove and the third light-emitting element, and is insulated from the plurality of fourth light-emitting elements by the insulation layer in a region of the bottom surface between the element isolation groove and the fourth light-emitting element, and
  the fourth wire is stacked on the bottom surface and the element isolation groove via the insulation layer, is electrically connected to the plurality of fourth light-emitting elements via a second opening provided in the insulation layer in a region of the bottom surface between the element isolation groove and the fourth light-emitting element, and is insulated from the plurality of third light-emitting elements by the insulation layer in a region of the bottom surface between the element isolation groove and the third light-emitting element.

12. The light-emitting element array according to claim 7, wherein
  the third wire has a width from the element isolation groove to a side of the third light-emitting element larger than a width from the element isolation groove to a side of the fourth light-emitting element, and
  the fourth wire has a width from the element isolation groove to a side of the fourth light-emitting element larger than a width from the element isolation groove to a side of the third light-emitting element.

13. A light-emitting element array, comprising:
  a light-emitting element group in which a plurality of first light-emitting elements and a plurality of second light-emitting elements are arrayed in a planar manner to form a light-emitting element surface, the plurality of first light-emitting elements and the plurality of second light-emitting elements each having a mesa structure surrounded by a recessed portion, the recessed portion being separated from the light-emitting element surface and having a bottom surface parallel to the light-emitting element surface, an element isolation groove that electrically separates the plurality of first light-emitting elements and the plurality of second light-emitting elements from each other being provided in the bottom surface;

a first wire that extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the first light-emitting element, and is not electrically connected to the second light-emitting element; and a second wire that extends in a direction parallel to the bottom surface, has a region of the bottom surface between the element isolation groove and the first light-emitting element and a region of the bottom surface between the element isolation groove and the second light-emitting element as viewed from a direction perpendicular to the bottom surface, overlaps with the element isolation groove, is electrically connected to the second light-emitting element, and is not electrically connected to the first light-emitting element.

* * * * *